(12) United States Patent
Cho et al.

(10) Patent No.: US 12,153,803 B2
(45) Date of Patent: Nov. 26, 2024

(54) STORAGE DEVICE AND OPERATION METHOD THEREOF

(71) Applicant: SAMSUNG ELECTRONICS CO., LTD., Suwon-si (KR)

(72) Inventors: Jeongjae Cho, Suwon-si (KR); In-Su Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 18/200,186

(22) Filed: May 22, 2023

(65) Prior Publication Data
US 2024/0045597 A1    Feb. 8, 2024

(30) Foreign Application Priority Data

Aug. 3, 2022    (KR) .................. 10-2022-0096978

(51) Int. Cl.
*G06F 3/06*    (2006.01)
(52) U.S. Cl.
CPC ............ *G06F 3/0619* (2013.01); *G06F 3/064* (2013.01); *G06F 3/0656* (2013.01); *G06F 3/0679* (2013.01)
(58) Field of Classification Search
CPC ...... G06F 3/0619; G06F 3/064; G06F 3/0656; G06F 3/0679
USPC ................................................ 711/162, 103
See application file for complete search history.

(56) References Cited

U.S. PATENT DOCUMENTS

| | | |
|---|---|---|
| 6,301,677 B1 | 10/2001 | Squibb |
| 6,449,625 B1 | 9/2002 | Wang |
| 7,450,420 B2 | 11/2008 | Sinclair et al. |
| 7,730,213 B2 | 6/2010 | Howard |
| 8,452,929 B2 | 5/2013 | Bennett |
| 8,949,517 B2 | 2/2015 | Cohen et al. |
| 8,954,435 B2 | 2/2015 | Patwardhan et al. |
| 8,977,898 B1 | 3/2015 | Veeraswamy et al. |
| 9,251,019 B2 | 2/2016 | Losh et al. |
| 9,430,376 B2 | 8/2016 | Horn |
| 9,703,639 B1 | 7/2017 | Shah et al. |
| 9,886,383 B2 | 2/2018 | Cohen et al. |
| 9,977,810 B2 | 5/2018 | Goel et al. |
| 11,194,736 B2 | 12/2021 | Kang et al. |
| 2007/0233752 A1 | 10/2007 | Bangalore et al. |
| 2008/0027998 A1 | 1/2008 | Hara |
| 2010/0174853 A1 | 7/2010 | Lee et al. |

(Continued)

FOREIGN PATENT DOCUMENTS

| | | |
|---|---|---|
| CN | 113868192 A | 12/2021 |
| KR | 10-2014-0084337 A | 7/2014 |

(Continued)

*Primary Examiner* — Hashem Farrokh
(74) *Attorney, Agent, or Firm* — Sughrue Mion, PLLC

(57) ABSTRACT

A storage device includes: a memory; and a storage controller configured to control the memory and to update meta data by controlling the memory. The storage controller includes a journal manager having a range table. The journal manager is configured to: generate a plurality of journal data associated with the update of the meta data, restore the meta data by sequentially performing a replay operation for each of the plurality of journal data, update the range table based on the plurality of journal data, and skip the replay operation for at least one of the plurality of journal data based on the range table.

20 Claims, 33 Drawing Sheets

(56) References Cited

U.S. PATENT DOCUMENTS

| | | |
|---|---|---|
| 2011/0231596 A1 | 9/2011 | Goss et al. |
| 2014/0281206 A1 | 9/2014 | Crawford et al. |
| 2014/0325117 A1 | 10/2014 | Canepa et al. |
| 2016/0154594 A1* | 6/2016 | Kang .................. G06F 12/0246 711/103 |
| 2017/0083540 A1* | 3/2017 | Mamluk ............. G06F 11/1471 |
| 2018/0307609 A1* | 10/2018 | Qiang ................. G06F 12/0875 |
| 2021/0026763 A1 | 1/2021 | Kim et al. |
| 2021/0303196 A1 | 9/2021 | Lv et al. |

FOREIGN PATENT DOCUMENTS

| | | |
|---|---|---|
| KR | 10-1522848 B1 | 5/2015 |
| KR | 10-1965987 B1 | 4/2019 |
| KR | 10-2021-0012085 A | 2/2021 |

* cited by examiner

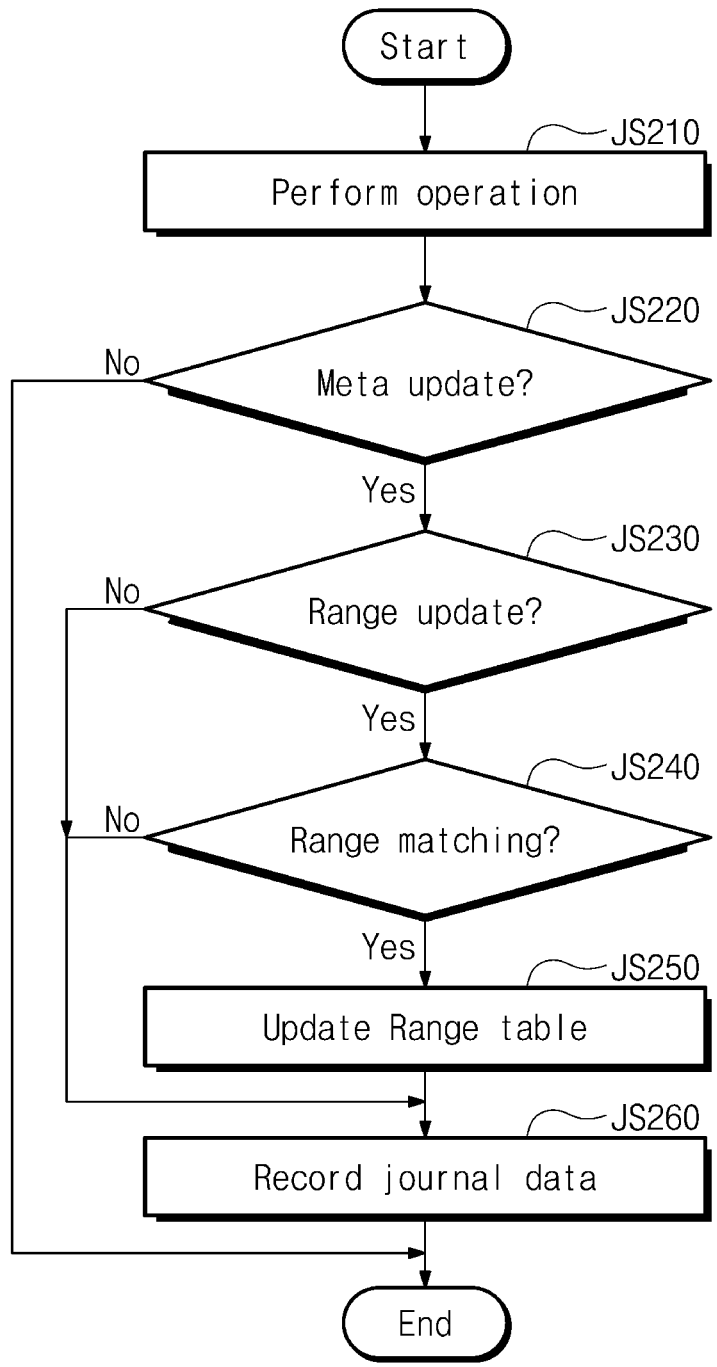

FIG. 16

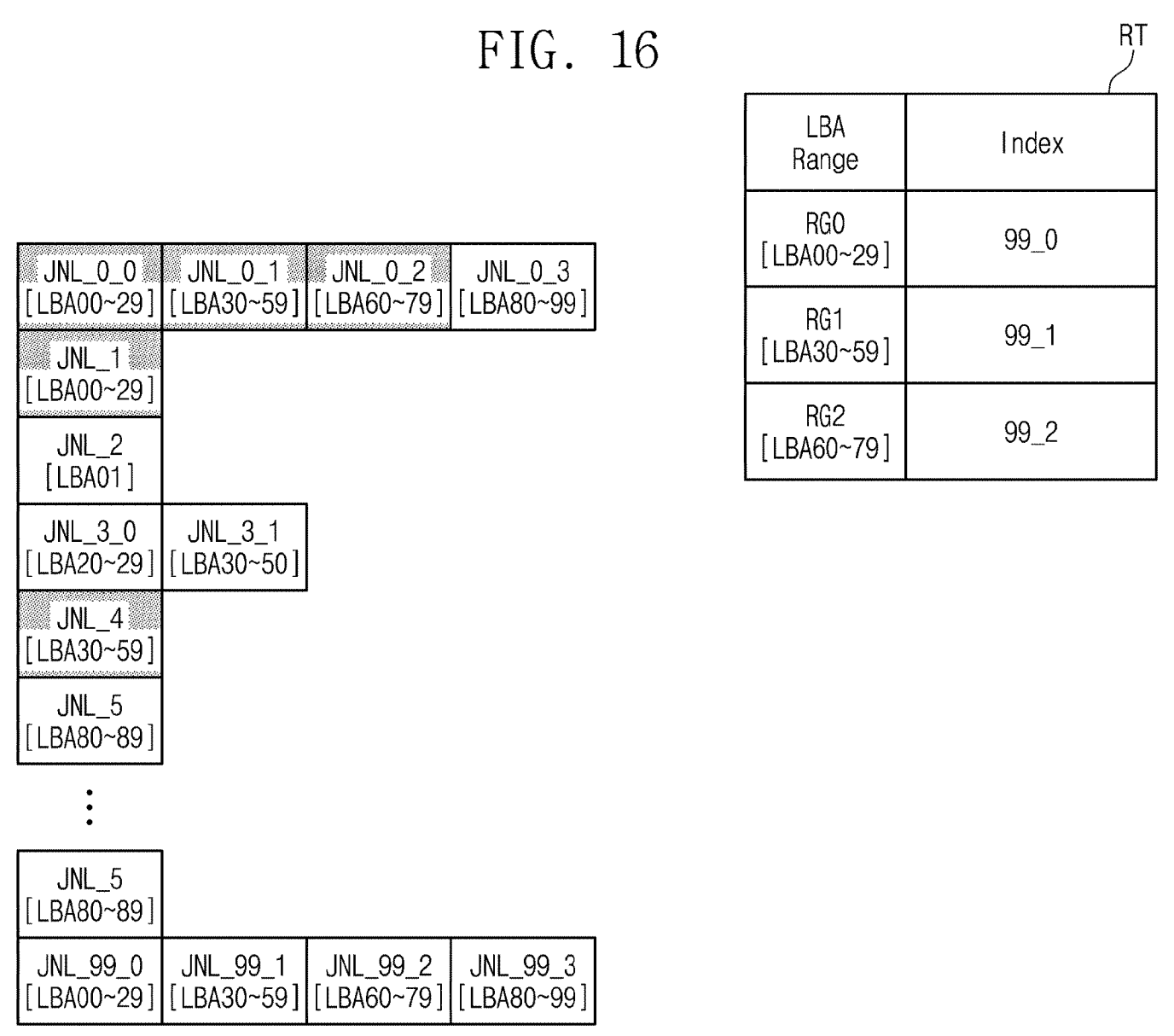

| LBA Range | Index |
|---|---|
| RG0 [LBA00~29] | 99_0 |
| RG1 [LBA30~59] | 99_1 |
| RG2 [LBA60~79] | 99_2 |

RT

| JNL_0_0 [LBA00~29] | JNL_0_1 [LBA30~59] | JNL_0_2 [LBA60~79] | JNL_0_3 [LBA80~99] |
| JNL_1 [LBA00~29] |
| JNL_2 [LBA01] |
| JNL_3_0 [LBA20~29] | JNL_3_1 [LBA30~50] |
| JNL_4 [LBA30~59] |
| JNL_5 [LBA80~89] |

···

| JNL_5 [LBA80~89] |
| JNL_99_0 [LBA00~29] | JNL_99_1 [LBA30~59] | JNL_99_2 [LBA60~79] | JNL_99_3 [LBA80~99] |

STORAGE DEVICE AND OPERATION METHOD THEREOF

CROSS-REFERENCE TO RELATED APPLICATIONS

This application claims priority under 35 U.S.C. § 119 to Korean Patent Application No. 10-2022-0096978 filed on Aug. 3, 2022, in the Korean Intellectual Property Office, the disclosures of which are incorporated by reference herein in their entireties.

BACKGROUND

1. Field

The present disclosure relates to a semiconductor memory, and more particularly, relates to a storage device and an operation method thereof.

2. Description of Related Art

A semiconductor memory is classified as a volatile memory, in which stored data disappear when a power is turned off, such as a static random access memory (SRAM) or a dynamic random access memory (DRAM), or a nonvolatile memory, in which stored data are retained even when a power is turned off, such as a flash memory, a phase-change RAM (PRAM), a magnetic RAM (MRAM), a resistive RAM (RRAM), or a ferroelectric RAM (FRAM).

The flash memory device is being widely used as a high-capacity storage device. A controller configured to control the flash memory device controls the flash memory device by using a mapping table. The mapping table is a kind of important meta data for guaranteeing the reliability of data. Accordingly, when the meta data such as the mapping table are lost, because the reliability of data stored in the storage device is incapable of being guaranteed, various techniques for preventing the loss of the meta data are being developed.

SUMMARY

Embodiments of the present disclosure provide a storage device with improved reliability and improved performance and an operation method thereof.

According to an aspect of the disclosure, a storage device includes: a nonvolatile memory device; and a storage controller configured to control the nonvolatile memory device and to update meta data by controlling the nonvolatile memory device. The storage controller includes a journal manager. The journal manager is configured to: generate a plurality of journal data associated with the update of the meta data, restore the meta data by sequentially performing a replay operation for each of the plurality of journal data, update a range table based on the plurality of journal data, and skip the replay operation for at least one of the plurality of journal data based on the range table.

According to another aspect of the disclosure, a method, performed by a storage device, includes: performing a first erase operation and updating meta data based on the first erase operation; generating first journal data based on the update of the meta data by the first erase operation and recording the first journal data at a journal memory; updating a range table based on a first index of the first journal data; after the first erase operation, performing a second erase operation and updating the meta data based on the second erase operation; generating second journal data based on the update of the meta data by the second erase operation and recording the second journal data at the journal memory; and updating the range table based on a second index of the second journal data.

According to another aspect of the disclosure, a method, performed by a storage device, includes: performing a first erase operation for a plurality of logical block addresses; generating first journal data based on the first erase operation; generating a first range table by updating a zero-th (0th) range table based on a first index of the first journal data; flushing the first journal data and the first range table to a memory in response to a first sudden power-off event; performing a second erase operation for the plurality of logical block addresses, after the first sudden power-off event being finished; generating second journal data based on the second erase operation; generating a second range table by updating the first range table based on a second index of the second journal data; flushing the first journal data, the second journal data, and the second range table to the memory in response to a second sudden power-off event; restoring meta data after the second sudden power-off event being finished, by skipping a replay operation for the first journal data; and performing the replay operation on the second journal data, based on the second range table.

BRIEF DESCRIPTION OF DRAWINGS

The above and other objects and features of the present disclosure will become apparent by describing in detail embodiments thereof with reference to the accompanying drawings, in which:

FIG. 12A illustrates a journal data generation method of a storage device of FIG. 1;

FIG. 16 illustrates a journal data replaying operation of a storage device of FIG. 1;

DETAILED DESCRIPTION

Below, embodiments of the present disclosure will be described in detail and clearly to such an extent that an ordinary one in the art easily implements the present disclosure.

Figure 1:
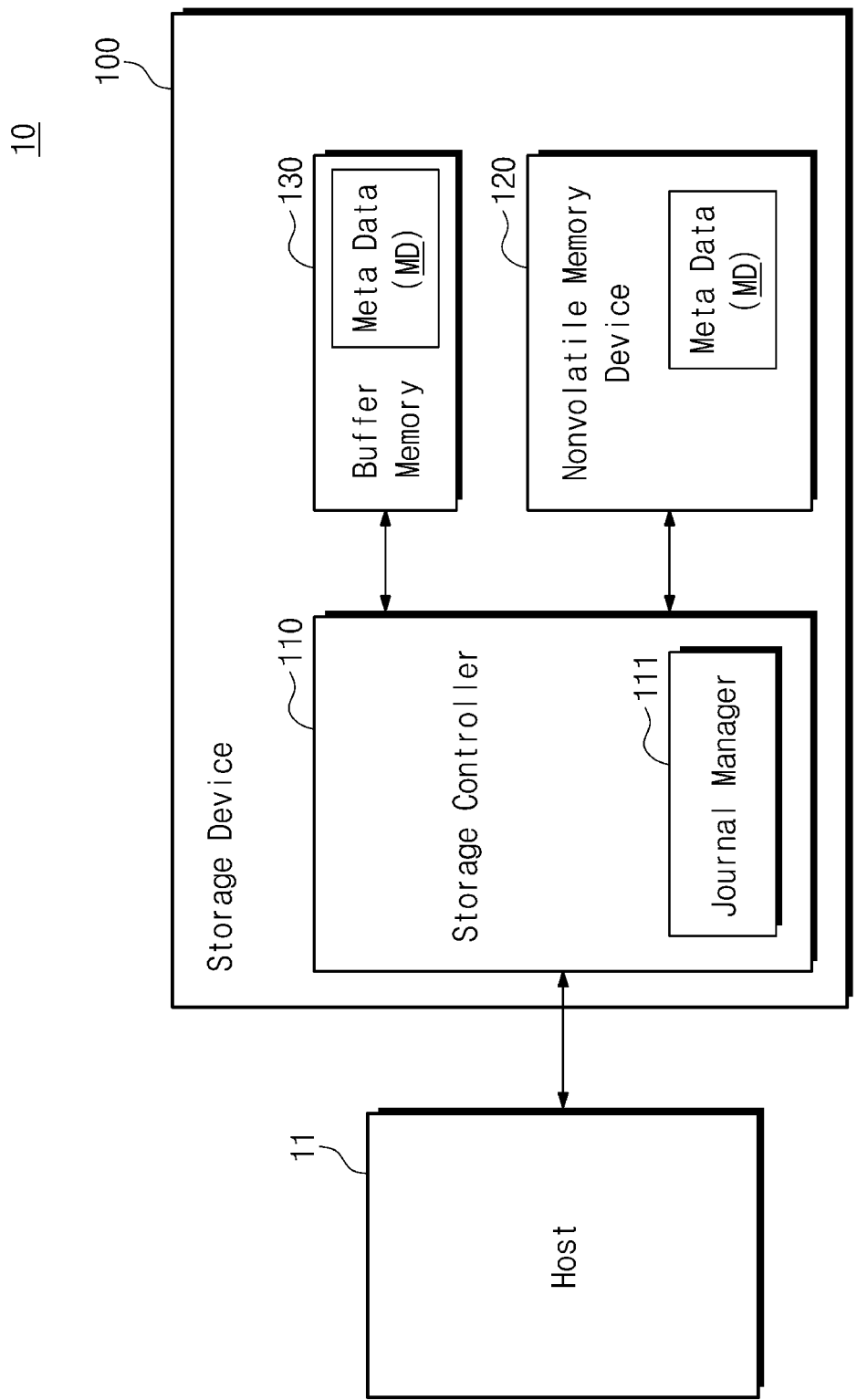
FIG. 1 illustrates a storage system according to an embodiment of the present disclosure.

FIG. 1 is a block diagram illustrating a storage system according to an embodiment of the present disclosure. Referring to FIG. 1, a storage system 10 may include a host 11 and a storage device 100.

The host 11 may store data in the storage device 100 or may read data stored in the storage device 100. The host 11 may control the storage device 100 based on a given interface. In an embodiment, the given interface may include one of various interfaces such as an Advanced Technology Attachment (ATA) interface, an Serial ATA (SATA) interface, an external SATA (e-SATA) interface, a Small Computer Small Interface (SCSI), a Serial Attached SCSI (SAS) interface, a Peripheral Component Interconnection (PCI) interface, a PCI express (PCIe) interface, an NVM express (NVMe) interface, an IEEE 1394 interface, an Universal Serial Bus (USB) interface, an Secure Digital (SD) card interface, an Multi-Media Card (MMC) interface, an embedded Multi-Media Card (eMMC) interface, an Universal Flash Storage (UFS) interface, an embedded Universal Flash Storage (eUFS) interface, and a Compact Flash (CF) card interface.

The storage device 100 may include a storage controller 110, a nonvolatile memory device 120, and a buffer memory 130. Under control of the host 11, the storage controller 110 may store data in the nonvolatile memory device 120 or may read data stored in the nonvolatile memory device 120.

The nonvolatile memory device 120 may operate under control of the storage controller 110. In an embodiment, the nonvolatile memory device 120 may be a NAND flash memory device, but the present disclosure is not limited thereto. For example, the nonvolatile memory device 120 may be based on various nonvolatile memory devices such as a PRAM, an RRAM, and a MRAM. Moreover, the nonvolatile memory device 120 is an example in one embodiment, and it may be replaced with other types of memory devices (e.g., volatile memory devices).

The buffer memory 130 may be configured to temporarily store data to be stored in the nonvolatile memory device 120 or data read from the nonvolatile memory device 120. In an embodiment, the buffer memory 130 may be a DRAM, but the present disclosure is not limited thereto. For example, the buffer memory 130 may include one of various high-speed memories such as an SRAM, a PRAM, a RRAM, and an MRAM.

In an embodiment, the buffer memory 130 may store a variety of information (e.g., meta data MD) necessary for the storage device 100 to operate. For example, the storage controller 110 may manage data stored in the nonvolatile memory device 120 through an address translation operation. The address translation operation refers to an operation of translating a logical block address managed by the host 11 into a physical block address of the nonvolatile memory device 120. The address translation operation may be performed through a mapping table. The mapping table may be stored and managed in the buffer memory 130.

Below, to describe embodiments of the present disclosure easily, the description will be given as the meta data MD correspond to the mapping table associated with a logical block address managed by the host 11 and a physical block address of the nonvolatile memory device 120. However, the present disclosure is not limited thereto. For example, the meta data MD may include a variety of information necessary for the storage device 100 to operate.

In an embodiment, when the meta data MD are lost due to various causes, the reliability of data stored in the nonvolatile memory device 120 is incapable of being guaranteed. To prevent the loss of the meta data MD, the storage controller 110 may manage journal data including update information of the meta data MD. For example, the storage controller 110 may include a journal manager 111. The journal manager 111 may write and manage the update information of the meta data MD in the form of journal data. In an embodiment, the journal data that are managed by the journal manager 111 may be stored in an internal buffer or a separate storage circuit (e.g., a journal memory) included in the storage controller 110 or may be stored in the buffer memory 130 located outside the storage controller 110.

In an embodiment, when the meta data MD are lost in various situations, the journal manager 111 may restore the lost meta data MD by replaying the recorded journal data. For example, the storage controller 110 may periodically store the meta data MD present in the buffer memory 130 in the nonvolatile memory device 120. In the storage system 10, when the Sudden Power-Off (SPO) event occurs, the storage device 100 may perform a sudden power-off operation by using an internal power (e.g., a capacitor power). In this case, because the size of the meta data MD present in the buffer memory 130 is relatively large, the meta data MD may not be flushed to the nonvolatile memory device 120. That is, in the sudden power-off event, the meta data MD present in the nonvolatile memory device 120 may not be the latest version; in this case, partial information of the meta data MD may be lost.

In contrast, in the sudden power-off event, because the size of journal data managed by the journal manager 111 is relatively small, the journal data may be flushed to the nonvolatile memory device 120. Afterwards, when the storage system 10 is powered on, the storage controller 110 may load the journal data flushed to the nonvolatile memory device 120 to the buffer memory 130 and may perform the replay operation on the journal data loaded to the buffer memory 130; in this case, the latest version of meta data MD may be restored.

In general, the journal data replay operation is sequentially performed in the order of writing journal data. In this case, because the replay operation is performed on the entire journal data, a replay time may increase, and a time taken to restore the meta data MD may increase. In contrast, according to embodiments of the present disclosure, the replay operation for some of a plurality of journal data may be omitted based on the redundancy of the journal data. In this case, even though the replay operation is not performed on the entire journal data (i.e., even though the replay operation for partial journal data is omitted), the meta data MD may be normally restored. According to embodiments of the present disclosure, a journal data management method of the storage controller 110 will be described in detail with reference to the following drawings.

Figure 2:
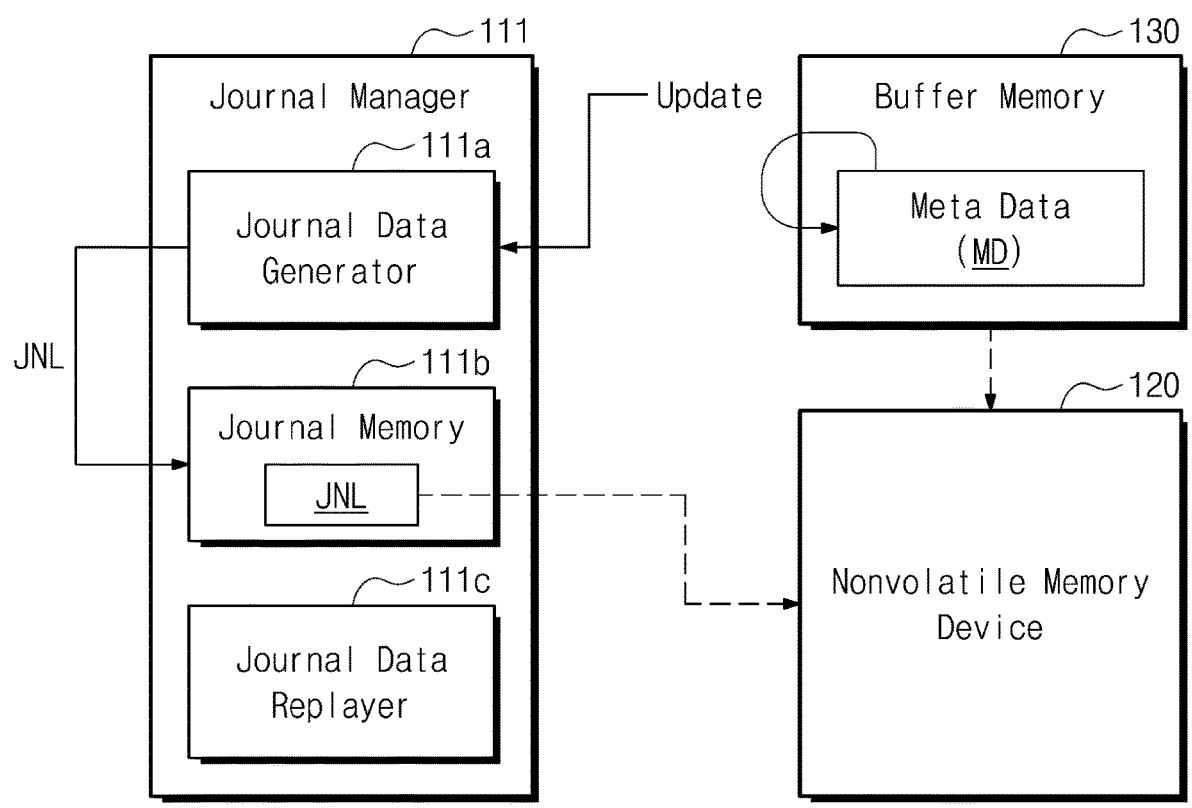
FIG. 2 illustrates an operation in which a journal manager included in a storage controller of FIG. 1 generates journal data.

FIG. 2 is a block diagram for describing an operation in which a journal manager included in a storage controller of FIG. 1 generates journal data. Components that are unnecessary to describe a configuration of the journal manager 111 will be omitted.

Referring to FIGS. 1 and 2, the storage controller 110 of the storage device 100 may perform various operations (e.g., a read operation, a write operation, and an erase operation) on the nonvolatile memory device 120. As various operations are performed on the nonvolatile memory device 120, the meta data MD stored in the buffer memory 130 may be updated. In an embodiment, the update of the meta data MD may be performed by a flash Translation Layer (FTL) included in the storage controller 110.

In an embodiment, the update of the meta data MD may be performed in various manners. For example, when the update of the meta data MD is required, the storage controller 110 may generate only journal data JNL without immediately updating the meta data MD. Afterwards, the meta data MD may be updated based on the journal data JNL. Alternatively, when the update of the meta data MD is required, the storage controller 110 may immediately update the meta data MD and may generate the journal data JNL.

Below, the update of the meta data MD may be later performed by the storage controller 110 without immediately updating the meta data MD when the update of the meta data MD is required. However, the present disclosure is not limited thereto. For example, the timing to update the meta data MD and the timing to generate the journal data JNL may be variously changed and modified.

The journal manager 111 may generate and manage the journal data JNL based on the update information of the meta data MD. For example, the journal manager 111 may include a journal data generator 111*a*, a journal memory 111*b*, and a journal data replayer 111*c*.

The journal data generator 111*a* may generate the journal data JNL based on the update information of the meta data MD. That is, the journal data JNL may include information indicating how the meta data MD are updated. In a case where partial information of the meta data MD is lost, the lost information may be restored by performing the replay operation on the journal data JNL.

The journal data JNL generated by the journal data generator 111*a* may be stored in the journal memory 111*b*. In an embodiment, the journal memory 111*b* may be an internal memory, an internal buffer, or an internal SRAM included in the storage controller 110. Alternatively or additionally, the journal memory 111*b* may be implemented with a part of the buffer memory 130 located outside the storage controller 110. The journal memory 111*b* may sequentially store the journal data JNL generated from the journal data generator 111*a* in the order of generating the journal data JNL.

In an embodiment, the meta data MD present in the buffer memory 130 may be updated to the latest version based on the journal data JNL present in the journal memory 111*b*, and the updated meta data MD may be flushed to the nonvolatile memory device 120, periodically or randomly, while the storage device 100 is being driven.

In an embodiment, when the sudden power-off event occurs in the storage device 100, the journal data JNL present in the journal memory 111*b* may be flushed to the nonvolatile memory device 120. In an embodiment, in the nonvolatile memory device 120, a region in which the meta data MD and the journal data JNL are stored may be a Single Level Cell (SLC) region.

The journal data replayer 111*c* may be configured to replay the journal data JNL for the purpose of restoring the meta data MD. For example, when the storage device 100 is powered on after the sudden power-off event, the meta data MD present in the nonvolatile memory device 120 may be loaded or stored to the buffer memory 130. As described above, the meta data MD present in the nonvolatile memory device 120 may not be the latest version; in this case, the reliability of data present in the nonvolatile memory device 120 may be not guaranteed. Accordingly, an operation for restoring the meta data MD of the latest version may be required. The journal data replayer 111*c* of the journal manager 111 may restore the meta data MD of the latest version by replaying the journal data JNL present in the nonvolatile memory device 120.

Figure 3A:
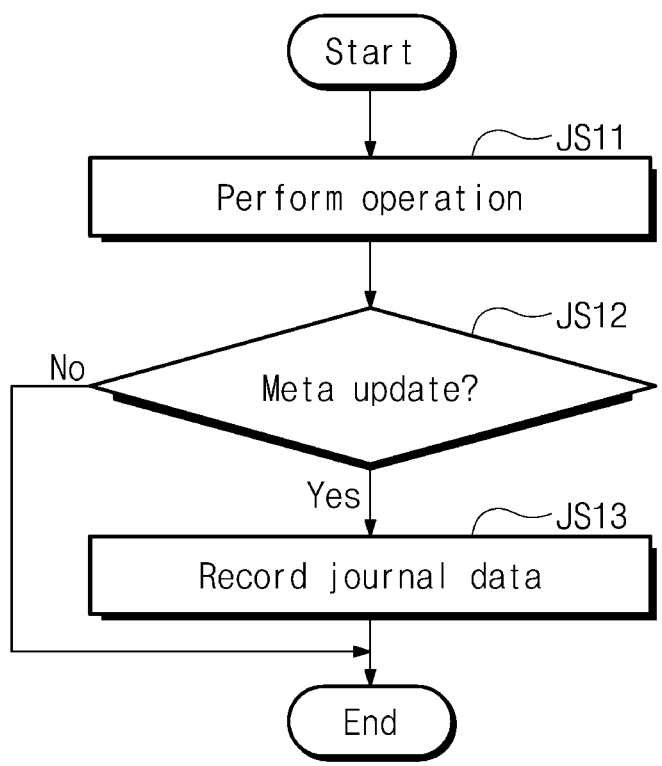
FIGS. 3A and 3B illustrate a journal data generation method of a storage device of FIG. 1.
Figure 3B:
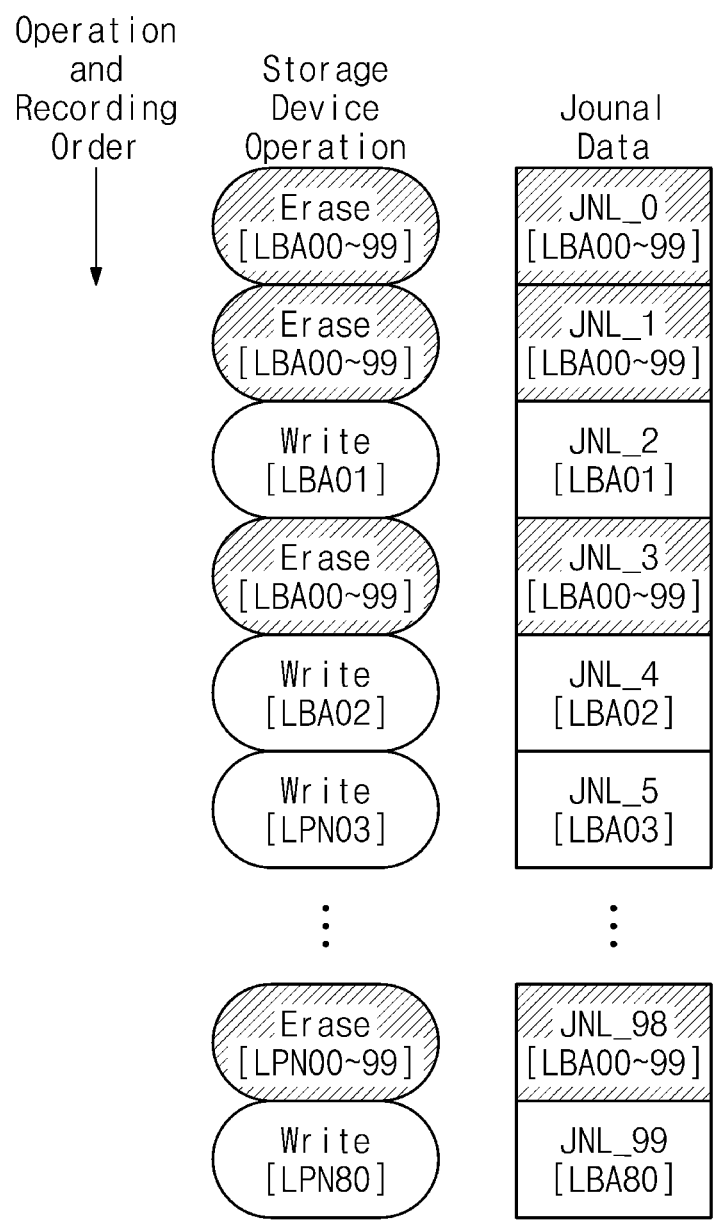

FIGS. 3A and 3B are a flowchart and a diagram, respectively, for describing a journal data generation method of the storage device of FIG. 1. Below, in embodiments of the present disclosure, the host 11 manages a storage area of the storage device 100 based on a Logical Block Address LBA and the size of the storage area corresponds to 0th LBA ("LBA00") to 99th LBA ("LBA99").

Referring to FIGS. 1, 2, 3A, and 3B, in operation JS11, the storage device 100 may perform various operations. For example, the storage device 100 may perform various operations (e.g., a read operation, a write operation, and an erase operation) depending on an explicit request of the host 11. Alternatively or additionally, the storage device 100 may perform various operations (e.g., a garbage collection operation) depending on an internal policy.

In operation JS12 (shown in FIG. 3A), the storage device 100 may determine whether the update of the meta data MD is required. For example, when the storage device 100 performs the read operation on data stored in the nonvolatile memory device 120, the update of the meta data MD may not be required. When the storage device 100 performs the write operation or the erase operation on the nonvolatile memory device 120, the update of the meta data MD may be required. When the update of the meta data MD is not required, separate journal data JNL are not generated.

When the update of the meta data MD is required, the storage device 100 may record the journal data JNL at the journal memory 111*b*. For example, the journal manager 111 of the storage controller 110 may generate the journal data JNL including the update information of the meta data MD stored in the buffer memory 130. The generated journal data JNL may be sequentially stored in the journal memory 111*b* in the order of generating the journal data JNL.

In detail, as illustrated in FIG. 3B, the storage device 100 may perform various operations. In one embodiment, the storage device 100 performs the erase operation and the write operation in response to the explicit request of the host 11. In the erase operation, the storage device 100 may update meta data for logical block addresses targeted for the erase operation. In the write operation, the storage device 100 may update meta data for a logical block address targeted for the write operation. In an embodiment, the erase operation (such as a sanitize operation, a trim operation, or secure erase) may refer to an operation of deleting (or sanitizing or trimming) or erasing user data stored in the storage device 100.

For example, as illustrated in FIG. 3B, when the update of the meta data MD is required, the storage controller 110 of the storage device 100 may generate the journal data JNL including information about the update of the meta data MD instead of directly performing the update of the meta data MD.

In an embodiment, below, the journal data are marked by JNL_x. Herein, "x" may indicate an index corresponding to the order of generating or recording journal data. In an embodiment, the index may indicate the order of generating journal data or may indicate a location of a journal memory, at which the journal data are recorded.

As an example, the storage device 100 may perform the erase operation for the 0th to 99th logical block addresses (LBA00 to LBA99) and may generate 0th journal data JNL_0 corresponding to the erase operation for the 0th to 99th logical block addresses (LBA00 to LBA99). Likewise, the storage device 100 may sequentially perform the erase operation for the 0th to 99th logical block addresses (LBA00 to LBA99), the write operation for the 1st logical block address LBA1, the erase operation for the 0th to 99th logical block addresses (LBA00 to LBA99), the write operation for the 2nd logical block address LBA2, the write operation for the 3rd logical block address LBA3, the erase operation for the 0th to 99th logical block addresses (LBA00 to LBA99), and the write operation for the 80th logical block address LBA80 and may sequentially generate 1st to 99th journal data (JNL_1 to JNL_99) corresponding thereto. The plurality of journal data JNL_0 to JNL_99 may be sequentially stored in the journal memory 111b in the order of generating journal data. In an embodiment, each of the plurality of journal data JNL_0 to JNL_99 may be stored in one entry of the journal memory 111b.

In an embodiment, the configuration of the journal data JNL to be described with reference to the drawings (e.g., FIG. 3B) may be generated as there is repeated the situation where the sudden power-off event occurs immediately after the storage device 100 performs each operation (i.e., the situation where a specific operation is performed before the replay operation is performed on journal data and the sudden power-off event occurs).

In an embodiment, as illustrated in FIG. 3B, in the case where the plurality of journal data JNL_0 to JNL_99 are generated, the storage controller 110 may restore the meta data MD by sequentially performing the replay operation on the plurality of journal data JNL_0 to JNL_99. For example, the journal manager 111 of the storage controller 110 may update the meta data MD corresponding to the 0th to 99th logical block addresses LBA00 to LBA99 based on the 0th journal data JNL_0. Afterwards, the journal manager 111 of the storage controller 110 may update the meta data MD corresponding to the 0th to 99th logical block addresses LBA00 to LBA99 based on the 1st journal data JNL_1. Likewise, the journal manager 111 of the storage controller 110 may update the meta data MD corresponding to each logical block address based on the 2nd to 99th journal data JNL_2 to JNL_99.

Figure 4A:
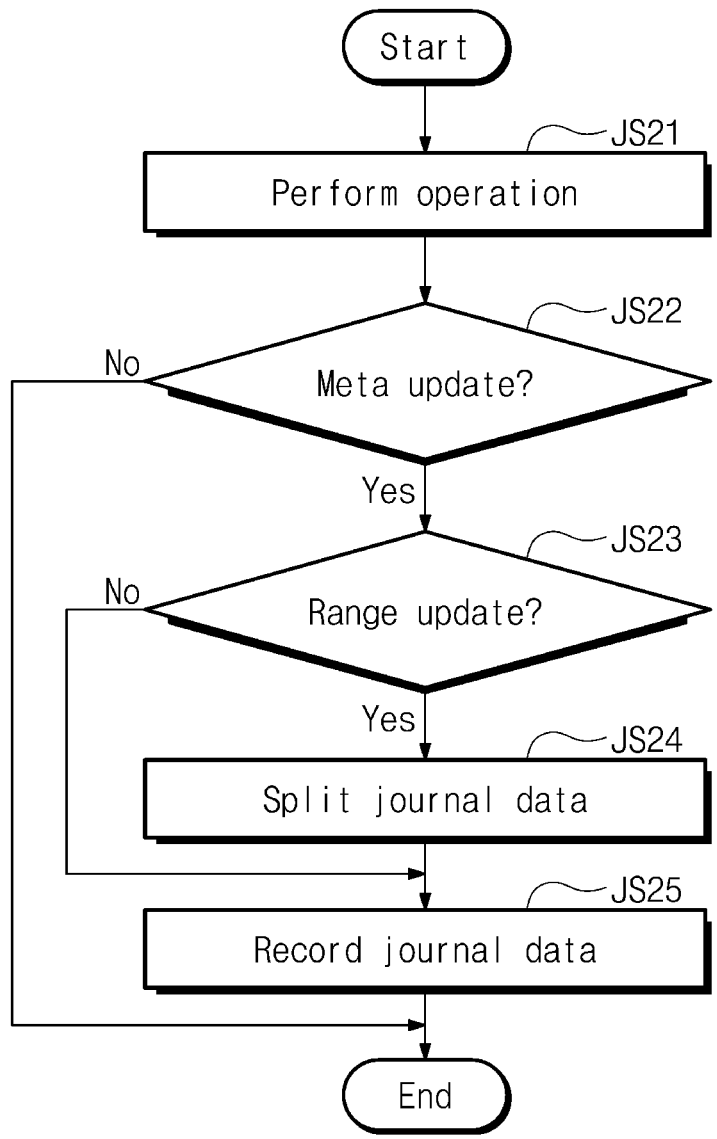
FIGS. 4A and 4B illustrate a journal data generation method of a storage device of FIG. 1.
Figure 4B:
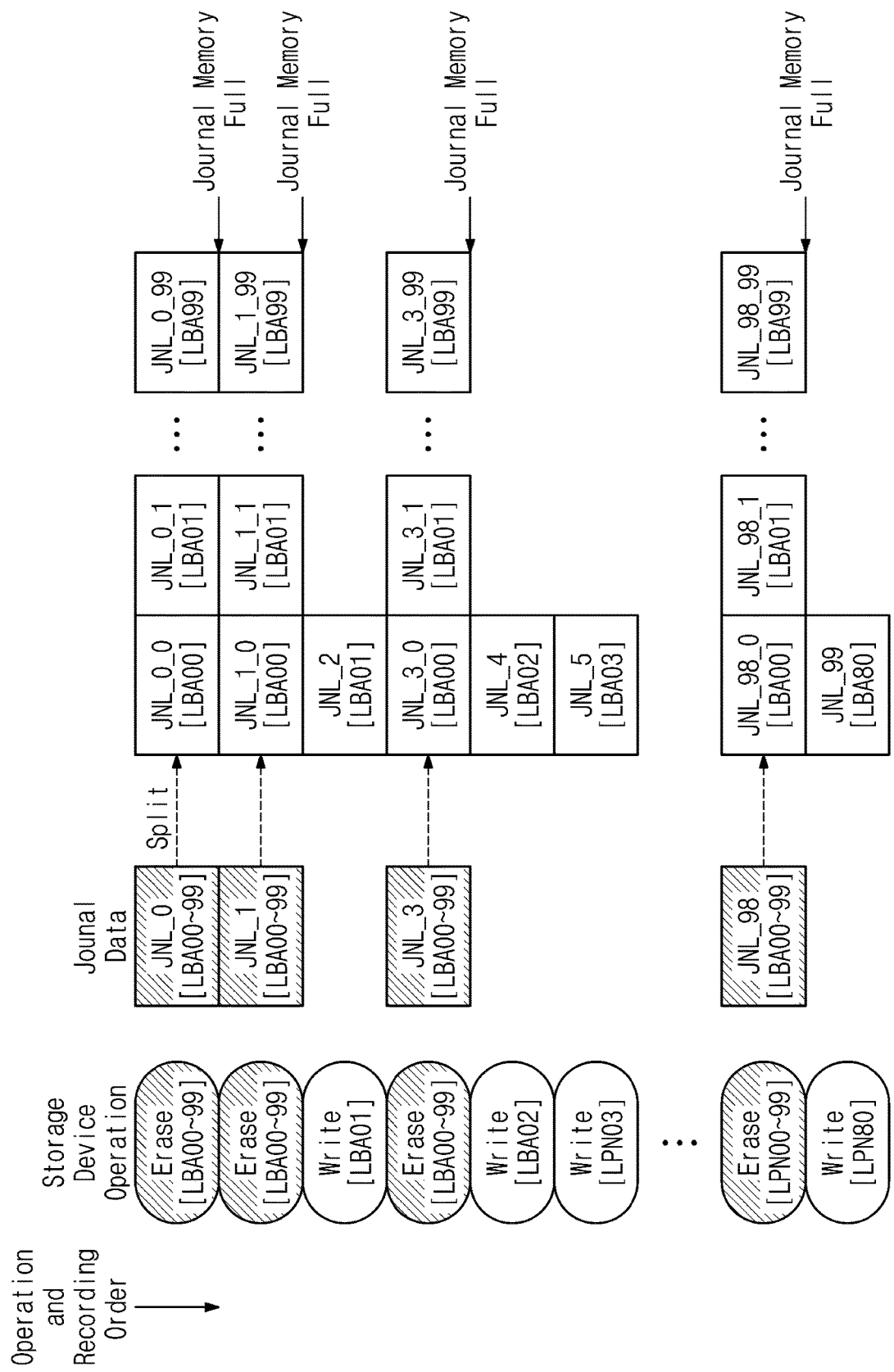

FIGS. 4A and 4B are a flowchart and a diagram, respectively, for describing a journal data generation method of a storage device of FIG. 1. Additional description associated with the components described above will be omitted to avoid redundancy.

Referring to FIGS. 1, 2, 4A, and 4B, the storage device 100 may perform operation JS21 and operation JS22. Operation JS21 and operation JS22 are similar to operation JS11 and operation JS12 of FIG. 3A, and thus, additional description will be omitted to avoid redundancy.

When the update of the meta data MD is required, in operation JS23, the storage device 100 may determine whether the required update is a range update. In an embodiment, the range update may indicate that the meta data MD corresponding to a plurality of logical block addresses are updated by one operation of the storage device 100. For example, as described with reference to FIG. 3B, when the storage device 100 performs the erase operation for the 0th to 99th logical block addresses (LBA00 to LBA99), the update of the meta data MD corresponding to the 0th to 99th logical block addresses (LBA00 to LBA99) may be required. In this case, the update of the meta data MD corresponding to the 0th to 99th logical block addresses (LBA00 to LBA99) may be referred to as a "range update".

When the update of the meta data MD is the range update, in operation JS24, the storage device 100 may split the journal data JNL. For example, the storage device 100 may split journal data corresponding to the range update into journal data of a single logical block address unit.

In operation JS25, the storage device 100 may record the journal data JNL at the journal memory 111b. In an embodiment, when the update of the meta data MD is not the range update, the storage device 100 may record the journal data JNL at the journal memory 111b without splitting the journal data JNL. In an embodiment, when the update of the meta data MD is not required, the storage device 100 does not generate separate journal data JNL.

In detail, as illustrated in FIG. 4B, the storage device 100 may perform the erase operation for the 0th to 99th logical block addresses (LBA00 to LBA99) and may generate the 0th journal data JNL_0 corresponding to the erase operation for the 0th to 99th logical block addresses (LBA00 to LBA99). Likewise, the storage device 100 may sequentially perform the erase operation for the 0th to 99th logical block addresses (LBA00 to LBA99), the write operation for the 1st logical block address LBA1, the erase operation for the 0th to 99th logical block addresses (LBA00 to LBA99), the write operation for the 2nd logical block address LBA2, the write operation for the 3rd logical block address LBA3, the erase operation for the 0th to 99th logical block addresses (LBA00 to LBA99), and the write operation for the 80th logical block address LBA80 and may sequentially generate 1st to 99th journal data JNL_1 to JNL_99 corresponding thereto.

In this case, the 0th, 1st, 3rd, and 98th journal data JNL_0, JNL_1, JNL_3, and JNL98 may be journal data corresponding to the range update. In this case, the journal manager 111 of the storage controller 110 may split each of the 0th, 1st, 3rd, and 98th journal data JNL_0, JNL_1, JNL_3, and JNL98 by the single logical block address unit. For example, the journal manager 111 of the storage controller 110 may split the 0th journal data JNL_0 into a plurality of journal data JNL_0_0 to JNL_0_99. Likewise, the journal manager 111 of the storage controller 110 may split the 1st, 3rd, and 98th journal data JNL_1, JNL_3, and JNL98 into a plurality of journal data JNL_1_0 to JNL_1_99, JNL_3_0 to JNL_3_99, and JNL_98_0 to JNL_98_99. In contrast, in one embodiment, the 2nd, 4th, 5th, and 99th journal data JNL_2, JNL_4, JNL_5, and JNL_99 are not journal data corresponding to the range update and thus are not split.

The generated journal data may be sequentially stored in the journal memory 111b in the order of generating journal data. For example, because the plurality of journal data JNL_0_0 to JNL_0_99 are first generated as a result of splitting the 0th journal data JNL_0, the plurality of journal data JNL_0_0 to JNL_0_99 are sequentially recorded at the journal memory 111b. Afterwards, the plurality of journal data JNL_1_0 to JNL_1_99 that are generated by splitting the 1st journal data JNL_1 are sequentially recorded at the journal memory 111b. Afterwards, the journal data JNL_2, JNL_3_0 to JNL_3_99, JNL_4, JNL_5, JNL_98_0 to JNL_98_99, and JNL_99 are sequentially recorded at the journal memory 111b depending on the order in which journal data are generated. In an embodiment, each of the journal data JNL_0_0 to JNL_0_99, JNL_1_0 to JNL_1_99, JNL_2, JNL_3_0 to JNL_3_99, JNL_4, JNL_5, JNL_98_0 to JNL_98_99, and JNL_99 may be stored in one entry of the journal memory 111b.

As described with reference to FIGS. 3A and 3B, the journal data JNL may be generated based on an operation unit of the storage device 100. Alternatively or additionally, as described with reference to FIGS. 4A and 4B, the journal data JNL may be generated based on a single logical block address unit.

In an embodiment, when the journal data JNL are generated based on the operation unit of the storage device 100, a time taken to generate and record the journal data JNL may be relatively shortened. In contrast, when the journal data JNL are generated based on the single logical block address unit, a time taken to generate and record the journal data JNL may be relatively increased.

For example, when the journal data JNL are recorded at the journal memory 111b as illustrated in FIG. 3B, the storage device 100 generates and records one journal data with regard to the single operation of the storage device 100, and thus, a time taken to generate and record the journal data JNL is relatively shortened.

In contrast, when the journal data JNL are recorded at the journal memory 111b as illustrated in FIG. 4B, the storage device 100 generates and records the journal data JNL by the single logical block address unit. In this case, when the range update for the meta data MD is caused, the entries of the journal memory 111b may be full. In this case, the replay operation for the journal data JNL is performed to secure empty entries of the journal memory 111b. That is, as illustrated in FIG. 4B, when the journal data JNL are managed, because the size and the number of the journal data JNL generated by the operation of the storage device 100 increase, a time taken to generate and record the journal data JNL may be relatively increased.

In an embodiment, when the journal data JNL are generated based on the operation unit of the storage device 100, a time taken to replay the journal data JNL may be relatively increased. In contrast, when the journal data JNL are generated based on the single logical block address unit, a time taken to replay the journal data JNL may be relatively decreased.

For example, when the journal data JNL are managed as illustrated in FIG. 3B, the range update for the meta data MD may be repeatedly performed due to the journal data JNL recorded at the journal memory 111b. In this case, because the range update for the meta data MD is duplicated, a time taken to replay journal data or a time taken to update the meta data MD (or an open time of the storage device 100) may increase due to the unnecessary range update. In contrast, when the journal data JNL are managed as illustrated in FIG. 4B, because the journal data JNL are managed in units of a single logical block address, the update of the meta data MD is not duplicated, that is, the update is performed only with respect to a single logical block address. In this case, the journal data replay time or the meta data update time (or the open time of the storage device 100) may decrease.

That is, as described above, according to the embodiment of FIGS. 3A and 3B, a time taken to generate and record the journal data JNL may be shortened (e.g., the open processing time of the storage device 100 may be shortened); however, a time taken to update or restore the meta data MD based on the journal data JNL (e.g., the open time of the storage device 100) may increase. According to the embodiment of FIGS. 4A and 4B, a time taken to generate and record the journal data JNL may be increased (e.g., the open processing time of the storage device 100 may be increased); however, a time taken to update or restore the meta data MD based on the journal data JNL (e.g., the open time of the storage device 100) may be decreased.

According to the present disclosure, the storage device 100 may manage the journal data JNL based on the operation unit of the storage device 100. Also, the storage device 100 may determine the redundancy of journal data based on a range table and may omit the replay operation for the duplicated journal data based on the determined result. As such, the operation processing time of the storage device 100 may be shortened, and the reliability of finally restored meta data MD may be maintained. In addition, because the unnecessary replay operation for the journal data JNL is omitted, the performance of the storage device 100 may be improved (in detail, the open time of the storage device 100 may decrease).

Figure 5:
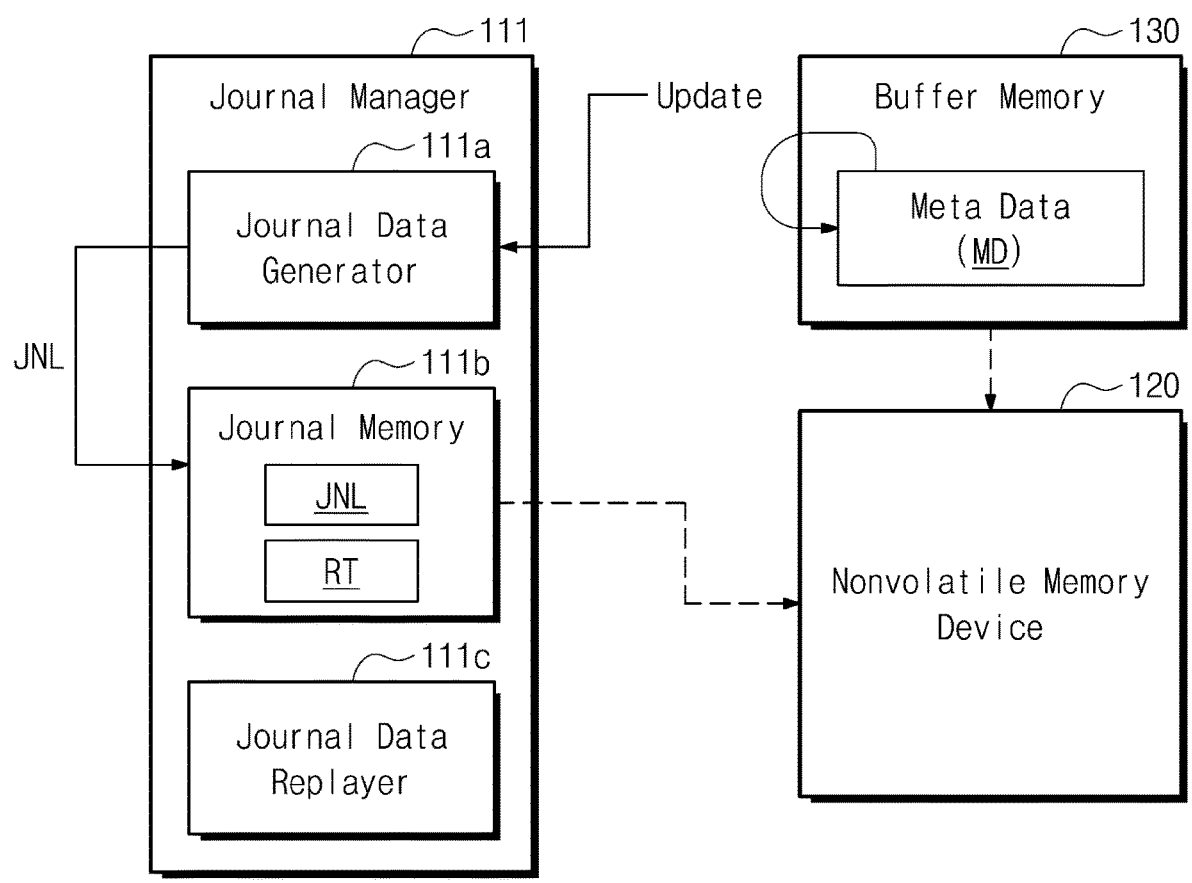
FIG. 5 illustrates a journal manager of FIG. 1.

FIG. 5 is a block diagram for describing a journal manager of FIG. 1. Additional description associated with the components described above will be omitted to avoid redundancy. Referring to FIGS. 1 and 5, the storage controller 110 of the storage device 100 may perform various operations (e.g., a read operation, a write operation, and an erase operation) on the nonvolatile memory device 120. As various operations are performed on the nonvolatile memory device 120, the meta data MD stored in the buffer memory 130 may be updated.

The journal manager 111 may generate and manage the journal data JNL including the update information of the meta data MD. For example, the journal manager 111 may include the journal data generator 111a, the journal memory 111b, and the journal data replayer 111c.

The journal data generator 111a may generate the journal data JNL including the update information of the meta data MD. Thus, the generated journal data JNL may be sequentially recorded at the journal memory 111b. In an embodiment, the journal data generator 111a may generate the journal data JNL based on the method described with reference to FIGS. 3A and 3B and may sequentially record the journal data JNL at the journal memory 111b.

In an embodiment, the journal data generator 111a may determine whether the journal data JNL correspond to the range update and may manage or update a range table RT based on a determination result. In an embodiment, the range table RT may include information about an index of the latest journal data JNL corresponding to the range update. The range table RT will be more fully described with reference to the following drawings.

The journal data replayer 111c may restore the meta data MD by performing the replay operation on the journal data JNL. In an embodiment, the journal data replayer 111c may omit the replay operation for a portion of the journal data JNL based on the range table RT. For example, when an index of the journal data JNL corresponding to the range update is absent from the range table RT (i.e., when journal data corresponding to the range update are not the latest), the journal data replayer 111c may omit the replay operation.

Figure 6:
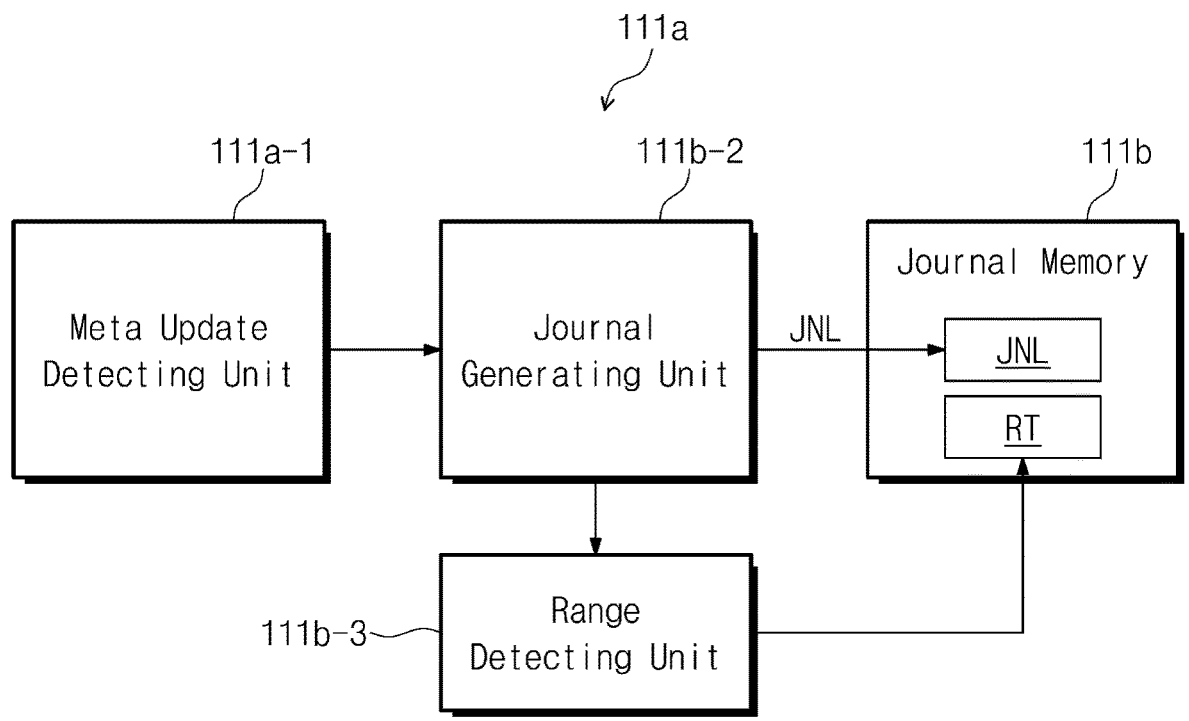
FIG. 6 illustrates a journal data generator of FIG. 5.

FIG. 6 is a block diagram illustrating a journal data generator of FIG. 5. Referring to FIGS. 1, 5, and 6, the journal data generator 111a may include a meta update detecting unit 111a-1, a journal generating unit 111a-2, and a range detecting unit 111a-3.

The meta update detecting unit 111a-1 may detect the update of the meta data MD. The journal generating unit 111a-2 may generate the journal data JNL including information about the update of the meta data MD detected by the meta update detecting unit 111a-1. Thus, the generated journal data JNL may be recorded at the journal memory 111b.

The range detecting unit 111a-3 may determine whether the generated journal data JNL correspond to the range update. When the generated journal data JNL correspond to the range update, the range detecting unit 111a-3 may update the range table RT based on information about an index of the journal data JNL, at which the generated journal data JNL are recorded.

Figure 7A:
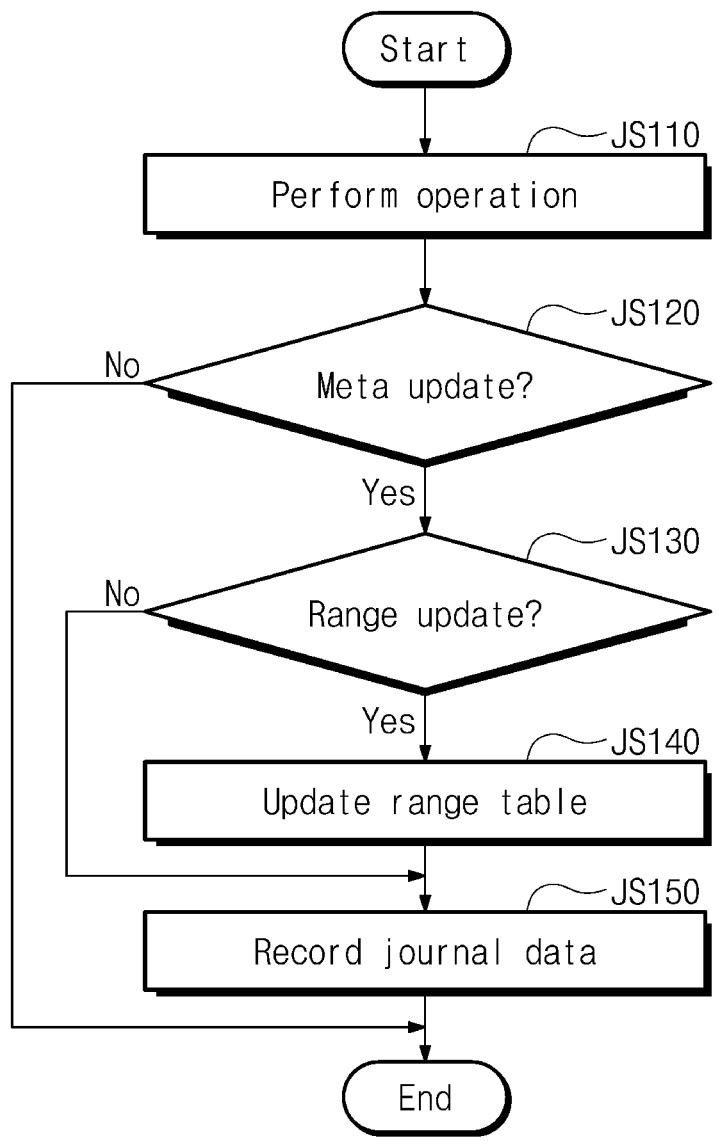
FIGS. 7A and 7B illustrate a journal data generation method of a storage device of FIG. 1.
Figure 7B:
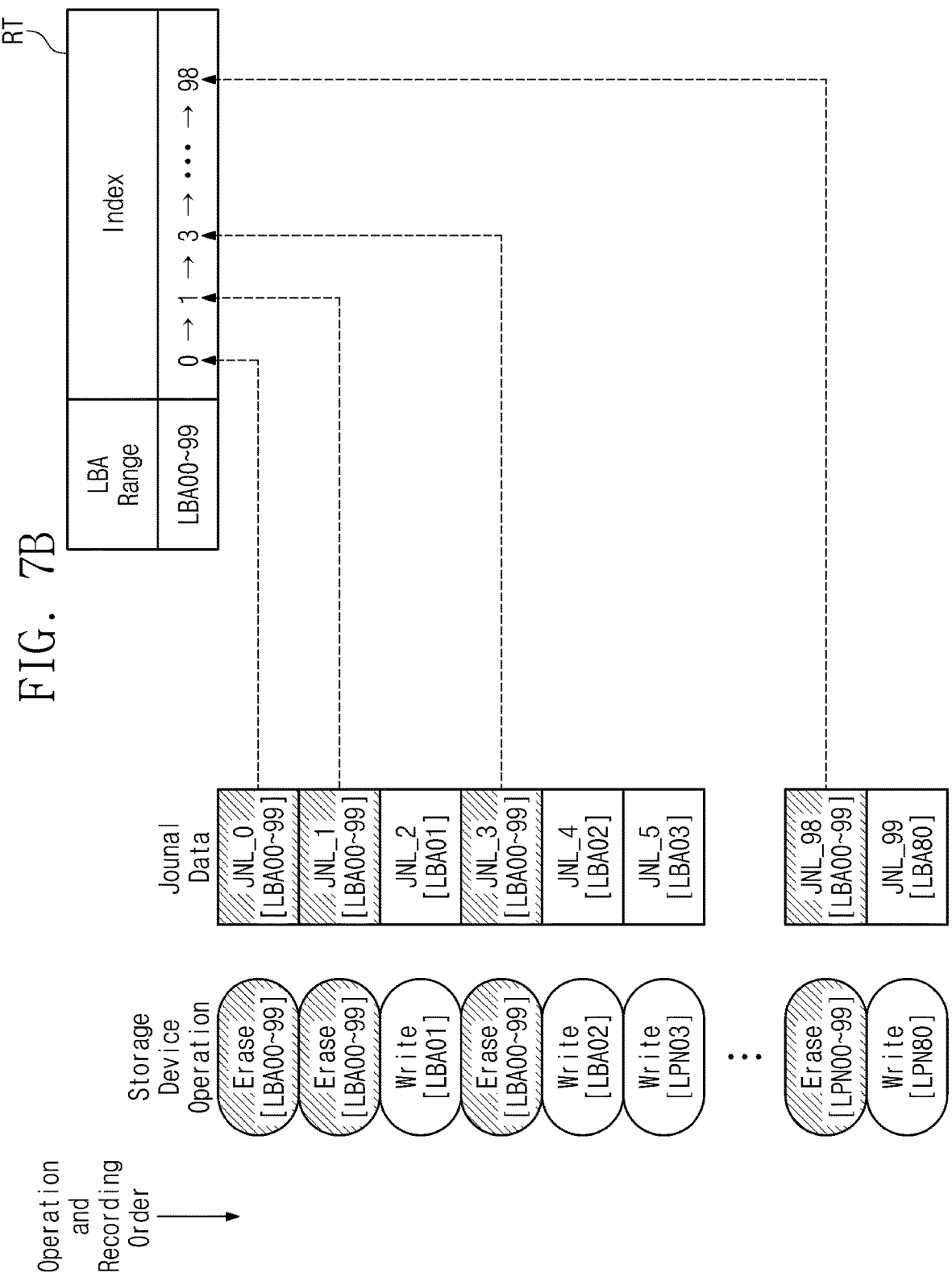

FIGS. 7A and 7B are a flowchart and a diagram, respectively, for describing a journal data generation method of a storage device of FIG. 1. In an embodiment, the journal data generation method that is described with reference to FIGS. 7A and 7B may be performed by the journal manager 111 of FIG. 5.

Referring to FIGS. 1, 5, 7A, and 7B, in operation JS110, the storage device 100 may perform various operations. For example, the storage device 100 may perform various operations (e.g., a read operation, a write operation, and an erase operation) depending on an explicit request of the host 11. Alternatively or additionally, the storage device 100 may perform various operations (e.g., a garbage collection operation) depending on an internal policy.

In operation JS120, the storage device 100 may determine whether the update of the meta data MD is required. Operation JS120 is similar to operation JS12 of FIG. 3A, and thus, additional description will be omitted to avoid redundancy. When the update of the meta data MD is not required, the storage device 100 may not generate the journal data JNL.

In operation JS130, the storage device 100 may determine whether the update of the meta data MD is the range update. For example, the journal manager 111 of the storage controller 110 may determine whether the journal data JNL are associated with the range update.

When the update of the meta data MD is the range update (or when the journal data JNL are associated with the range update), in operation JS140, the storage device 100 may update the range table RT. For example, the journal manager 111 of the storage controller 110 may update the range table RT based on the index of the journal data JNL associated with the range update (e.g., information about the order of generating or recording the journal data JNL).

In operation JS150, the storage device 100 may record the journal data JNL at the journal memory 111b. In an embodiment, when the update of the meta data MD is not the range update, the storage device 100 may record the journal data RT at the journal data JNL without updating the range table RT.

In detail, as illustrated in FIG. 7B, the storage device 100 may perform various operations. The plurality of journal data JNL_0 to JNL_99 may be generated by the operation of the storage device 100. The plurality of journal data JNL_0 to JNL_99 may be sequentially recorded at the journal memory 111b. The operation of the storage device 100 and the journal data JNL_0 to JNL_99 illustrated in FIG. 7B are similar to those described with reference to FIG. 3B, and thus, additional description will be omitted to avoid redundancy.

In an embodiment, some JNL_0, JNL_1, JNL_3, and JNL_98 of the plurality of journal data JNL_0 to JNL_99 may be associated with the range update. In this case, the journal manager 111 may update the range table RT based on the journal data JNL_0, JNL_1, JNL_3, and JNL_98 associated with the range update.

For example, the 0th journal data JNL_0 may be generated by the erase operation of the storage device 100. The 0th journal data JNL_0 may be associated with the range update, and the journal manager 111 may set an index corresponding to the range of the 0th to 99th logical block addresses (LBA00 to LBA99) to an index (e.g., "0") of the 0th journal data JNL_0 in the range table RT.

Afterwards, the 1st journal data JNL_1 may be generated by the erase operation of the storage device 100. The 1st journal data JNL_1 may be associated with the range update, and the journal manager 111 may update in the range table RT such that the index corresponding to the range of the 0th to 99th logical block addresses (LBA00 to LBA99) is set to an index (e.g., "1") of the 1st journal data JNL_1.

Afterwards, the 3rd journal data JNL_3 may be generated by the erase operation of the storage device 100. The 3rd journal data JNL_3 may be associated with the range update, and the journal manager 111 may update the range table RT such that an index corresponding to the range of the 0th to 99th logical block addresses LBA00 to LBA99 is set to an index (e.g., "3") of the 3rd journal data JNL_3.

Afterwards, the 98th journal data JNL_98 may be generated by the erase operation of the storage device 100. The 98th journal data JNL_98 may be associated with the range update, and the journal manager 111 may update an index corresponding to the range of the 0th to 99th logical block addresses LBA00 to LBA99 so as to be set to an index (e.g., "98") of the 98th journal data JNL_98

Finally, when the 0th to 99th journal data JNL_0 to JNL_99 are recorded at the journal memory 111b, the index corresponding to the 0th to 99th logical block addresses (LBA00 to LBA99) may be set to "98" in the range table RT.

As described above, according to an embodiment of the present disclosure, the journal manager 111 may generate the journal data JNL based on the operation unit of the storage device 100 and may record the generated journal data JNL at the journal memory 111b. In this case, as described with reference to FIGS. 3A and 3B, the time taken to generate and record the journal data JNL may be shortened, and thus, the operation processing time of the storage device 100 may be shortened.

Figure 8:
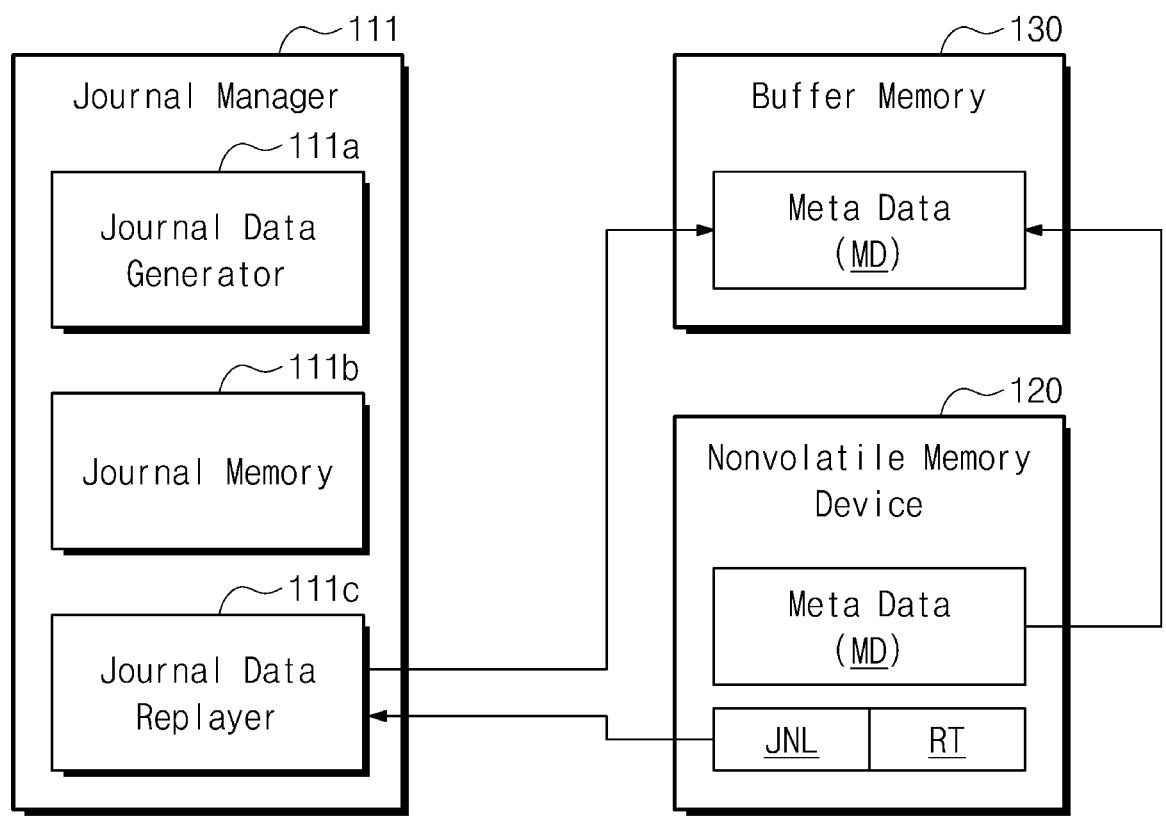
FIG. 8 illustrates how a journal manager of FIG. 1 replays journal data.

FIG. 8 is a diagram for describing how a journal manager of FIG. 1 replays journal data. Additional description associated with the components described above will be omitted to avoid redundancy.

Referring to FIGS. 1, 5, and 8, the journal manager 111 may restore the meta data MD based on the journal data JNL and the range table RT stored in the nonvolatile memory device 120. For example, when the storage device 100 is powered on after the sudden power-off event, the meta data MD present in the nonvolatile memory device 120 may be loaded to the buffer memory 130. In this case, the meta data MD loaded to the buffer memory 130 may not be the latest version. The journal manager 111 may update the meta data MD loaded to the buffer memory 130 based on the journal data JNL and the range table RT present in the nonvolatile memory device 120, so as to be changed to the latest version.

In this case, the journal data replayer 111c of the journal manager 111 may determine whether the journal data JNL are associated with the range update. When the journal data JNL are associated with the range update, the journal manager 111 may determine whether the index of the journal data JNL is matched with the index present in the range table RT.

If the index of the journal data JNL is not matched with the index present in the range table RT, the journal data JNL are not the latest journal data among the journal data JNL associated with the range update. In this case, the journal data replayer 111c may skip the replay operation for the journal data JNL.

In contrast, if the index of the journal data JNL is matched with the index present in the range table RT, the journal data JNL are the latest journal data among the journal data JNL associated with the range update. In this case, the journal data replayer 111c may update the meta data MD by performing the replay operation on the journal data JNL.

Figure 9:
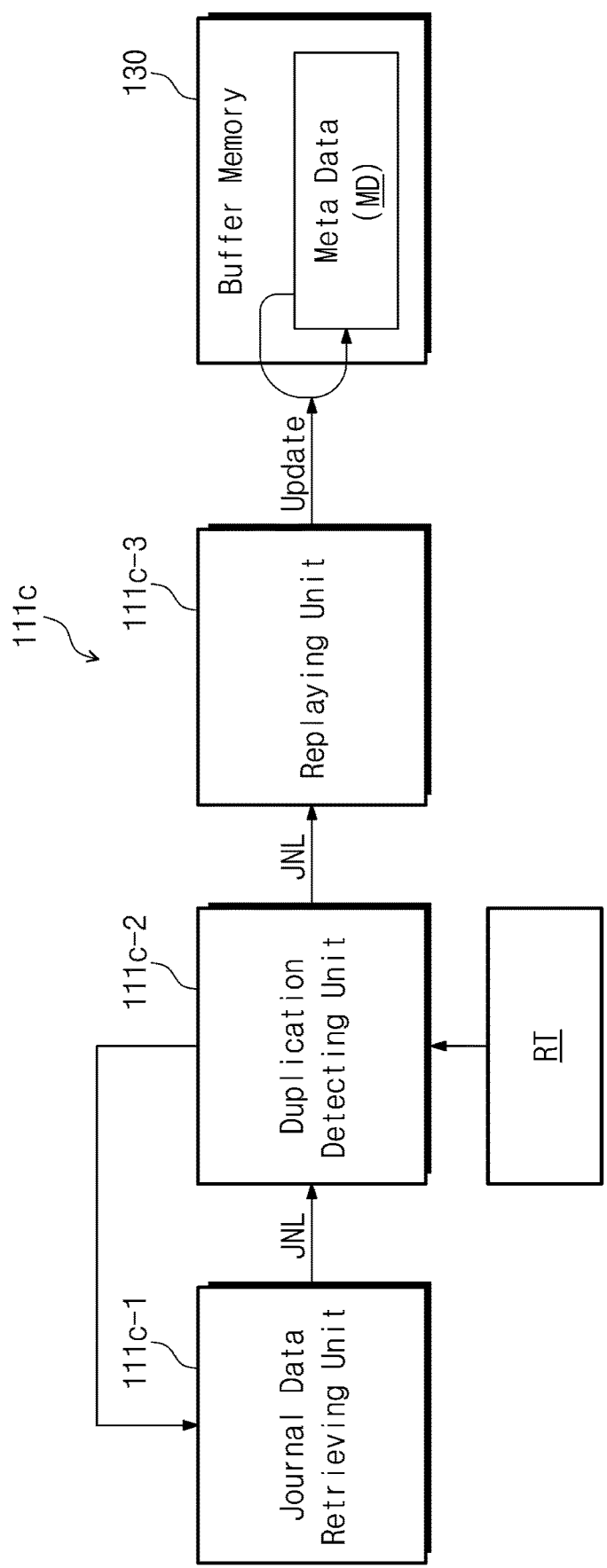
FIG. 9 illustrates a journal data replayer of FIG. 8.

FIG. 9 is a block diagram illustrating a journal data replayer of FIG. 8. Referring to FIGS. 8 and 9, the journal data replayer 111c may include a journal data retrieving unit 111c-1, a duplication detecting unit 111c-2, and a replaying unit 111c-3. The journal data retrieving unit 111c-1 may be configured to sequentially retrieve the journal data JNL stored in the nonvolatile memory device 120 from the nonvolatile memory device 120.

The duplication detecting unit 111c-2 may receive the journal data JNL from the journal data retrieving unit 111c-1. The duplication detecting unit 111c-2 may determine whether the journal data JNL are duplicated (or whether the journal data JNL are the latest journal data), based on the range table RT. For example, the duplication detecting unit 111c-2 may determine whether the journal data JNL are associated with the range update. When the journal data JNL are associated with the range update, the duplication detecting unit 111c-2 may determine whether the index of the journal data JNL is matched with the index present in the range table RT. When the index of the journal data JNL is not matched with the index present in the range table RT, the duplication detecting unit 111c-2 may not transfer the journal data JNL to the replaying unit 111c-3 and may receive next journal data from the journal data retrieving unit 111c-1. As such, the replay operation for the journal data JNL may be skipped.

When the index of the journal data JNL is matched with the index present in the range table RT or when the journal data JNL are not associated with the range update, the duplication detecting unit 111c-2 may transfer the journal data JNL to the replaying unit 111c-3. The replaying unit 111c-3 may update the meta data MD by performing the replay operation on the journal data JNL received from the duplication detecting unit 111c-2.

Figure 10A:
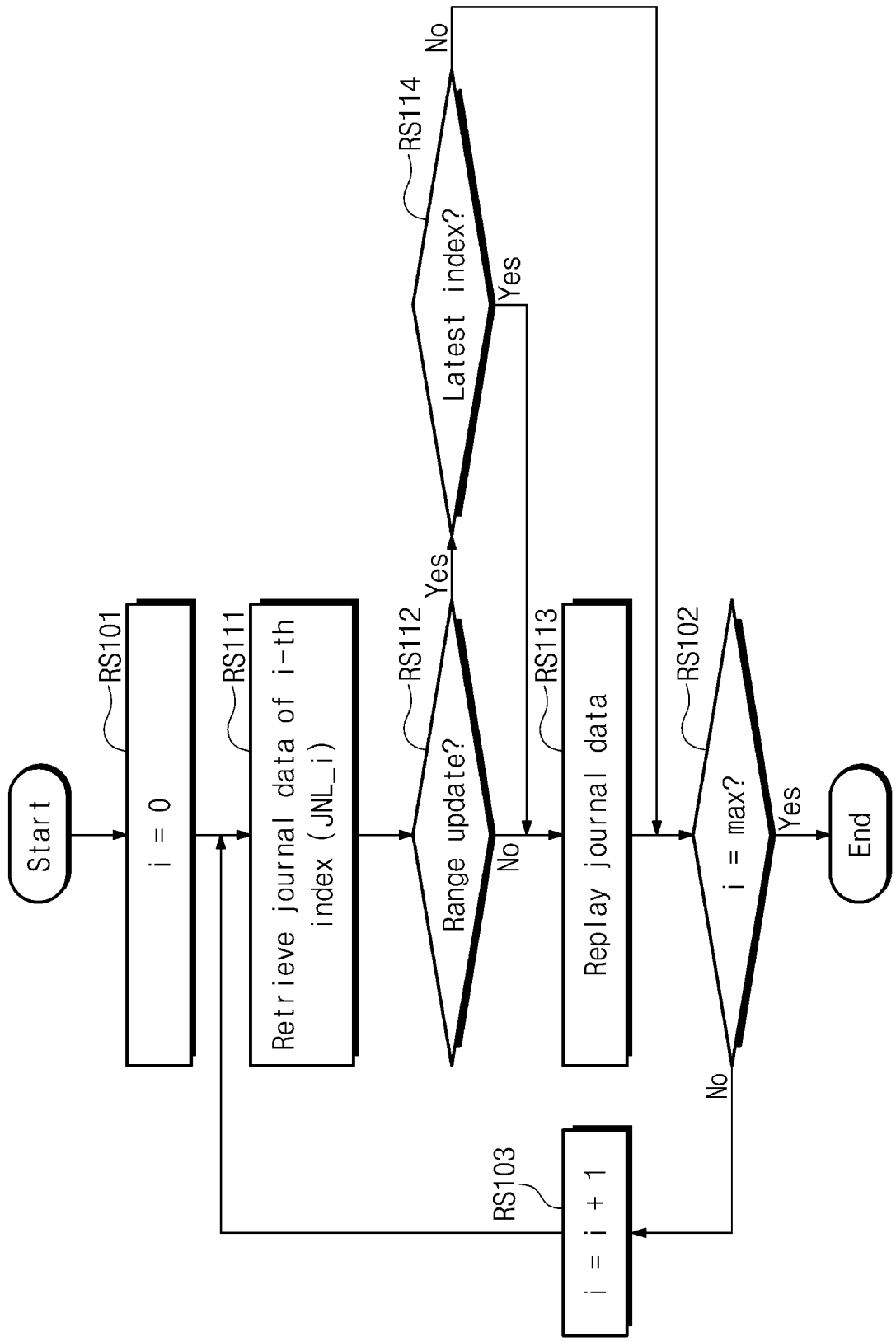
FIG. 10A illustrates an operation in which a storage device of FIG. 1 replays journal data.
Figure 10B:
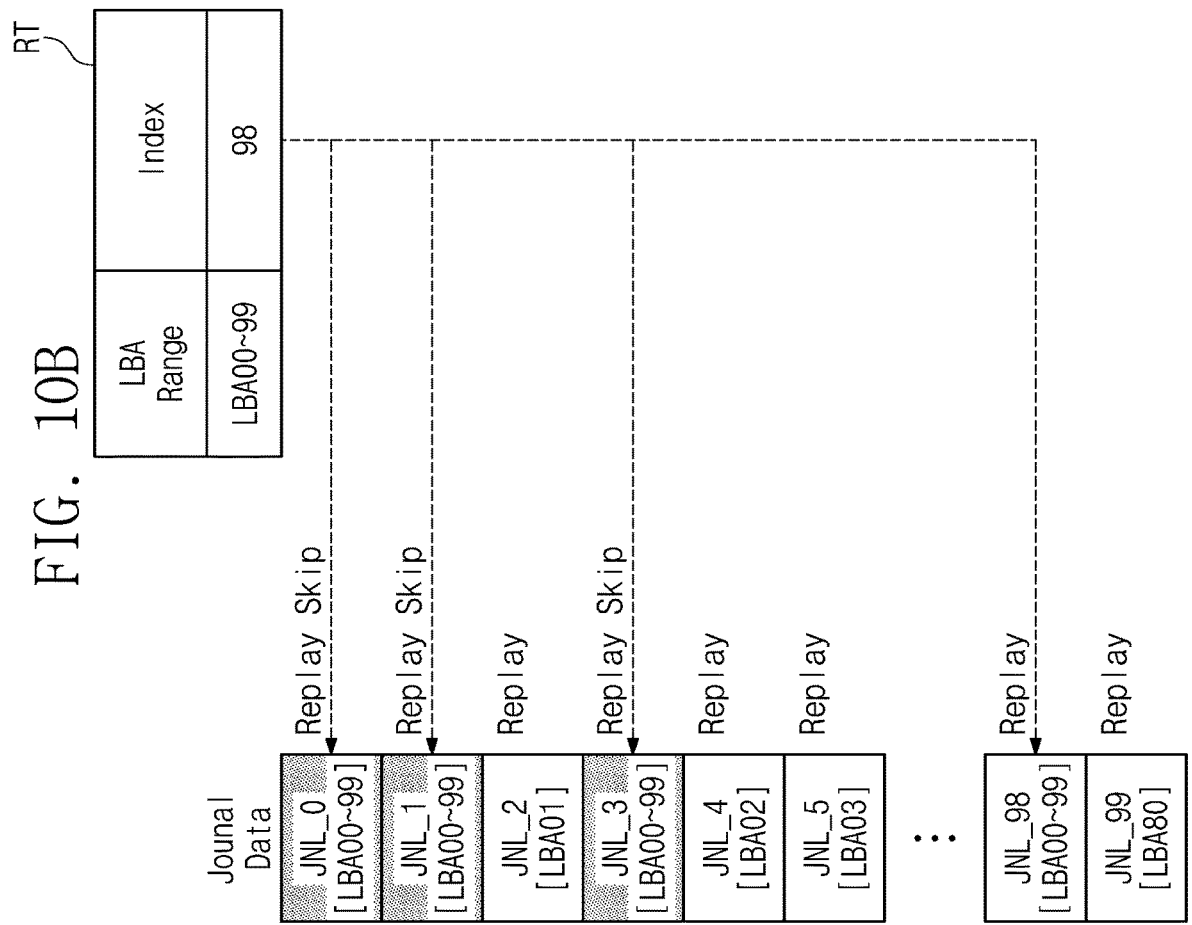
FIG. 10B illustrates an operation according to the flowchart of FIG. 10A.

FIG. 10A is a flowchart illustrating an operation in which a storage device of FIG. 1 replays journal data. FIG. 10B is a diagram for describing an operation according to the flowchart of FIG. 10A.

In an embodiment, the replay operation according to the flowchart of FIG. 10A may be performed by the journal manager of FIG. 8 and may be performed in a specific environment. For example, the replay operation according to the flowchart of FIG. 10A may be performed after the power-on of the storage system 10 for the purpose of updating the meta data MD so as to be changed to the latest version. In this case, the journal data JNL may be provided from the nonvolatile memory device 120 or the buffer memory 130.

Alternatively or additionally, the replay operation according to the flowchart of FIG. 10A may be performed in the situation where the journal memory 111b is full, such that the entries of the journal memory 111b are secured. In this case, the journal data JNL may be provided from the journal memory 111b.

Referring to FIGS. 1, 8, 10A, and 10B, in operation RS101, a variable "i" is set to "0". In an embodiment, the variable "i" is for describing the iterative replay operation of the journal manager 111 and indicates the index of the journal data JNL. However, the present disclosure is not limited thereto.

In operation RS111, the journal manager 111 may retrieve the i-th journal data JNL_i. For example, the journal manager 111 may retrieve the i-th journal data JNL_i among the journal data JNL stored in the nonvolatile memory device 120 or the buffer memory 130.

In operation RS112, the journal manager 111 may determine whether the i-th journal data JNL_i are associated with the range update. For example, the journal manager 111 may determine whether the i-th journal data JNL_i indicate the update of the meta data MD corresponding to a plurality of logical block addresses.

When the i-th journal data JNL_i are not associated with the range update, in operation RS113, the journal manager 111 may perform the replay operation on the i-th journal data JNL_i.

In contrast, when the i-th journal data JNL_i are associated with the range update, in operation RS114, the journal manager 111 may determine whether the index of the i-th journal data JNL_i is the latest index. For example, the range table RT may include index information (i.e., the latest index information) of the latest journal data among a plurality of journal data associated with the range update. The journal manager 111 may determine whether the index of the i-th journal data JNL_i is matched with the latest index of the range table RT.

When the index of the i-th journal data JNL_i is matched with the latest index of the range table RT, (that is, when the i-th journal data JNL_i are associated with the range update and are the latest journal data,) in operation JS113, the journal manager 111 may perform the replay operation on the i-th journal data JNL_i.

In contrast, when the index of the i-th journal data JNL_i is not matched with the latest index of the range table RT, that is, when the i-th journal data JNL_i are associated with the range update but are not the latest journal data, the journal manager 111 may skip the replay operation for the i-th journal data JNL_i.

Afterwards, in operation RS102, whether the variable "i" is the maximum value is determined. That the variable "i" is the maximum value means that all the journal data are processed. In this case, the replay operation for the journal data JNL ends.

That the variable "i" is not the maximum value means that journal data to be processed (or not processed) exist. In this case, in operation RS103, the variable "i" increases as much as "1", and the journal manager 111 returns to operation RS111.

In detail, as illustrated in FIG. 10B, the plurality of journal data JNL_0 to JNL_99 may be managed as journal data. The journal manager 111 may sequentially perform the replay operation for each of the journal data JNL_0 to JNL_99.

In this case, when journal data are associated with the range update, the journal manager 111 may selectively skip the replay operation for the journal data based on the index of the journal data and the latest index of the range table RT. For example, the 0th, 1st, 3rd, and 98th journal data JNL_0, JNL_1, JNL_3, and JNL_98 may be associated with the update (i.e., range update) of the meta data MD corresponding to the 0th to 99th logical block addresses (LBA00 to LBA99). In this case, because the indexes (i.e., 0, 1, and 3) of the 0th, 1st, and 3rd journal data JNL_0, JNL_1, and JNL_3 are not matched with the index information (i.e., 98) included in the range table RT, the journal manager 111 skips the replay operation for the 0th, 1st, and 3rd journal data JNL_0, JNL_1, and JNL_3.

In contrast, because the index (i.e., 98) of the 98th journal data JNL_98 are matched with the index information (i.e., 98) included in the range table RT, the journal manager 111 may perform the replay operation on the 98th journal data JNL_98.

In an embodiment, because the remaining journal data (e.g., JNL_2, JNL_4, JNL_5, JNL_99) are not associated with the range update, the journal manager 111 may replay the remaining journal data (e.g., JNL_2, JNL_4, JNL_5, . . . , JNL_99).

In an embodiment, as described above, even though the replay operation for some journal data (e.g., JNL_0, JNL_1, and JNL_3) is skipped, the final version of the meta data MD may be identically maintained. For example, when the replay operation is sequentially perform on the plurality of journal data JNL_0 to JNL_99, by the replay operation for the 98th journal data JNL_98, the meta data MD corresponding to the 0th to 99th logical block addresses (LBA00 to LBA99) may be newly updated regardless of the previous replay or update operation. That is, even though there is skipped the replay operation for the 98th journal data JNL_98, that is, the replay operation for journal data associated with the range update, which are generated or recorded prior to the latest journal data associated with the range update. Finally, the meta data MD may be changed to the latest version through the replay operation for the 98th journal data JNL_98, that is, the replay operation for the latest journal data associated with the range update. As described above, as the replay operation for some journal data (e.g., JNL_0, JNL_1, and JNL_3) is skipped, a time taken to replay journal data may decrease.

Figure 11A:
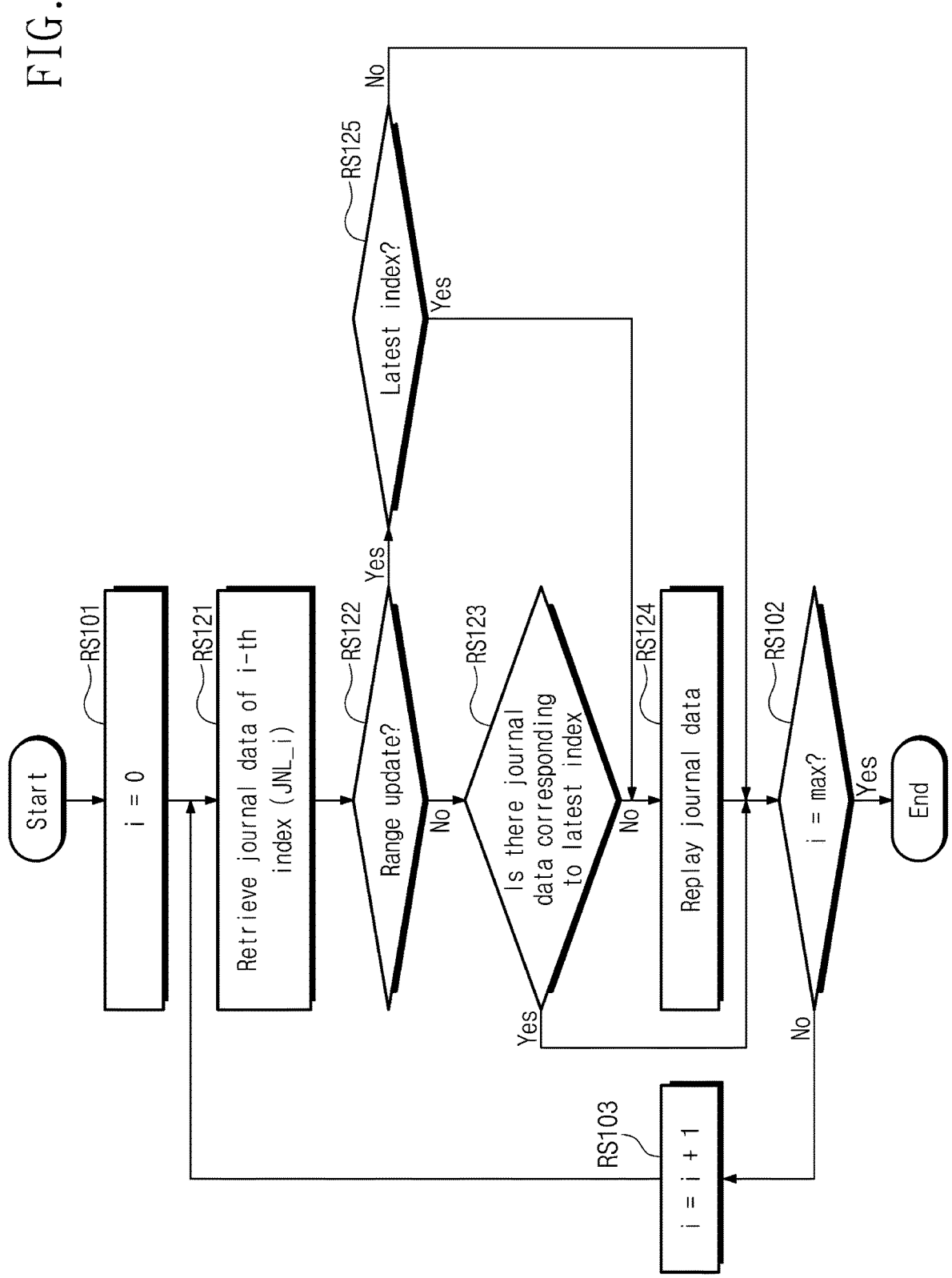
FIG. 11A illustrates an operation in which a storage device of FIG. 1 replays journal data.
Figure 11B:
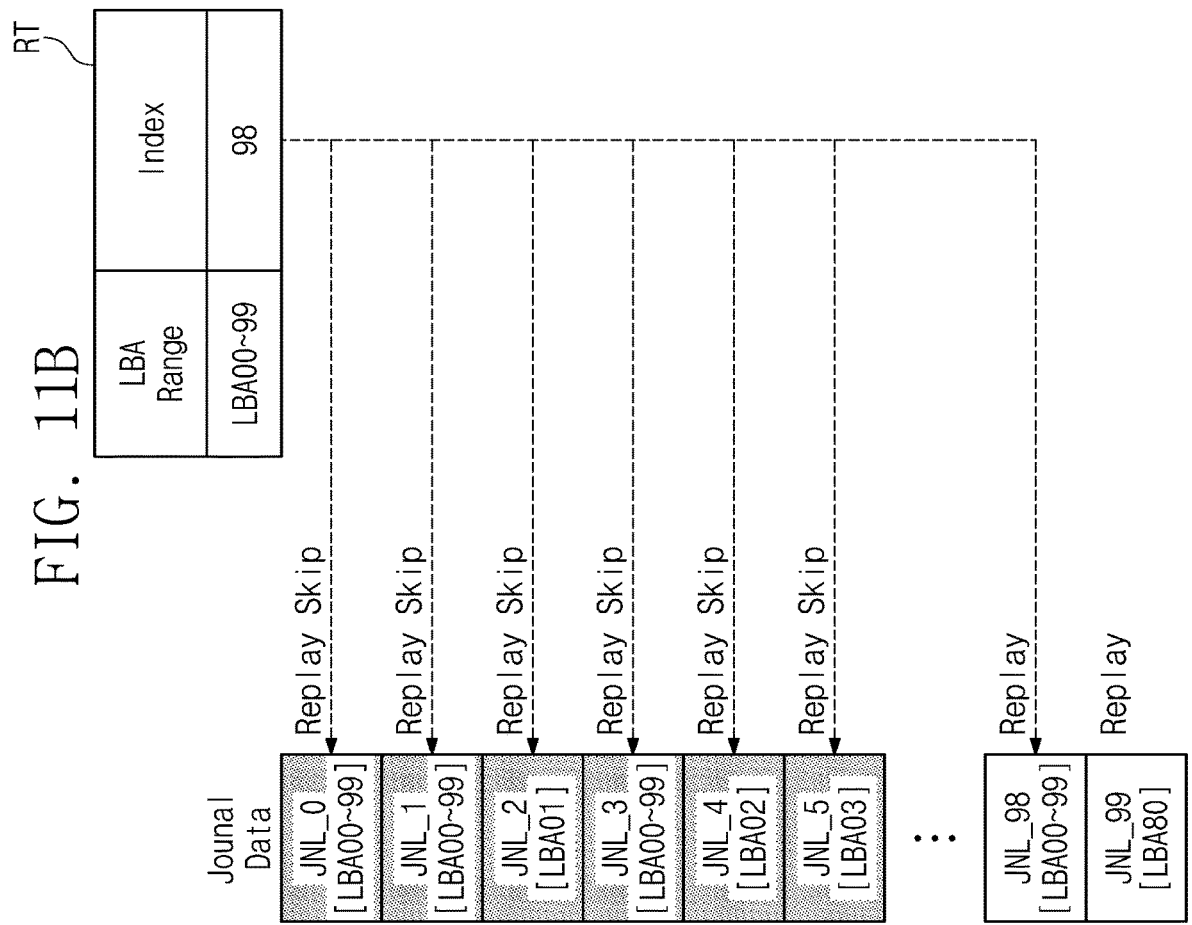
FIG. 11B illustrates an operation according to the flowchart of FIG. 11A.

FIG. 11A is a flowchart illustrating an operation in which a storage device of FIG. 1 replays journal data. FIG. 11B is a diagram for describing an operation according to the flowchart of FIG. 11A. The operation according to the flowchart of FIG. 11A will be performed by the journal manager of FIG. 8. Additional description associated with the components described above will be omitted to avoid redundancy.

Referring to FIGS. 1, 8, 11A, and 11B, in operation RS101, a variable "i" is set to "0". The journal manager 111 may perform operation RS121 and operation RS122. Operation RS121 and operations RS122 may be similar to operation RS111 and operation RS112 of FIG. 10A.

When the i-th journal data JNL_i are associated with the range update, in operation RS125, the journal manager 111 may determine whether the index of the i-th journal data JNL_i is the latest index. When the index of the i-th journal data JNL_i is the latest index, in operation RS124, the journal manager 111 performs the replay operation on the i-th journal data JNL_i. When the index of the i-th journal data JNL_i is not the latest index, the journal manager 111 skips the replay operation for the i-th journal data JNL_i. Operation RS125 and operations RS124 may be similar to operation RS114 and operation RS113 of FIG. 10A.

When the i-th journal data JNL_i are not associated with the range update, in operation RS123, the journal manager 111 may determine whether journal data corresponding to the latest index exist. When journal data corresponding to the latest index do not exist, the journal manager 111 may perform operation RS124. When journal data corresponding to the latest index exist, the journal manager 111 may skip operation RS124.

For example, as illustrated in FIG. 11B, the plurality of journal data JNL_0 to JNL_99 may be managed. In this case, the 0th, 1st, 3rd, and 98th journal data JNL_0, JNL_1, JNL_3, and JNL_98 may be associated with the range update, and the replay operation for the 0th, 1st, and 3rd journal data JNL_0, JNL_1, and JNL_3 may be skipped based on the range table RT.

The 2nd journal data JNL_2 may be associated with the update of the meta data MD corresponding to the first logical block address LBA01. That is, the 2nd journal data JNL_2 may not be associated with the range update. In this case, because journal data (i.e., the 98th journal data JNL_98) corresponding to the latest index included in the range table RT still exist, the journal manager 111 may skip the replay operation for the 2nd journal data JNL_2.

Likewise, the 4th journal data JNL_4 are associated with the update of the meta data MD corresponding to the 2nd logical block address LBA02, and the 5th journal data JNL_5 are associated with the update of the meta data MD corresponding to the 3rd logical block address LBA03. In this case, because journal data (i.e., the 98th journal data JNL_98) corresponding to the latest index included in the range table RT still exist, the journal manager 111 may skip the replay operation for the 4th and 5th journal data JNL_4 and JNL_5.

The 99th journal data JNL_99 may be associated with the update of the meta data MD corresponding to the 80th logical block address LBA_80. In this when, because journal data (i.e., the 98th journal data JNL_98) corresponding to the latest index included in the range table RT are already processed, the journal manager 111 may perform the replay operation on the 99th journal data JNL_99.

As a result, even though the replay operation for journal data before the latest journal data from among journal data associated with the range update is skipped, the range update may be performed through the replay operation for the latest journal data among the journal data associated with the range update, and thus, the meta data MD finally restored may be identically maintained.

Figure 12B:
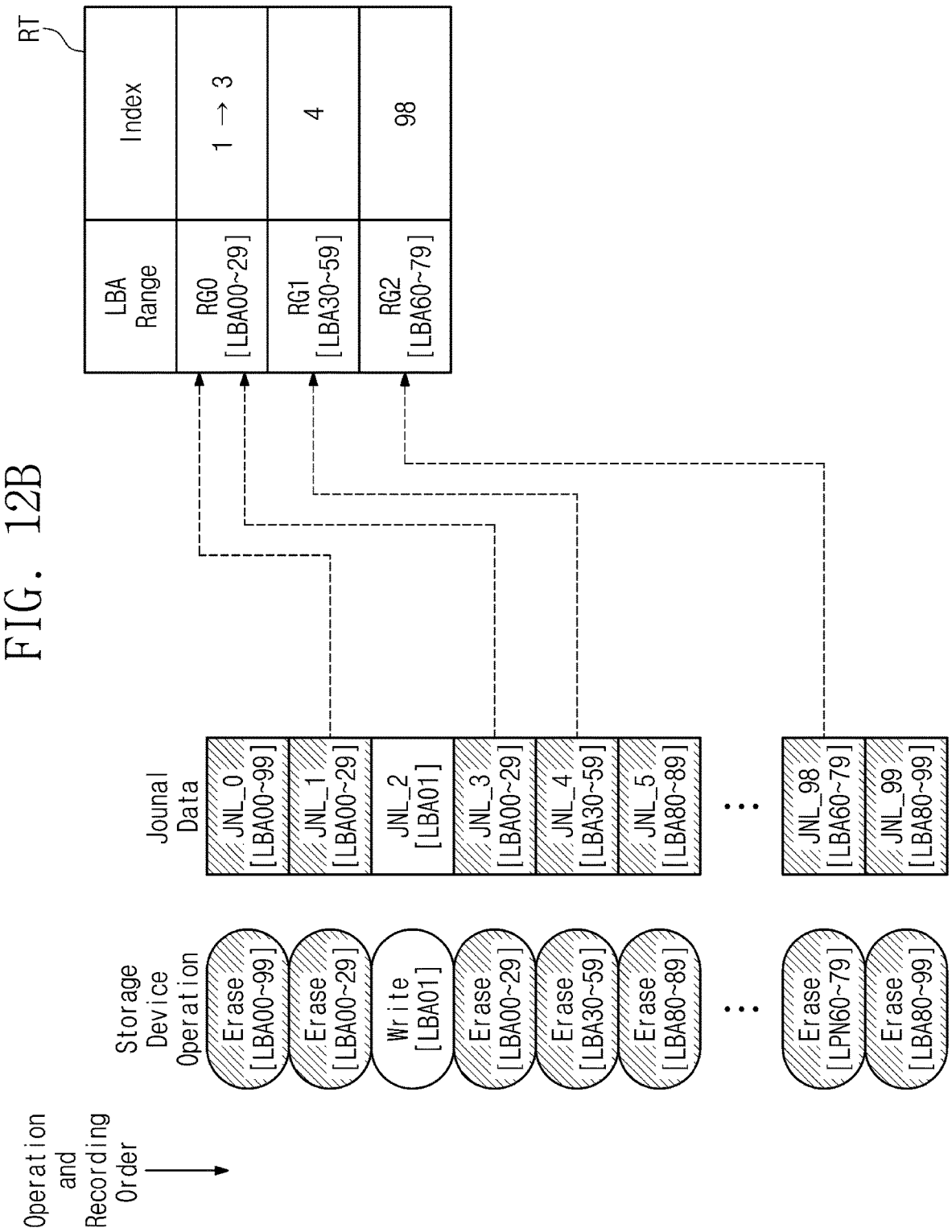
FIG. 12B illustrates an operation according to the flowchart of FIG. 12A.

FIG. 12A is a flowchart illustrating a journal data generation method of a storage device of FIG. 1. FIG. 12B is a diagram for describing an operation according to the flowchart of FIG. 12A. Referring to FIGS. 1, 5, 12A, and 12B, the storage device 100 may perform operation JS210 to operation JS230. Operation JS210 to operation JS230 are similar to operation JS110 to operation JS130 of FIG. 7A, and thus, additional description will be omitted to avoid redundancy.

When the update of the meta data MD is not the range update, the storage device 100 performs operation JS260. Operation JS260 may be similar to operation JS150 of FIG. 7A.

When the update of the meta data MD is the range update, in operation JS240, the storage device 100 may determine whether a range of the range update is matched with at least one range group managed by the range table RT.

When the range is matched with the range group, in operation JS250, the storage device 100 may update the range table RT. Afterwards, the storage device 100 may perform operation JS260. When the range is not matched with the range group, the storage device 100 may perform operation JS260 without updating the range table RT.

In detail, as illustrated in FIG. 12B, the storage device 100 may sequentially perform the erase operation for the 0th to 99th logical block addresses LBA00 to LBA99, the erase operation for the 0th to 29th logical block addresses LBA00 to LBA29, the write operation for the first logical block address LBA01, the erase operation for the 0th to 29th logical block addresses (LBA00 to LBA29), the erase operation for the 30th to 59th logical block addresses LBA30 to LBA59, the erase operation for the 80th to 89th logical block addresses LBA80 to LBA89, the erase operation for the 60th to 79th logical block addresses LBA60 to LBA79, and the erase operation for the 80th to 99th logical block addresses LBA80 to LBA89. As such, the 0th to 99th journal data JNL_0 to JNL_99 may be generated and may be sequentially recorded at the journal memory 111b.

Unlike the description given with reference to FIG. 7B, in FIG. 12B, the range table RT may be configured to manage a plurality of range groups RG0, RG1, and RG2. For example, in the embodiment of FIG. 7B, the range table RT manages the 0th to 99th logical block addresses (LBA00 to LBA99) indicating the storage area of the storage device 100 by using one range group. In contrast, in an embodiment of FIG. 12B, the range table RT may manage at least some of the 0th to 99th logical block addresses LBA00 to LBA99 by using the plurality of range groups (e.g., RG0, RG1, and RG2).

In detail, the 0th to 29th logical block addresses LBA00 to LBA29 may be managed by using the 0th range group RG0; the 30th to 59th logical block addresses LBA30 to LBA59 may be managed by using the 1st range group RG1; the 60th to 79th logical block addresses LBA60 to LBA79 may be managed by using the 2nd range group RG2.

The journal manager 111 may update the range table RT based on a range of logical block addresses corresponding to each journal data. For example, first, the 0th journal data JNL_0 may be generated. The 0th journal data JNL_0 may correspond to the 0th to 99th logical block addresses (LBA00 to LBA99). In this case, a range group matched with the range of the 0th to 99th logical block addresses (LBA00 to LBA99) does not exist. In this case, the range table RT is not updated.

The 1st journal data JNL_1 may correspond to the 0th to 29th logical block addresses LBA00 to LBA29. In this case, the 0th to 29th logical block addresses LBA00 to LBA29 may correspond to the 0th range group RG0 of the range table RT. As such, the journal manager 111 may update the latest index of the 0th range group RG0 so as to be set to the index of the 1st journal data JNL_1, that is, "1". Because the 2nd journal data JNL_2 are not associated with the range update, the range table RT is not updated.

The 3rd journal data JNL_3 may correspond to the 0th to 29th logical block addresses LBA00 to LBA29. In this case, the 0th to 29th logical block addresses LBA00 to LBA29 may correspond to the 0th range group RG0 of the range table RT. As such, the journal manager 111 may update the latest index of the 0th range group RG0 so as to be set to the index of the 3rd journal data JNL_3, that is, "3".

The 4th journal data JNL_4 may correspond to the 30th to 59th logical block addresses LBA30 to LBA59. The 30th to 59th logical block addresses LBA30 to LBA59 may correspond to the 1st range group RG1 of the range table RT; in this case, the journal manager 111 may update the latest index of the 1st range group RG1 so as to be set to the index of the 4th journal data JNL_4, that is, "4".

The 5th journal data JNL_5 may correspond to the 80th to 89th logical block addresses LBA80 to LBA89, and a range group corresponding to the 80th to 89th logical block addresses LBA80 to LBA89 does not exist. Accordingly, the range table RT is not updated.

The 98th journal data JNL_98 may correspond to the 60th to 79th logical block addresses LBA60 to LBA79, and the 60th to 79th logical block addresses LBA60 to LBA79 may correspond to the 2nd range group RG2 of the range table RT. In this case, the journal manager 111 may update the latest index of the 2nd range group RG2 so as to be set to the index of the 98th journal data JNL_98, that is, "98".

Finally, the 99th journal data JNL_99 may correspond to the 80th to 99th logical block addresses LBA80 to LBA99, and a range group corresponding to the 80th to 99th logical block addresses LBA80 to LBA99 does not exist. Accordingly, the range table RT is not updated.

In an embodiment, the number of range groups managed by the range table RT or a logical block address range of each range group may be variously changed and modified.

Figure 13A:
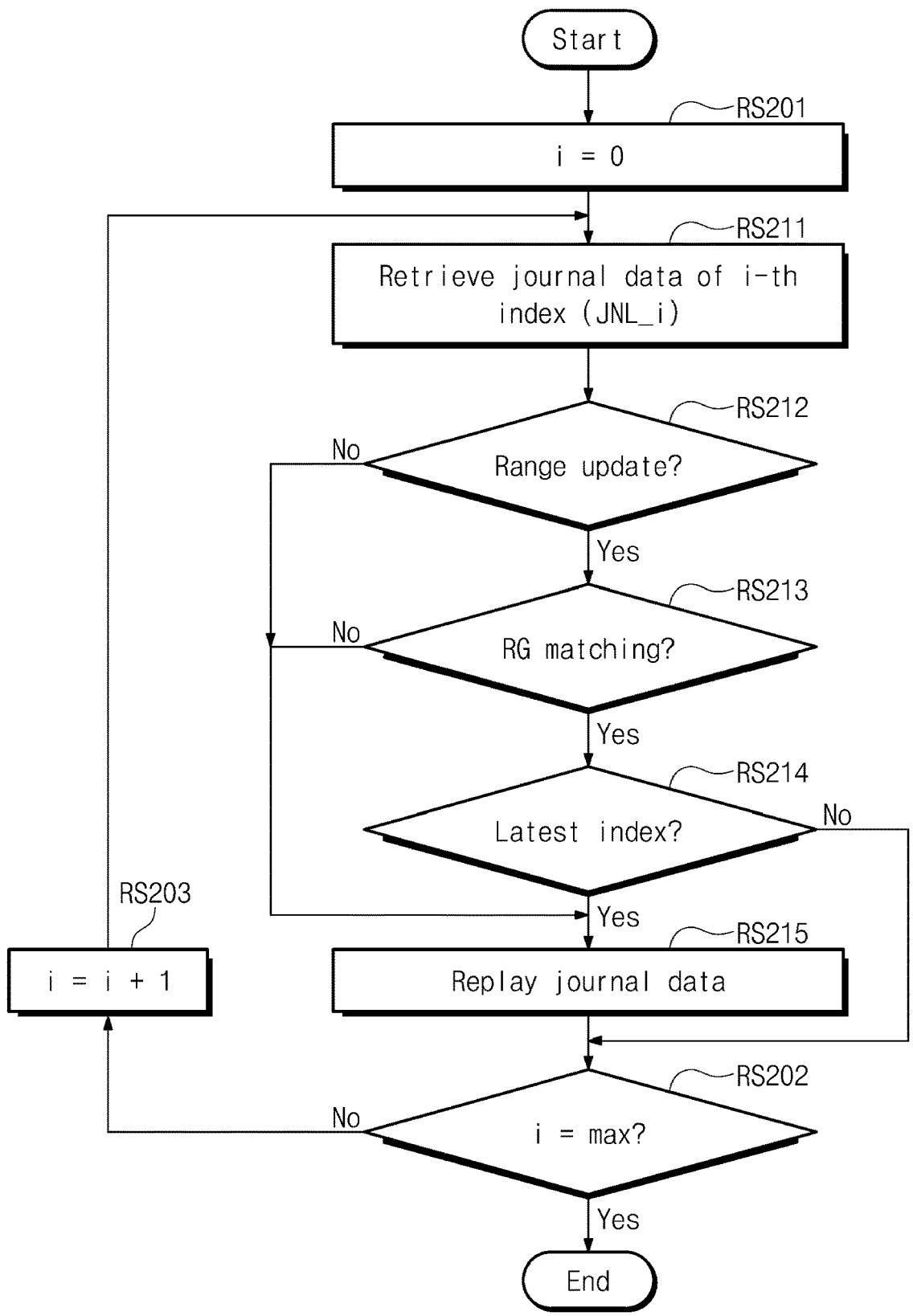
FIG. 13A illustrates an operation in which a storage device of FIG. 1 replays journal data.
Figure 13B:
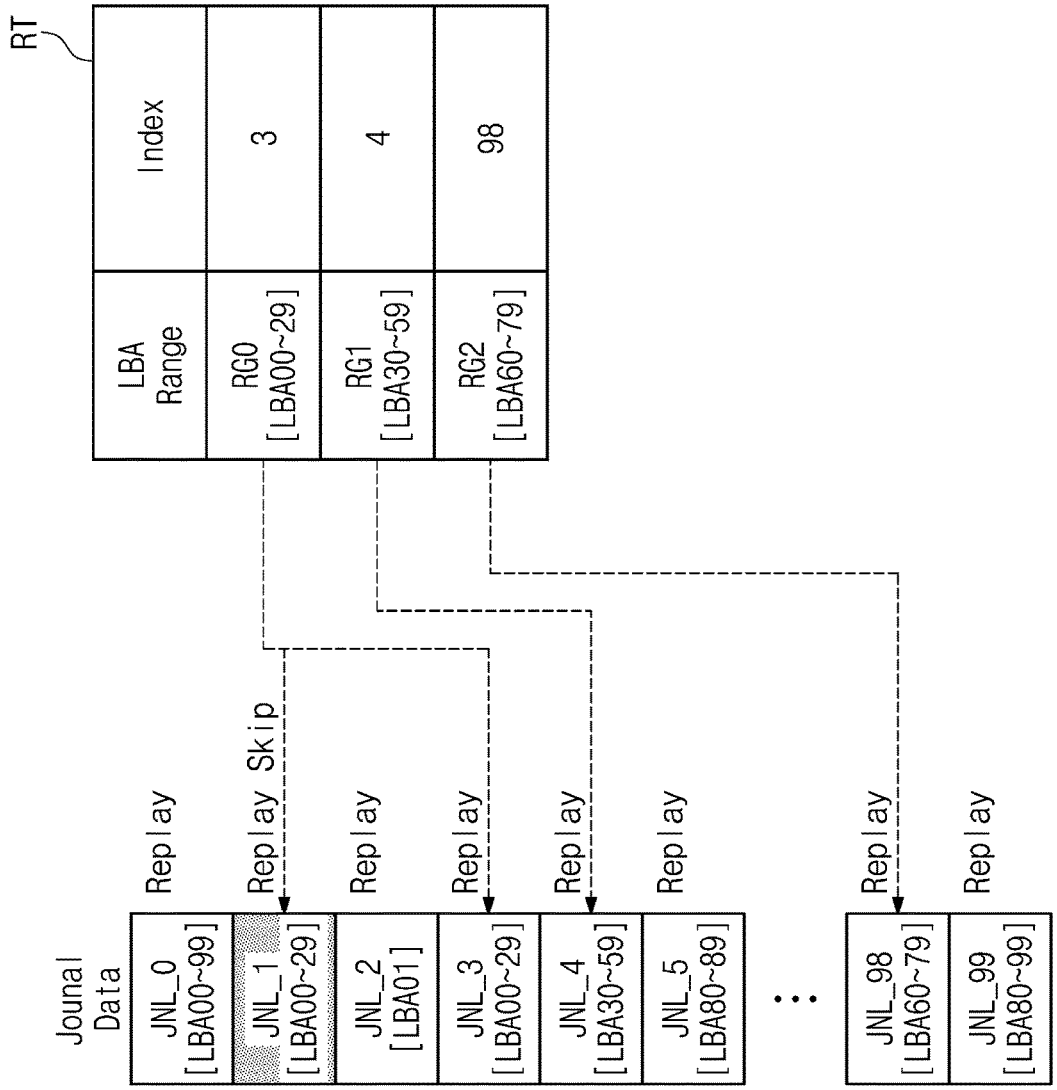
FIG. 13B illustrates an operation according to the flowchart of FIG. 13A.

FIG. 13A is a flowchart illustrating an operation in which a storage device of FIG. 1 replays journal data. FIG. 13B is a diagram for describing an operation according to the flowchart of FIG. 13A. In an embodiment, the operation according to the flowchart of FIG. 13A may be performed by the journal manager 111 of FIG. 8. In an embodiment, the operation according to the flowchart of FIG. 13A may be performed by using journal data recorded according to the method described with reference to FIGS. 12A and 12B and a range table updated according to the method.

Referring to FIGS. 1, 8, 13A, and 13B, in operation RS210, a variable "i" is set to "0". The journal manager 111 may perform operation RS211 and operation RS122. Operation RS211 and operations RS212 may be similar to operation RS111 and operation RS112 of FIG. 10A.

When the i-th journal data JNL_i are not associated with the range update, in operation JS215, the journal manager 111 performs the replay operation on the i-th journal data JNL_i. When the i-th journal data JNL_i are associated with the range update, in operation JS213, the journal manager 111 may determine whether a range of logical block addresses corresponding to the i-th journal data JNL_i is matched with any one of range groups managed in the range table RT.

When a range group matched with the range of the logical block addresses corresponding to the i-th journal data JNL_i is absent from the range table RT (i.e., No in operation RS213), in operation RS215, the journal manager 111 performs the replay operation on the i-th journal data JNL_i.

When the range group matched with the range of the logical block addresses corresponding to the i-th journal data JNL_i is present in the range table RT, in operation RS214, the journal manager 111 may determine whether the index of the i-th journal data JNL_i is the latest index. For example, the journal manager 111 may determine whether the latest index of the range group corresponding to the i-th journal data JNL_i is matched with the index of the i-th journal data JNL_i.

When the latest index of the range group corresponding to the i-th journal data JNL_i is matched with the index of the i-th journal data JNL_i, in operation RS215, the journal manager 111 performs the replay operation on the i-th journal data JNL_i. When the latest index of the range group corresponding to the i-th journal data JNL_i is not matched with the index of the i-th journal data JNL_i, the journal manager 111 may skip the replay operation for the i-th journal data JNL_i and may perform operation RS202.

In operation RS202, whether the variable "i" is the maximum value is determined. When the variable "i" is not the maximum value, in operation RS203, the variable "i" may increase as much as "1", and the journal manager 111 performs operation RS211.

In detail, as illustrated in FIG. 13B, the plurality of journal data JNL_0 to JNL_99 may be managed. The journal manager 111 may sequentially perform the replay operation for the plurality of journal data JNL_0 to JNL_99. In this case, the journal manager 111 may skip the replay operation for some journal data based on the operation method of FIG. 13A.

For example, the journal manager 111 may determine whether to replay the journal data JNL_0. In this case, the 0th journal data JNL_0 are associated with the range update, but a range group corresponding to an update range (i.e., LBA00 to LBA99) of the journal data JNL_0 is absent from the range table RT, the journal manager 111 performs the replay operation on the 0th journal data JNL_0.

Next, the journal manager 111 may determine whether to replay the 1st journal data JNL_1. In this case, the 1st journal data JNL_1 are associated with the range update, and the 0th range group RG0 corresponding to an update range (i.e., LBA00 to LBA29) of the 1st journal data JNL_1 is present in the range table RT; however, because the index of the 1st journal data JNL_1 is not the latest index, the journal manager 111 may skip the replay operation for the 1st journal data JNL1.

Likewise, the journal manager 111 may determine whether to perform the replay operation for each of the 2nd to 99th journal data JNL_2 to JNL_99. In this case, because the 2nd journal data JNL_2 are not associated with the range update, the replay operation is performed on the 2nd journal data JNL_2. Because the 3rd journal data JNL_3 are associated with the range update, the 0th range group RG0 corresponding to the 3rd journal data JNL_3 is present in the range table RT, and the index of the 3rd journal data JNL_3 is the latest index, the replay operation is performed on the 3rd journal data JNL_3.

Because the 4th journal data JNL_4 are associated with the range update, the 1st range group RG1 corresponding to the 4th journal data JNL_4 is present in the range table RT, and the index of the 4th journal data JNL_4 is the latest index, the replay operation is performed on the 4th journal data JNL_4. Because the 5th journal data JNL_5 are associated with the range update and the range group RG corresponding to the 5th journal data JNL_5 is absent from the range table RT, the replay operation is performed on the 5th journal data JNL_5.

Because the 98th journal data JNL_98 are associated with the range update, the 2nd range group RG2 corresponding to the 98th journal data JNL_98 is present in the range table RT, and the index of the 98th journal data JNL_98 is the latest index, the replay operation is performed on the 98th journal data JNL_98.

Because the 99th journal data JNL_99 are associated with the range update but the range group RG corresponding to the 99th journal data JNL_99 is absent from the range table RT, the replay operation is performed on the 99th journal data JNL_99.

As described above, the journal manager 111 may skip the replay operation for some journal data depending on whether the journal data are duplicated.

Figure 14A:
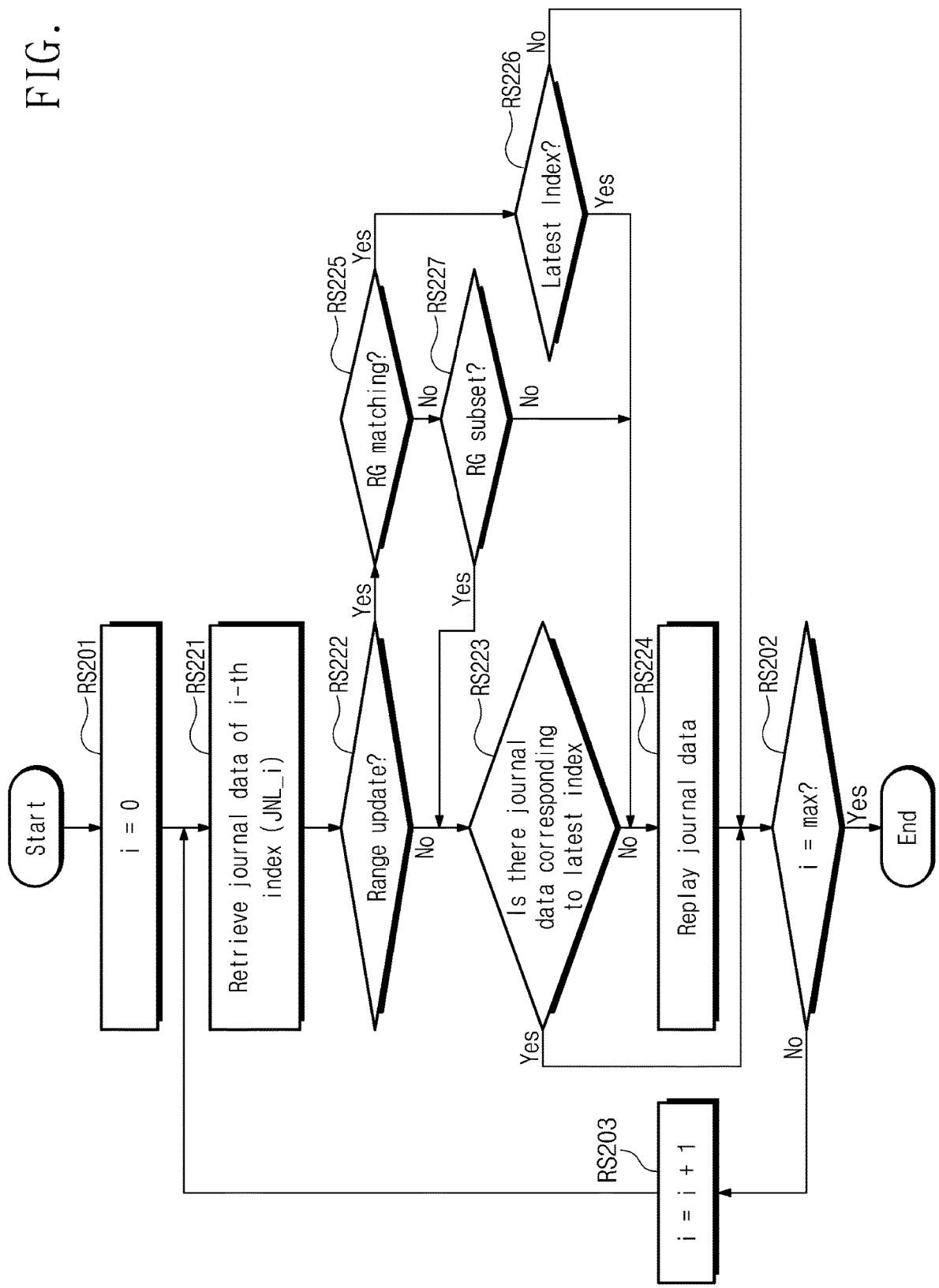
FIG. 14A illustrates an operation in which a journal manager of FIG. 8 replays journal data.
Figure 14B:
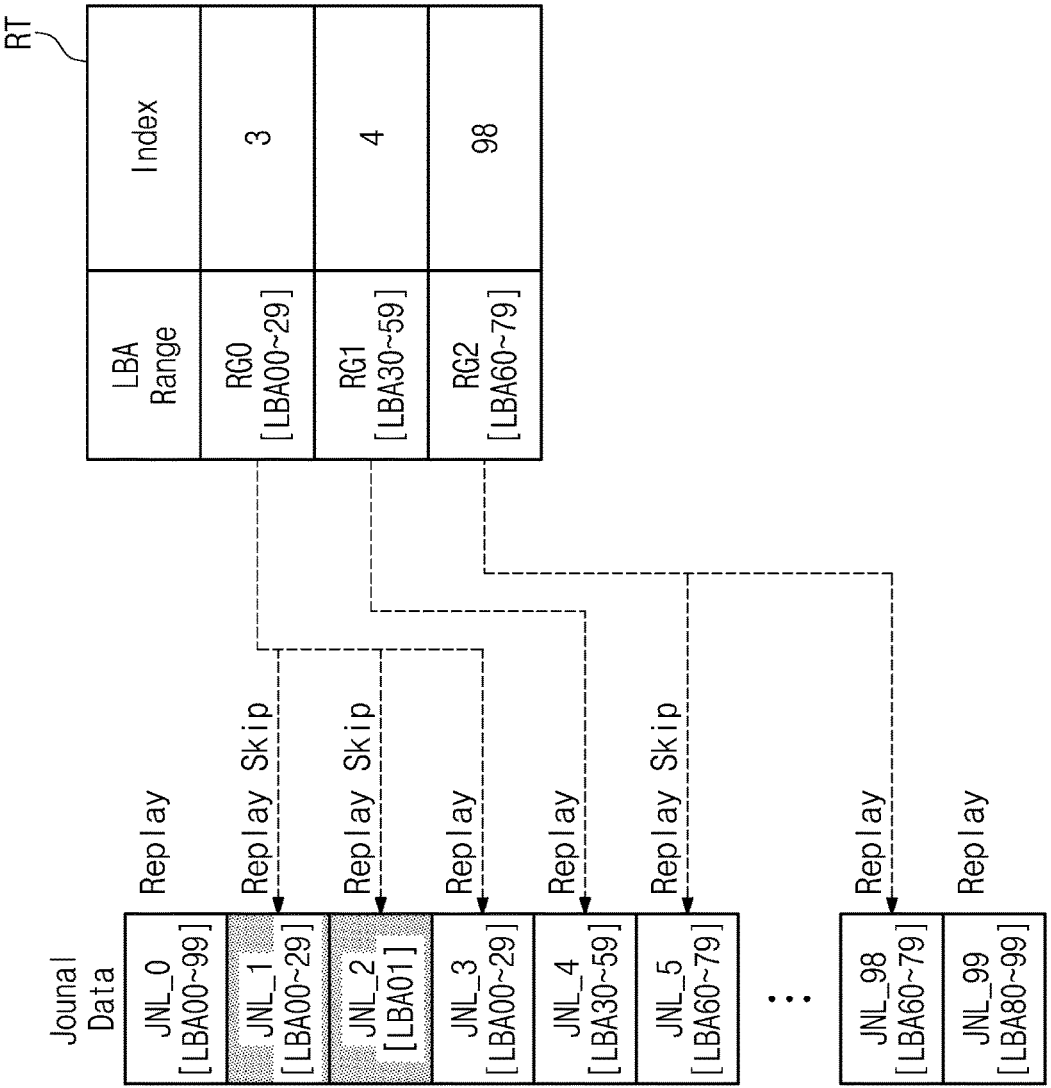
FIG. 14B illustrates an operation according to the flowchart of FIG. 14A.

FIG. 14A is a flowchart illustrating an operation in which a journal manager of FIG. 8 replays journal data. FIG. 14B is a diagram for describing an operation according to the flowchart of FIG. 14A. In an embodiment, the operation according to the flowchart of FIG. 14A may be performed by using journal data recorded according to the method described with reference to FIGS. 12A and 12B and a range table updated according to the method.

Referring to FIGS. 1, 8, 14A, and 14B, in operation RS201, a variable "i" is set to "0". Afterwards, the journal manager 111 may perform operation RS221 and operation RS222. Operation RS221 and operations RS222 may be similar to operation RS211 and operation RS212 of FIG. 13A.

When the journal data JNL are not associated with the range update, in operation RS223, the journal manager 111 may determine whether journal data corresponding to the latest index exist. That 'journal data corresponding to the latest index exist' means that the replay operation for the current journal data JNL is unnecessary because the meta data MD are newly updated as the replay operation is performed on the journal data corresponding to the latest index. In this case, the journal manager 111 may skip operation RS224 (i.e., the replay operation for journal data).

In contrast, that 'journal data corresponding to the latest index do not exist' means that the meta data MD are changed to the latest version through the replay operation for the current journal data JNL. In this case, in operation RS224, the journal manager 111 may perform the replay operation on the current journal data JNL.

When the determination result in operation RS222 indicates that the journal data JNL are associated with the range update, in operation RS225, the journal manager 111 may determine whether the range of the journal data JNL is matched with one of range groups of the range table RT.

When the range of the journal data JNL is matched with one of range groups of the range table RT, in operation RS226, the journal manager 111 may determine whether the index of the journal data JNL is the latest index, based on the range table RT. When the index of the journal data JNL is the latest index, in operation RS224, the journal manager 111 performs the replay operation on the journal data JNL. When the index of the journal data JNL is not the latest index, the journal manager 111 skips the replay operation for the journal data JNL.

When the range of the journal data JNL is not matched with one of the range groups of the range table RT, in operation RS227, the journal manager 111 may determine whether the range of the journal data JNL is a subset of one of the range groups of the range table RT.

When the range of the journal data JNL is a subset of one of the range groups of the range table RT, the journal manager 111 performs operation RS223; when the range of the journal data JNL is not a subset of one of the range groups of the range table RT, the journal manager 111 performs operation RS224.

Afterwards, in operation RS202, whether the variable "i" is the maximum value is determined. When the variable "i" is not the maximum value, in operation RS203, the variable "i" may increase as much as "1", and the journal manager 111 performs operation RS221.

In detail, as illustrated in FIG. 14B, the plurality of journal data JNL_0 to JNL_99 may be managed. The journal manager 111 may sequentially perform the replay operation for the plurality of journal data JNL_0 to JNL_99. In this case, the journal manager 111 may skip the replay operation for some journal data based on the operation method of FIG. 14A.

First, whether to replay the 0th journal data JNL_0 is determined by the journal manager 111. Because the 0th journal data JNL_0 is associated with the range update for the 0th to 99th logical block addresses (LBA00 to LBA99) (i.e., Yes in operation RS222), the range of the 0th to 99th logical block addresses (LBA00 to LBA99) is not matched with any one of the range groups RG0, RG1, and RG2 of the range table RT (i.e., No in operation RS225), and the index of the 0th journal data JNL_0 is not a subset of any one of the range groups RG0, RG1, and RG2 of the range table RT (i.e., No in operation RS227), the journal manager 111 performs the replay operation on the 0th journal data JNL_0.

Next, whether to replay the 1st journal data JNL_1 is determined by the journal manager 111. Because the 1st journal data JNL_1 is associated with the range update for the 0th to 29th logical block addresses LBA00 to LBA29 (i.e., Yes in operation RS222), the range of the 0th to 29th logical block addresses LBA00 to LBA29 is matched with the 0th range group RG0 among the range groups RG0, RG1, and RG2 of the range table RT (i.e., Yes in operation RS225), and the index of the 1st journal data JNL_1 is not the latest index (i.e., No in operation RS226), the journal manager 111 skips the replay operation for the 1st journal data JNL_1.

Then, whether to replay the 2nd journal data JNL_2 is determined by the journal manager 111. Because the 2nd journal data JNL_2 is associated with the update of the first logical block address LBA01, that is, is not associated with the range update (i.e., No in operation RS222), journal data corresponding to the latest index (e.g., the 3rd journal data JNL_3 corresponding to the latest index (i.e., 3) of the 0th range group RG0) are not yet processed (i.e., Yes in operation RS223), the replay operation for the 2nd journal data JNL_2 is skipped.

Then, whether to replay the 3rd journal data JNL_3 is determined by the journal manager 111. Because the 3rd journal data JNL_3 is associated with the range update for the 0th to 29th logical block addresses LBA00 to LBA29 (i.e., Yes in operation RS222), the range of the 0th to 29th logical block addresses LBA00 to LBA29 is matched with the 0th range group RG0 among the range groups RG0, RG1, and RG2 of the range table RT (i.e., Yes in operation RS225), and the index of the 3rd journal data JNL_3 corresponds to the latest index (i.e., Yes in operation RS226), the replay operation is performed on the 3rd journal data JNL_3.

Then, whether to replay the 4th journal data JNL_4 is determined by the journal manager 111. Because the 4th journal data JNL_4 is associated with the range update for the 30th to 59th logical block addresses LBA30 to LBA59 (i.e., Yes in operation RS222), the range of the 30th to 59th logical block addresses LBA30 to LBA59 is matched with the 1st range group RG1 among the range groups RG0, RG1, and RG2 of the range table RT (i.e., Yes in operation RS225), and the index of the 4th journal data JNL_4 corresponds to the latest index (i.e., Yes in operation RS226), the replay operation is performed on the 4th journal data JNL_4.

Then, whether to replay the 5th journal data JNL_5 is determined by the journal manager 111. Because the 5th journal data JNL_5 is associated with the range update for the 60th to 65th logical block addresses LBA60 to LBA65 (i.e., Yes in operation RS222), the range of the 60th to 65th logical block addresses LBA60 to LBA65 is not matched with any one of the range groups RG0, RG1, and RG2 of the range table RT (i.e., Yes in operation RS225), the range of the 60th to 65th logical block addresses LBA60 to LBA65 is associated with a subset of the 2nd range group RG2 of the range groups RG0, RG1, and RG2 of the range table RT (i.e., Yes in operation RS227), and journal data corresponding to the latest index (e.g., the 98th journal data JNL_98 corresponding to the latest index (i.e., 98) of the 2nd range group RG2) are not yet processed (i.e., Yes in operation RS223), the replay operation for the 5th journal data JNL_5 is skipped.

Then, whether to replay the 98th journal data JNL_98 is determined by the journal manager 111. Because the 98th journal data JNL_98 is associated with the range update for the 60th to 79th logical block addresses LBA60 to LBA79 (i.e., Yes in operation RS222), the range of the 60th to 79th logical block addresses LBA60 to LBA79 is matched with the 2nd range group RG2 among the range groups RG0, RG1, and RG2 of the range table RT (i.e., Yes in operation RS225), and the index of the 98th journal data JNL_98 corresponds to the latest index (i.e., Yes in operation RS226), the replay operation is performed on the 98th journal data JNL_98.

Then, whether to replay the 99th journal data JNL_99 is determined by the journal manager 111. Because the 99th journal data JNL_99 is associated with the range update for the 80th to 99th logical block addresses LBA80 to LBA99 (i.e., Yes in operation RS222), the range of the 80th to 99th logical block addresses LBA80 to LBA99 is not matched with any one of the range groups RG0, RG1, and RG2 of the range table RT (i.e., No in operation RS225), and the index of the 99th journal data JNL_99 is not a subset of any one of the range groups RG0, RG1, and RG2 of the range table RT (i.e., No in operation RS227), the replay operation is performed on the 99th journal data JNL_99.

As described above, according to the present disclosure, the replay operation may be skipped with respect to journal data of logical block addresses at which meta data are newly updated by performing the replay operation on the following journal data among a plurality of journal data. Accordingly, a time taken for the storage device 100 to restore the meta data MD may be shortened.

Figure 15A:
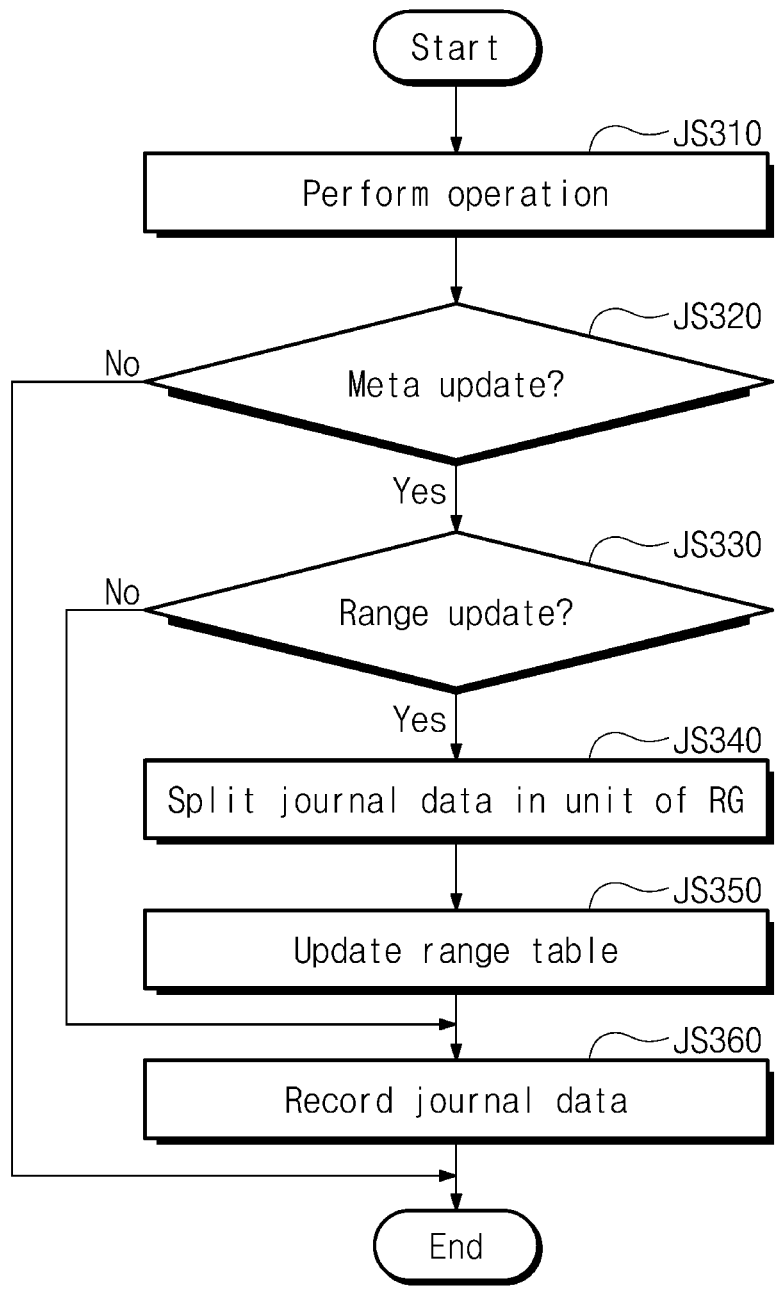
FIG. 15A illustrates a journal data generation method of a storage device of FIG. 1.
Figure 15B:
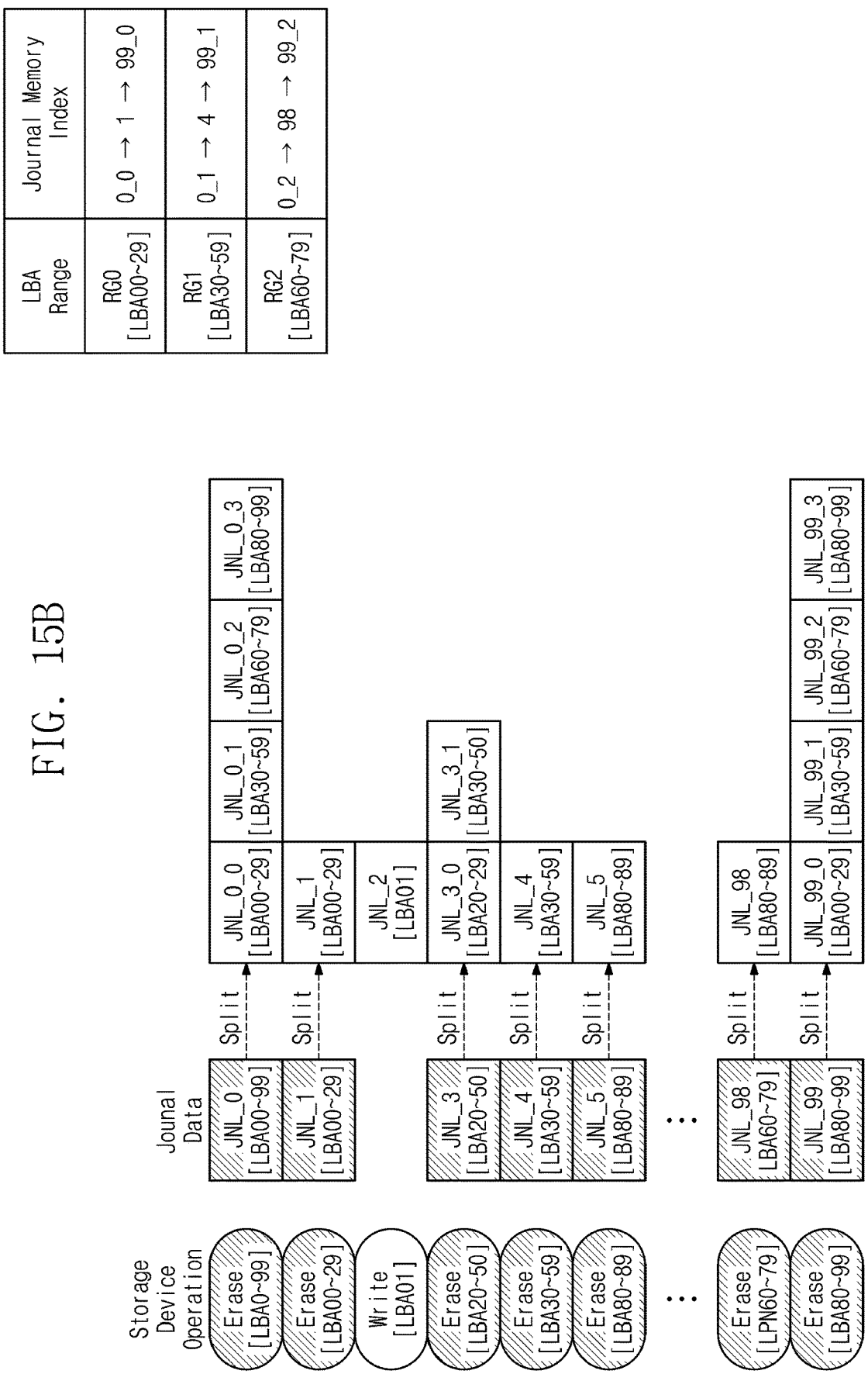
FIG. 15B illustrates an operation according to the flowchart of FIG. 15A.
Figure 15C:
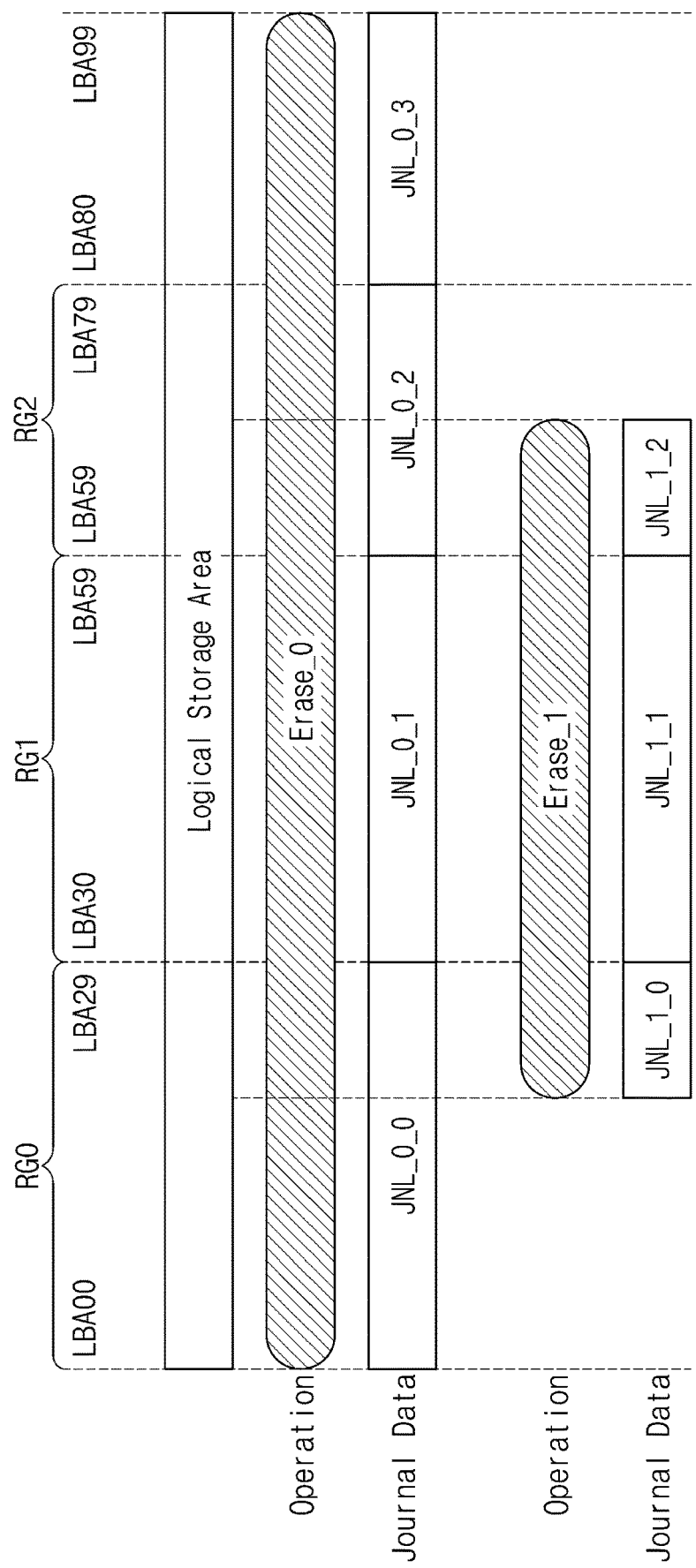
FIG. 15C illustrates a configuration for splitting journal data in an operation according to the flowchart of FIG. 15A.

FIG. 15A is a flowchart illustrating a journal data generation method of a storage device of FIG. 1. FIG. 15B is a diagram for describing an operation according to the flowchart of FIG. 15A. FIG. 15C is a diagram for describing a configuration for splitting journal data in an operation according to the flowchart of FIG. 15A.

Referring to FIGS. 1, 5, 15A, 15B, and 15C, the storage device 100 may perform operation JS310, operation JS320, and operation JS330. Operation JS310, operation JS320, and operation JS330 are similar to operation JS110, operation JS120, and operation JS130 of FIG. 7A, and thus, additional description will be omitted to avoid redundancy.

When the update of the meta data MD is not caused by the operation of the storage device 100 (i.e., No in operation JS320), the journal data JNL are not separately generated. When the update of the meta data MD is caused by the operation of the storage device 100 but is not the range update (i.e., No in operation JS330), the journal data JNL are generated, and the journal data JNL thus generated are recorded at the journal memory 111b in operation JS360.

When the update of the meta data MD caused by the operation of the storage device 100 is the range update (i.e., Yes in operation JS330), in operation JS340, the storage device 100 may split the journal data JNL in units of the range group RG. Afterwards, in operation JS350, the storage device 100 may update the range table RT. In operation JS360, the storage device 100 may record the journal data JNL (i.e., the split journal data) at the journal memory 111b.

In detail, as illustrated in FIG. 15B, the storage device 100 may perform the erase operation for the 0th to 99th logical block addresses (LBA00 to LBA99). In this case, the meta data MD corresponding to the 0th to 99th logical block addresses (LBA00 to LBA99) may be updated, and thus, the 0th journal data JNL_0 may be generated.

In this case, the journal manager 111 may split the 0th journal data JNL_0 based on the 0th to 2nd range groups RG0 to RG2 of the range table RT. For example, the 0th journal data JNL_0 may be split into JNL_0_0, JNL_0_1, JNL_0_2, and JNL_0_3. JNL_0_0 may include information about the update of the meta data MD corresponding to the 0th to 29th logical block addresses LBA00 to LBA29 of the 0th range group RG0. JNL_0_1 may include information about the update of the meta data MD corresponding to the 30th to 59th logical block addresses LBA30 to LBA59 of the 1st range group RG1. JNL_0_2 may include information about the update of the meta data MD corresponding to the 60th to 79th logical block addresses LBA60 to LBA79 of the 2nd range group RG2. JNL_0_3 may include information about the update of the meta data MD corresponding to the 80th to 99th logical block addresses LBA80 to LBA99 not included in the range groups RG0 to RG2.

Next, the storage device 100 may perform the erase operation for the 0th to 29th logical block addresses LBA00 to LBA29. The meta data MD corresponding to the 0th to 29th logical block addresses LBA00 to LBA29 may be updated, and thus, the 1st journal data JNL_1 may be generated. The 1st journal data JNL_1 may include only information about the update of the meta data MD corresponding to the 0th to 29th logical block addresses LBA00 to LBA29 included in an 0th range group RG0, and thus, the 1st journal data JNL_1 may not be separately split.

Then, the storage device 100 may perform the write operation for the first logical block address LBA01. The meta data MD corresponding to the first logical block address LBA01 may be updated, and thus, the 2nd journal data JNL_2 may be generated. Because the 2nd journal data JNL_2 are not associated with the range update, the 2nd journal data JNL_2 are not split.

Next, the storage device 100 may perform the erase operation for the 20th to 50th logical block addresses LBA20 to LBA50. In this case, the meta data MD corresponding to the 20th to 50th logical block addresses LBA20 to LBA50 may be updated, and thus, the 3rd journal data JNL_3 may be generated. The 3rd journal data JNL_3 may be split into the journal data JNL_3_0 corresponding to the 20th to 29th logical block addresses LBA20 to LBA29 and the journal data JNL_3_1 corresponding to the 30th to 50th logical block addresses LBA30 to LBA50.

That is, the journal data corresponding to the range update may be split based on a range of logical block addresses corresponding to range groups of the range table RT. In detail, as illustrated in FIG. 15C, four journal data JNL_0_0, JNL_0_1, JNL_0_2, and JNL_0_3 may be generated with regard to the 0th erase operation Erase_0 for all the 0th to 99th logical block addresses LBA00 to LBA99. Alternatively, three journal data JNL_1_0, JNL_1_1, and JNL_1_2 may be generated with regard to the 1st erase operation Erase_1 for some logical block addresses. In this case, the criterion for splitting each journal data may be identical to the criterion for classifying the range groups RG0, RG1, and RG2 of the range table RT.

Returning to FIG. 15B, as in the above description, the storage device 100 may repeatedly perform the write operation and the erase operation, and thus, a plurality of journal data JNL_4 to JNL_99 may be generated. The journal manager 111 may split journal data corresponding to a range update from among the plurality of journal data JNL_4 to JNL_99 in units of a range group. In this case, because the 4th and 5th journal data JNL_4 and JNL_5 may be associated with the range update but are included in a range group, the 4th and 5th journal data JNL_4 and JNL_5 may not be separately split. The 99th journal data JNL_99 may be split into JNL_99_0 corresponding to the 0th to 29th logical block addresses LBA00 to LBA29, JNL_99_1 corresponding to the 30th to 59th logical block addresses LBA30 to LBA59, JNL_99_2 corresponding to the 60th to 79th logical block addresses LBA60 to LBA79, and JNL_99_3 corresponding to the 80th to 89th logical block addresses LBA80 to LBA99.

In an embodiment, the split journal data may include information about the update of the meta data MD corresponding to a plurality of logical block addresses and may be stored or recorded in one entry of the journal memory 111b.

In an embodiment, the range table RT may be updated in the order of generating and splitting journal data. For example, journal data corresponding to the 0th range group RG0 may be JNL_0_0, JNL_1, and JNL_99_0. As such, the index corresponding to the 0th range group RG0 of the range table RT may be updated in the following order: 0_0→1→99.

Journal data corresponding to the 1st range group RG1 may be JNL_0_1, JNL_4, and JNL_99_1. As such, the index corresponding to the 1st range group RG1 of the range table RT may be updated in the following order: 0_1→>4→99_1.

Journal data corresponding to the 2nd range group RG2 may be JNL_0_2, JNL_98, and JNL_99_2. As such, the index corresponding to the 2nd range group RG2 of the range table RT may be updated in the following order: 0_2→>98→>99_2.

FIG. 16 is a diagram for describing a journal data replaying operation of a storage device of FIG. 1. In one embodiment, the storage device 100 performs the replay operation based on the journal data and the range table described with reference to FIG. 15B.

Referring to FIGS. 1, 8, and 16, the journal manager 111 may restore the meta data MD by performing the replay operation on a plurality of journal data JNL_0_0 to JNL_99_3. In this case, the journal manager 111 may skip the replay operation for some of the plurality of journal data JNL_0_0 to JNL_99_3, based on manners that are similar to those described above.

For example, as illustrated in FIG. 16, the journal manager 111 sequentially performs the replay operation on journal data depending on an index order of the journal data (e.g., JNL_0_0→JNL_0_1→JNL_0_2→ . . . →JNL_99_2→JNL_99_3). First, the duplication of JNL_0_0 (i.e., whether to repay JNL_0_0) is determined. Because JNL_0_0 corresponds the 0th range group RG0 and the latest index of the 0th range group RG0 in the range table RT is 99_0, the replay operation for JNL_0_0 is skipped. Whether to perform or skip the replay operation for the remaining journal data JNL_0_1 to JNL_99_3 is determined in a manner similar to that described above, and thus, additional description will be omitted to avoid redundancy.

As described above, according to embodiments of the present disclosure, the journal manager 111 may generate the single journal data JNL based on the operation unit of the storage device 100. When the journal data JNL are associated with the range update, the journal manager 111 may update the range table RT.

Afterwards, when journal data are replayed, the journal manager 111 may skip the replay operation for journal data not corresponding to the latest index based on the range table RT. Accordingly, the operation processing time of the storage device 100 may be shortened, and a time taken for the storage device 100 to restore the meta data MD (i.e., the open time of the storage device 100) may also be shortened. Accordingly, the storage device 100 with improved performance is provided.

Figure 17:
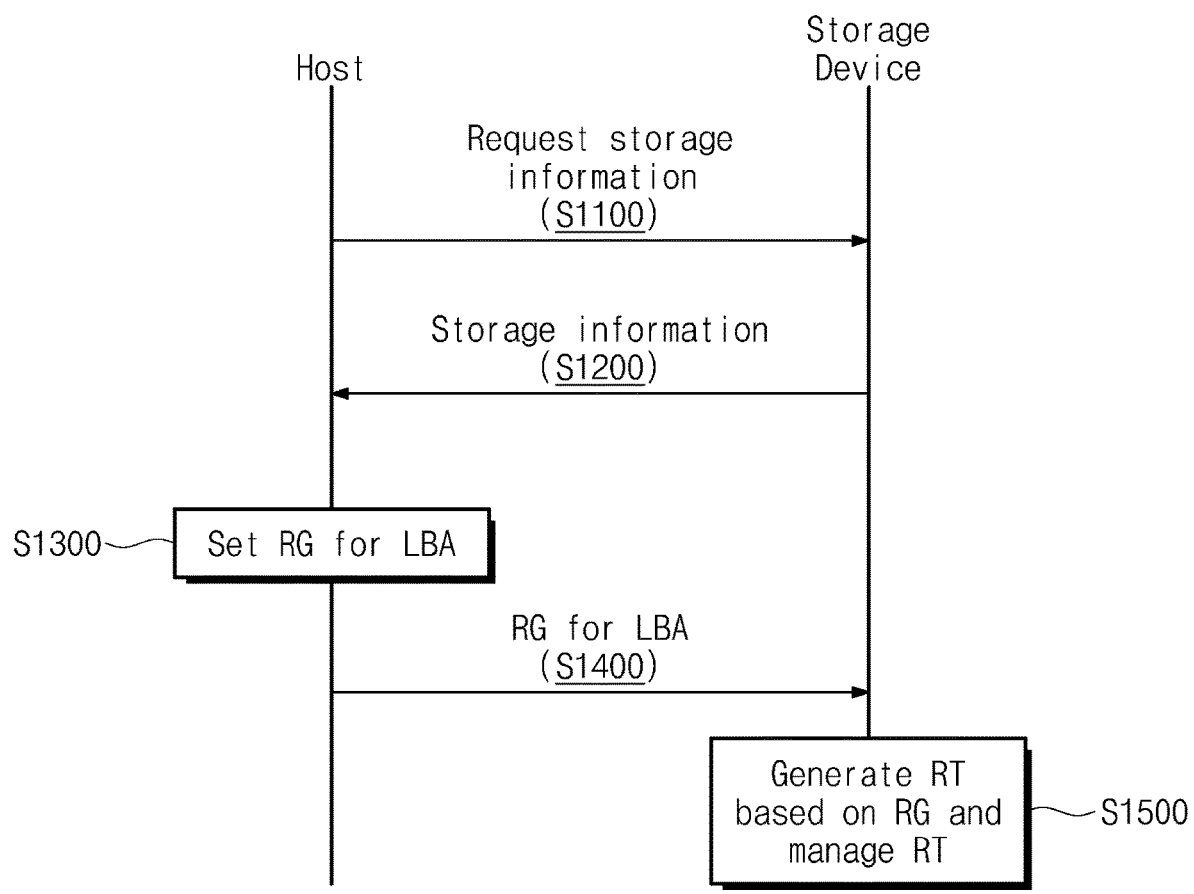
FIG. 17 illustrates an operation of a storage system of FIG. 1.

FIG. 17 is a flowchart illustrating an operation of a storage system of FIG. 1. Referring to FIGS. 1 and 17, in operation S1100, the host 11 may request storage information from the storage device 100. In operation S1200, the storage device 100 may send the storage information to the host 11. For example, the host 11 may request information about the storage space of the storage device 100, and the storage device 100 may provide the host 11 with the information about the storage space. In an embodiment, operation S1100 and operation S1200 may be performed based on the 'GET FEATURE' command or various commands configured to check device information of the storage device 100.

In operation S1300, the host 11 may set a range group for logical block addresses. For example, the host 11 may set logical block addresses based on the storage information. The host 11 may split the logical block addresses into at least one range group. The size of the range group and the number of range groups may be variously set depending on a driving manner or a policy of the host 11.

In operation S1400, the host 11 may provide information about the range group of the logical block addresses to the storage device 100. In an embodiment, operation S1400 may be performed based on the 'SET FEATURE' command or various commands configured to check the device information of the storage device 100.

In operation S1500, the storage device 100 may generate the range table based on the range group and may manage the range table.

As described above, the range table RT that are used and managed by the journal manager 111 of the storage controller 110 may include the range groups RG for logical block addresses. The host 11 may manage the storage space of the storage device 100 based on the logical block addresses, and the host 11 may directly set and manage the logical block addresses for the range groups RG. However, the present disclosure is not limited thereto. For example, the range groups of the range table RT may be variously changed or modified by the operation of the storage device 100 while the storage device 100 is being initialized or driven.

Figure 18:
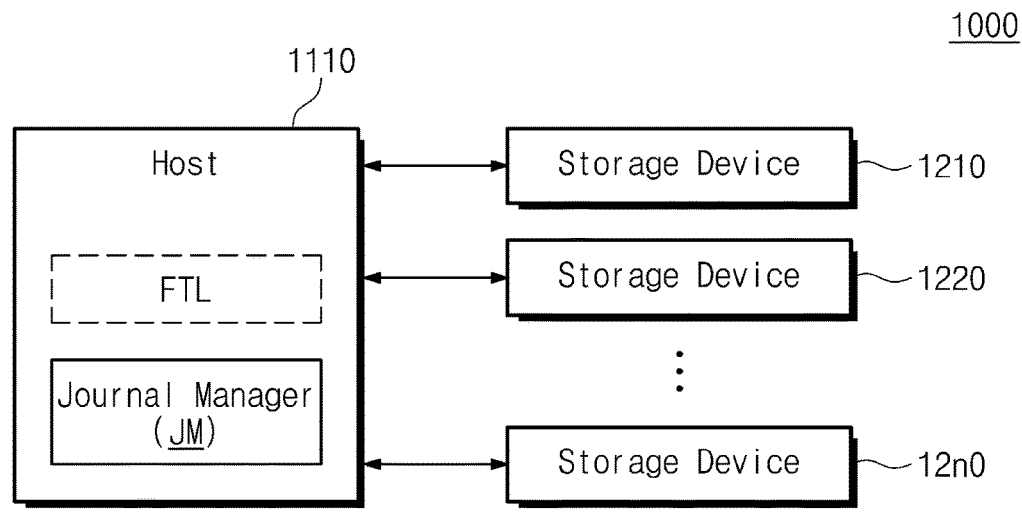
FIG. 18 illustrates a storage system according to an embodiment of the present disclosure.

FIG. 18 is a block diagram illustrating a storage system according to an embodiment of the present disclosure. Referring to FIG. 18, a storage system 1000 may include a host 1100 and a plurality of storage devices 1210 to 12n0. The host 1100 may be configured to control the plurality of storage devices 1210 to 12n0.

Each of the plurality of storage devices 1210 to 12n0 may be configured to manage meta data necessary for its own operation and may manage journal data through a journal manager described with reference to FIGS. 1 to 17.

In an embodiment, the host 1100 may include a journal manager JM. The journal manager JM included in the host 1100 may be configured to manage journal data associated with the update of meta data managed by the host 1100. For example, the host 1100 may be configured to control or access the plurality of storage devices 1210 to 12n0 independently of each other. In this case, the host 1100 may manage various meta data necessary to access or control the plurality of storage devices 1210 to 12n0 individually or collectively. In an embodiment, as in the above description, the journal manager JM of the host 1100 may skip the replay operation for some journal data based on the duplication of the journal data.

In an embodiment, the duplication of the journal data managed by the host 1100 may be determined through various methods as described above. Alternatively, the duplication of the journal data managed by the host 1100 may be determined depending on a storage device corresponding to the journal data.

For example, the storage space corresponding to the first storage device 1210 may be managed based on logical block addresses corresponding to a first range group. Journal data matched with the first range group may be replayed only when the index of the journal data corresponds to the latest index.

In an embodiment, the host 1100 may further include a flash translation layer FTL. In the above embodiments, the flash translation layer FTL is included in a storage controller of a storage device and performs various maintenance operations on a nonvolatile memory device. In contrast, the flash translation layer FTL may be included in the host 1100. In this case, the flash translation layer FTL of the host 1100 may perform various maintenance operations for each of the plurality of storage devices 1210 to 12n0 and may manage meta data for each of the plurality of storage devices 1210 to 12n0.

Figure 19:
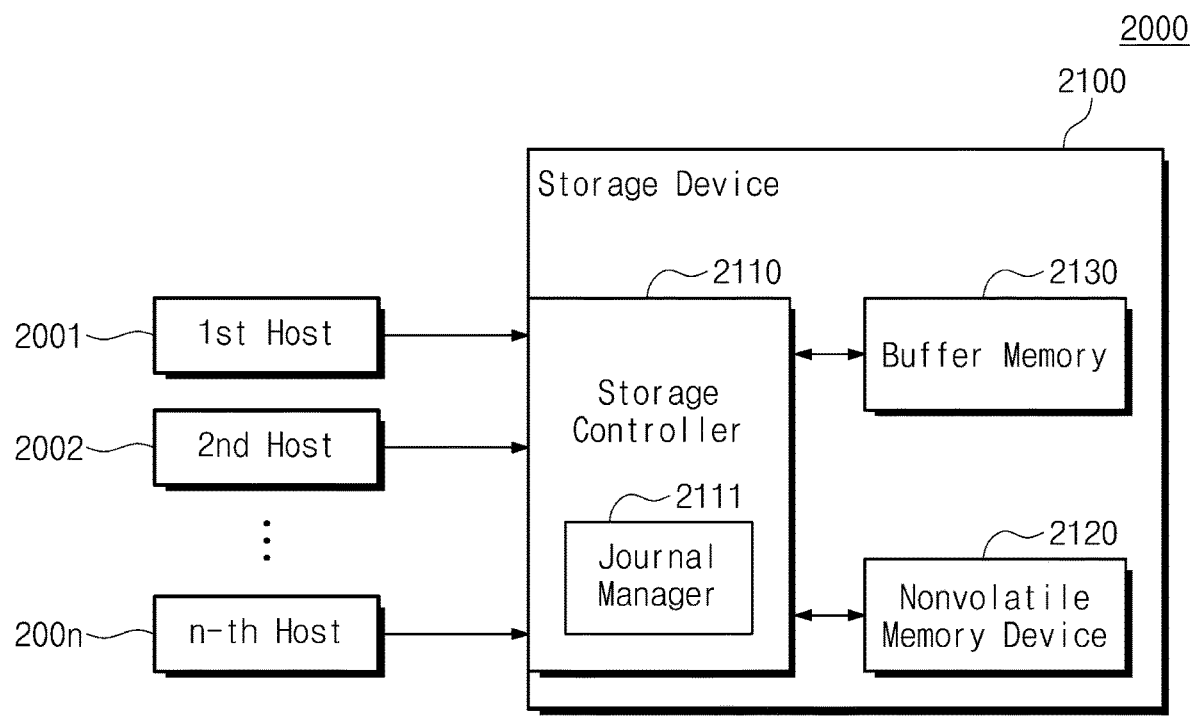
FIG. 19 illustrates a storage system according to an embodiment of the present disclosure.

FIG. 19 is a block diagram illustrating a storage system according to an embodiment of the present disclosure. Referring to FIG. 19, a storage system 2000 may include a plurality of hosts 2001 to 200n and a storage device 2100. The plurality of hosts 2001 to 200n may be configured to access the storage device 2100. For example, each of the plurality of hosts 2001 to 200n may store data in the storage device 2100 or may read data stored in the storage device 2100.

The storage device 2100 may include a storage controller 2110, a nonvolatile memory device 2120, and a buffer memory 2130. Overall operations of the storage device 2100, the storage controller 2110, the nonvolatile memory device 2120, and the buffer memory 2130 are similar to those described above, and thus, additional description will be omitted to avoid redundancy. Moreover, the nonvolatile memory device 2120 is an example in one embodiment, and it may be replaced with other types of memory devices (e.g., volatile memory devices).

In an embodiment, the storage controller 2110 may include a journal manager 2111. The journal manager 2111 may generate and manage journal data associated with update information of various meta data that are used in an operation of the storage device 2100.

In an embodiment, according to the method described with reference to FIGS. 1 to 17, the journal manager 2111 may manage the range table for the journal data JNL and may skip the replay operation for some journal data JNL based on the duplication of the journal data JNL.

In an embodiment, the journal manager 2111 may determine the duplication of the journal data JNL based on the plurality of hosts 2001 to 200*n*. For example, the first host (device) 2001 may be configured to access a first logical area of the storage device 2100, and the second host (device) 2002 may be configured to access a second logical area of the storage device 2100. In this case, the first logical area may be managed by using a first range group of the range table RT, and the second logical area may be managed by using a second range group of the range table RT. The logical areas that are accessed by the respective hosts may be managed by using the respective range groups, and thus, the range table RT may be updated. How to skip the replay operation for journal data based on the range table RT is described above, and thus, additional description will be omitted to avoid redundancy.

Figure 20A:
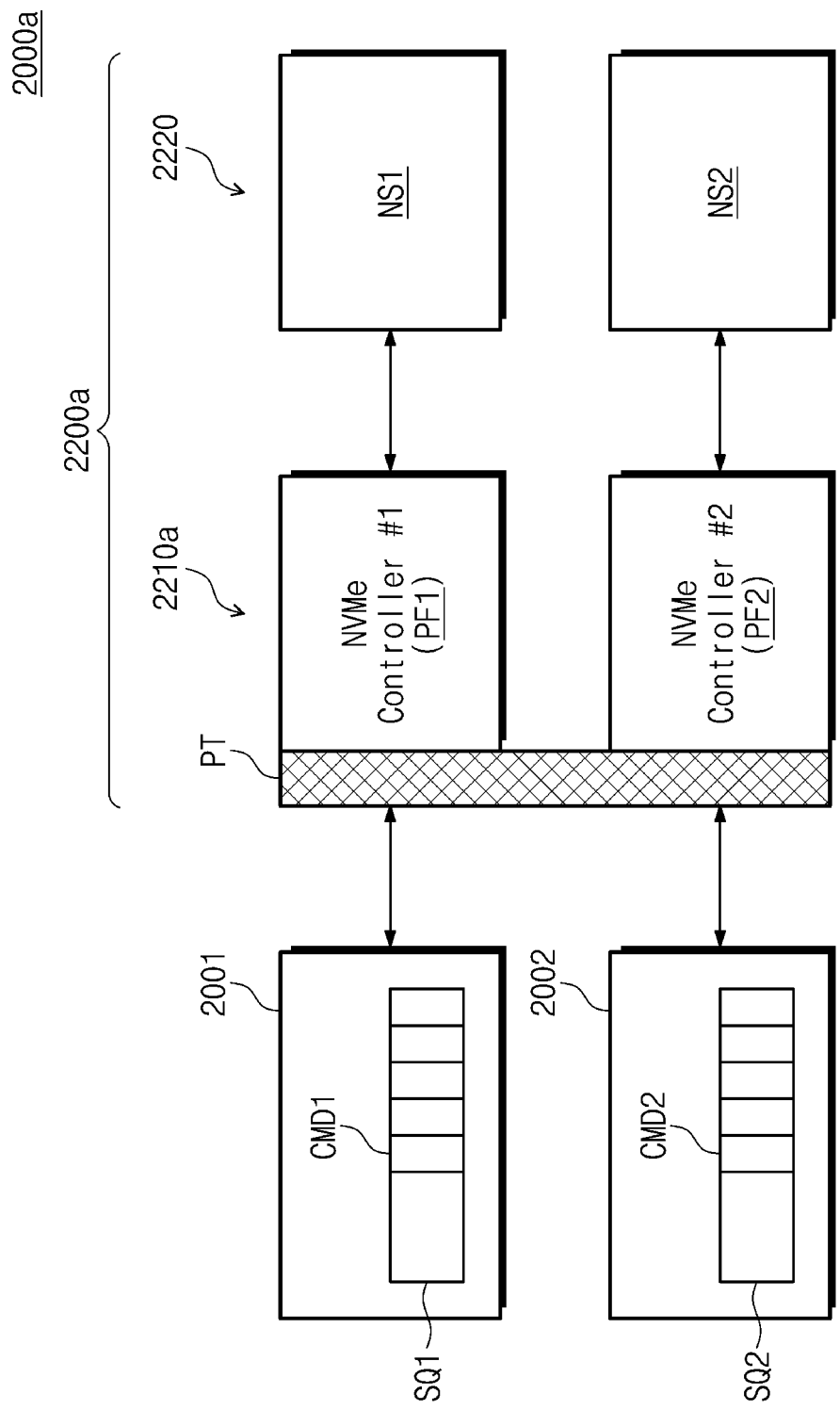
FIGS. 20A to 20C illustrate various topologies of a storage system.
Figure 20B:
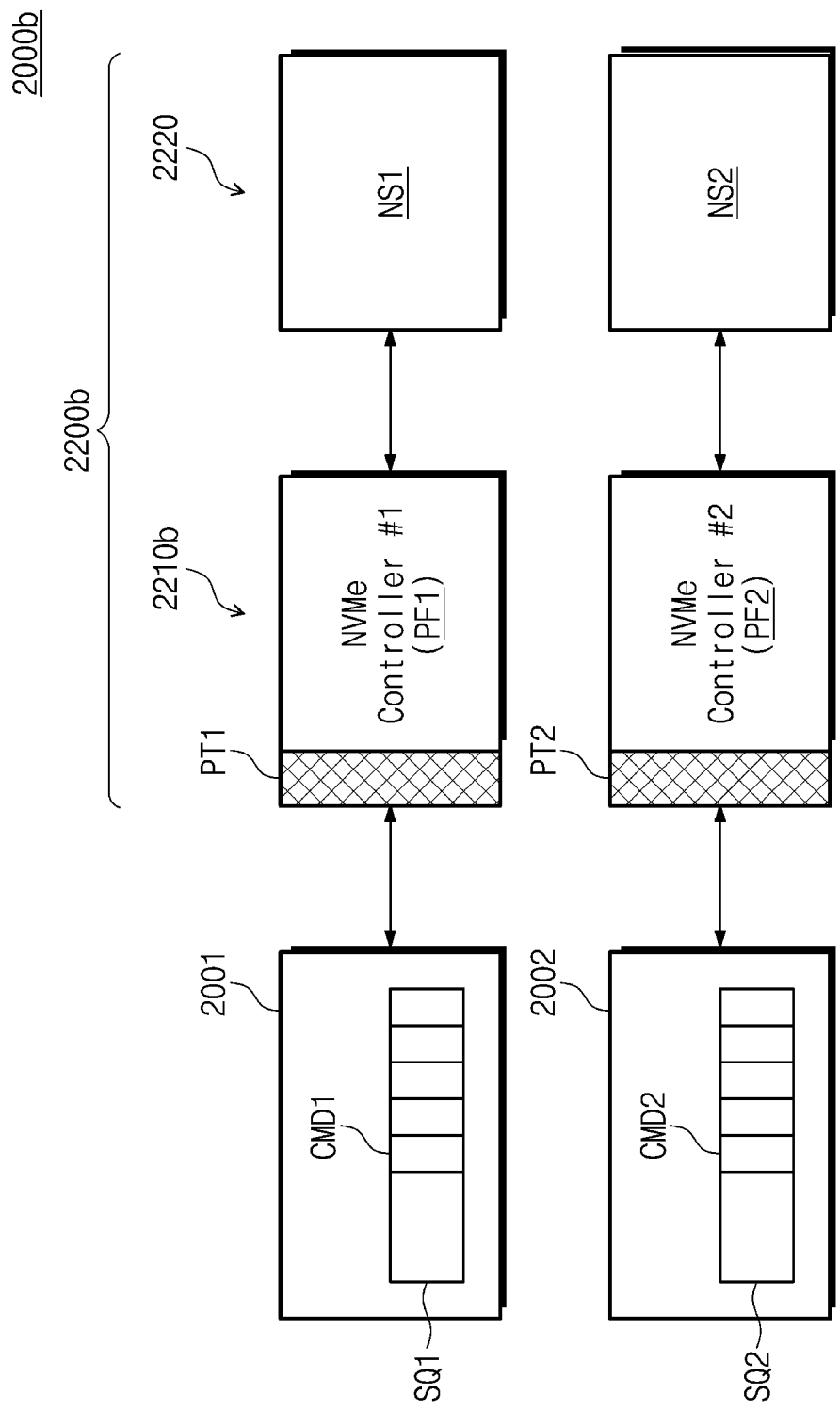
Figure 20C:
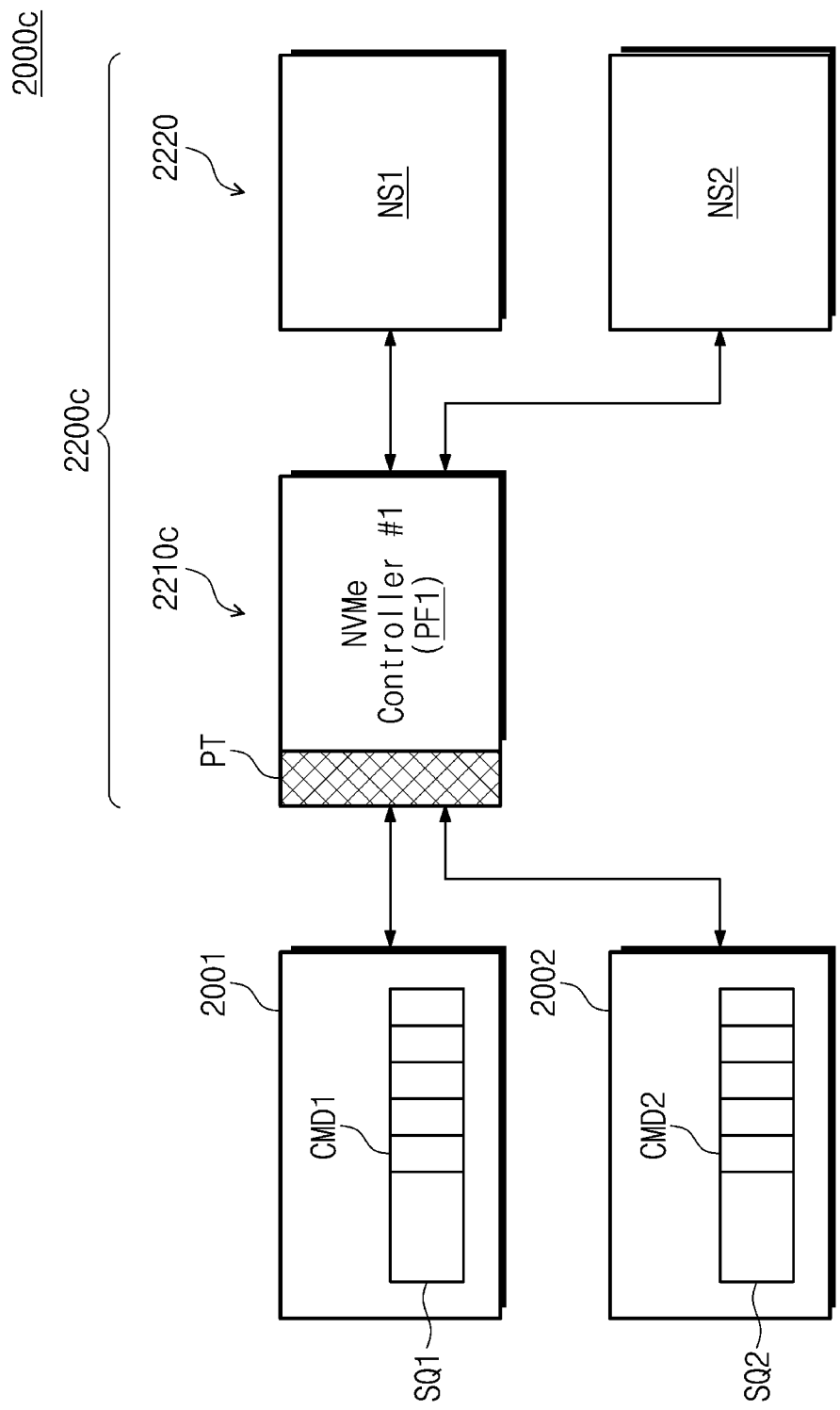

FIGS. 20A to 20C are block diagrams illustrating various topologies of a storage system. Below, the term "physical function PF" is used to describe the technical idea of the present disclosure easily. The physical function PF may refer to an Non-Volatile Memory express (NVMe) controller corresponding to each of a plurality of host devices (e.g., the first host device 2001 and the second host device 2002). The NVMe controller may be implemented in the form of software, hardware, or a combination thereof. Alternatively, the physical function PF may indicate a PCI-express configured to support the SR-IOV function. The SR-IOV may indicate a function that allows one physical function to support one or more dependent virtual functions. That is, below, it may be understood that the physical function PF corresponds to at least one of the plurality of host devices (e.g., the first host device 2001 and the second host device 2002) and is configured to process a command of the corresponding host device of the plurality of host devices (e.g., the first host device 2001 and the second host device 2002) or a command of a submission queue managed by the corresponding host device.

In one embodiment, the host device 1110 includes the first host device 2001 and the second host device 2002, but the present disclosure is not limited thereto. In an embodiment, the first host device 2001 and the second host device 2002 may be hardware devices that are physically distinguished from each other. Alternatively, the first host device 2001 and the second host device 2002 may be virtual machines that are implemented in the same computing system or server system.

In an embodiment, each of the storage systems 2000*a*, 2000*b*, and 2000*c* described with reference to FIGS. 20A to 20C may be the storage system described with reference to FIGS. 1 to 19. In an embodiment, as described with reference to FIGS. 20A to the storage devices 2100*a*, 2100*b*, and 2100*c* may include a plurality of namespaces, and the range groups of the range table RT described with reference to FIGS. 1 to 19 may be determined in units of a namespace.

Referring to FIGS. 20A to 20C, the storage systems 2000*a*, 2000*b*, and 2000*c* may include the first host device 2001, the second host device 2002, and the storage devices 2200*a*, 2200*b*, and 2200*c*. Each of the first host device 2001 and the second host device 2002 may respectively issue commands CMD1 and CMD2 for processing corresponding operations. For example, the first host device 2001 may issue the first command CMD1, and the first command CMD1 thus issued may be stored in a first submission queue SQ1 The second host (device) 2002 may issue the second command CMD2, and the second command CMD2 thus issued may be stored in a second submission queue SQ2.

An embodiment where each of the first host device 2001 and the second host device 2002 manages one submission queue is illustrated, but the present disclosure is not limited thereto. For example, each of the first host device 2001 and the second host device 2002 may manage a plurality of submission queues. Alternatively, each of the first host device 2001 and the second host device 2002 may further manage a completion queue configured to receive completions associated with the plurality of submission queues.

Alternatively, each of the first host device 2001 and the second host device 2002 may issue an administrative command and may further manage an admin queue and an admin completion queue that are configured to receive a completion associated with the administrative command. In an embodiment, the submission queue, the completion queue, the admin queue, the admin completion queue, etc. may be included in a Controller Memory Buffer (CMB) of a storage device. Alternatively, the submission queue, the completion queue, the admin queue, the admin completion queue, etc. may be included in a Host Device memory buffer (HMB) of a corresponding host device.

The storage devices 2200*a*, 2200*b*, and 2200*c* may communicate with the first host device 2001 and the second host device 2002. In an embodiment, the storage devices 2200*a*, 2200*b*, and 2200*c* may communicate with the first host device 2001 and the second host device 2002 through an interface (e.g., NVMe over PCI-express) belonging to a physical layer that is based on a PCI-express interface. Alternatively, the storage devices 2200*a*, 2200*b*, and 2200*c* may communicate with the first host device 2001 and the second host device 2002 through a network-based interface (e.g., NVMe-oF (NVMe over Fabrics)) such as a fibre channel or a Remote Direct Random Access Memory (RDMA). Below, to describe an embodiment of the present disclosure clearly, it is assumed that storage controllers 2210*a*, 2210*b*, and 2210*c* communicate with the first host device 2001 and the second host device 2002 through the NVMe over PCI-express interface.

The storage devices 2200*a*, 2200*b*, and 2200*c* may communicate with the first host device 2001 and the second host device 2002 through various types of physical layers. First and second physical functions PF1 to PF2 may respectively correspond to the first host device 2001 and the second host device 2002. For example, the first physical function PF1 may indicate a first NVMe controller configured to communicate with the first host device 2001 and to process the first command CMD1 from the first host device 2001. The second physical function PF2 may indicate a second NVMe controller configured to communicate with the second host device 2002 and to process the second command CMD2 from the second host device 2002.

Each of the first physical function PF1 and the second physical function PF2 may perform an operation for a nonvolatile memory device 2220 based on the command from the corresponding host device. In an embodiment, the nonvolatile memory device 2220 may be managed by using a logically divided namespace NS or a physically or logically divided nonvolatile memory (NVM) set. Each of the first physical function PF1 and the second physical function PF2 may perform the operation corresponding to the command with respect to the corresponding namespace NS1 or NS2 or the corresponding NVM set.

In an embodiment, as illustrated in FIG. 20A, the first physical function PF1 and the second physical function PF2 included in the storage controller 2210*a* may communicate with the first host device 2001 and the second host device 2002 through one physical port PT. The physical port PT may be a physical layer configured to support the PCI-express interface. In an embodiment, each of the first physical function PF1 and the second physical function PF2 may refer to a dependent virtual function or may support the dependent virtual function.

Alternatively or additionally, as illustrated in FIG. 20B, the first physical function PF1 and the second physical function PF2 included in the storage controller 2210b may communicate with the first host device 2001 and the second host device 2002 through a plurality of physical ports PT1 and PT2. Each of the first and second physical ports PT1 and PT2 may be an independent physical layer configured to support the PCI-express interface. The first physical function PF1 may communicate with the first host device 2001 through the first physical port PT1, and the second physical function PF2 may communicate with the second host device 2002 through the second physical port PT2.

In an embodiment, as illustrated in FIG. 20C, the first host device 2001 and the second host device 2002 may communicate with one physical function PF1 included in the storage controller 2210c. That is, the first host device 2001 and the second host device 2002 may respectively access the first and second namespaces NS1 and NS2 through the one physical function PF1.

The configurations described with reference to FIGS. 20A to 20C are provided as an example, and the present disclosure is not limited thereto. As described above, the physical function PF may indicate the NVMe controller corresponding to each of the plurality of host devices, and a plurality of physical functions PF may be configured to communicate with the corresponding host devices through one physical port or individual physical ports.

Figure 21:
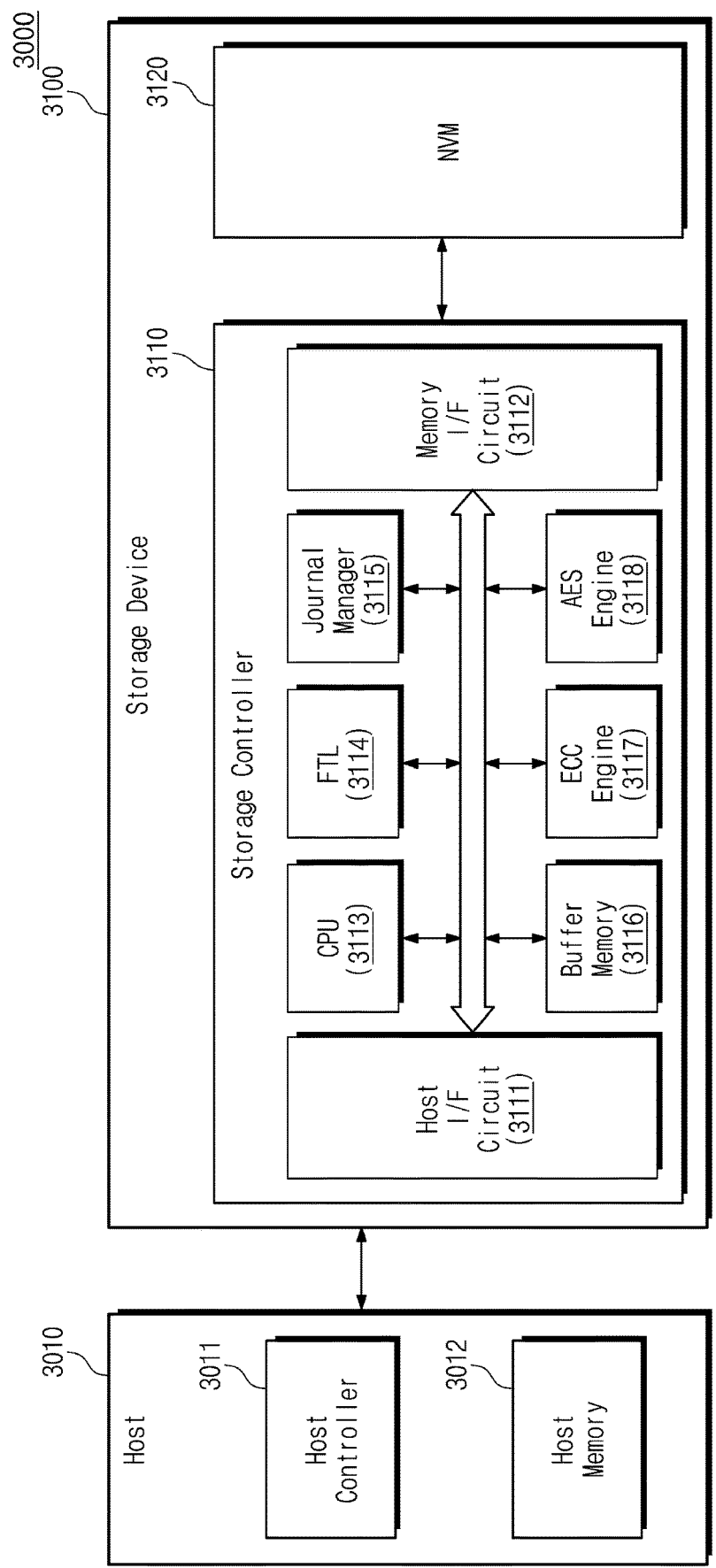
FIG. 21 illustrates a host-storage system according to an embodiment of the present disclosure.

FIG. 21 is a block diagram illustrating a host-storage system according to an embodiment of the present disclosure. Referring to FIG. 21, a host-storage system 3000 may include a host 3010 and a storage device 3100. Also, the storage device 3100 may include a storage controller 3110 and a Nonvolatile Memory (NVM) 3120. Also, according to an embodiment of the present disclosure, the host 3010 may include a host controller 3011 and a host memory 3012. The host memory 3012 may function as a buffer memory for temporarily storing data to be sent to the storage device 3100 or data sent from the storage device 3100.

The storage device 3100 may include storage mediums for storing data depending on a request from the host 3010. As an example, the storage device 3100 may include at least one of a Solid State Drive (SSD), an embedded memory, and a detachable external memory. In the case where the storage device 3100 is an SSD, the storage device 3100 may be a device complying with the NVMe standard. In the case where the storage device 3100 is an embedded memory or an external memory, the storage device 3100 may be a device complying with the Universal Flash Storage (UFS) or Embedded Multi-Media Card (eMMC) standard. Each of the host 3010 and the storage device 3100 may generate a packet complying with a standard protocol applied thereto and may transmit the generated packet.

When the nonvolatile memory 3120 of the storage device 3100 includes a flash memory, the flash memory may include a two-dimensional (2D) NAND flash memory array or a three-dimensional (3D) (or vertical) NAND (VNAND) memory array. As another example, the storage device 3100 may be implemented with various kinds of different nonvolatile memories. For example, the storage device 3100 may include a Magnetic RAM (MRAM), a Spin-Transfer Torque MRAM (STT-MRAM), a Conductive Bridging RAM (CBRAM), a Ferroelectric RAM (FeRAM), a Phase Change RAM (PRAM), a Resistive RAM (RRAM), or at least one of various kinds of different memories.

According to an embodiment, the host controller 3011 and the host memory 3012 may be implemented with separate semiconductor chips. Alternatively or additionally, in some embodiments, the host controller 3011 and the host memory 3012 may be implemented in the same semiconductor chip. As an example, the host controller 3011 may be one of a plurality of modules included in an application processor. In this case, the application processor may be implemented with a System On Chip (SoC). Also, the host memory 3012 may be an embedded memory included in the application processor or may be a nonvolatile memory or a memory module disposed outside the application processor.

The host controller 3011 may manage an operation of storing data (e.g., write data) of a buffer area of the host memory 3012 in the nonvolatile memory 3120 or storing data (e.g., read data) of the nonvolatile memory 3120 in the buffer area.

The storage controller 3110 may include a host interface 3111, a memory interface 3112, Central Processing Unit (CPU) 3113. Also, the storage controller 3110 may further include a Flash Translation Layer (FTL) 3114, a journal manager 3115, a buffer memory 3116, an Error Correction Code (ECC) engine 3117, an Advanced Encryption Standard (AES) engine 3118. The storage controller 3110 may further include a working memory onto which the flash translation layer 3114 is loaded, and data write and read operations of the nonvolatile memory 3120 may be controlled as the CPU 3113 executes the flash translation layer 114.

The host interface 3111 may exchange packets with the host 3010. The packet that is transmitted from the host 3010 to the host interface 3111 may include a command or data to be written in the nonvolatile memory 3120, and the packet that is transmitted from the host interface 3111 to the host 3010 may include a response to the command or data read from the nonvolatile memory 3120. The memory interface 3112 may provide the nonvolatile memory 3120 with data to be written in the nonvolatile memory 3120, and may receive data read from the nonvolatile memory 3120. The memory interface 3112 may be implemented to comply with the standard such as Toggle or Open NAND Flash Interface (ONFI).

The flash translation layer 3114 may perform various functions (or operations) such as address mapping, wear-leveling, and garbage collection. The address mapping operation refers to an operation of translating a logical address received from the host 3010 into a physical address to be used to actually store data in the nonvolatile memory 3120. The wear-leveling that is a technology for allowing blocks in the nonvolatile memory 3120 to be used uniformly such that excessive degradation of a specific block is prevented may be implemented, for example, through a firmware technology for balancing erase counts of physical blocks. The garbage collection refers to a technology for securing an available capacity of the nonvolatile memory 3120 through a way to erase an existing block after copying valid data of the existing block to a new block. In an embodiment, the flash translation layer 3114 may be configured to manage and update the meta data MD described with reference to FIGS. 1 to 15.

The journal manager 3115 may manage and store various journal data associated with the update of various meta data that are managed by the storage device 3100. In an embodiment, the journal manager 3115 may be the journal manager described with reference to FIGS. 1 to 17.

The buffer memory 3116 may temporarily store data to be written in the nonvolatile memory 3120 or data read from the nonvolatile memory 3120. The buffer memory 3116 may be a component provided within the storage controller 3110; however, it may be possible to dispose the buffer memory 3116 outside the storage controller 3110. In an embodiment, the buffer memory 3116 may be the buffer memory configured to store the meta data MD, which is described with reference to FIGS. 1 to 17. Alternatively the buffer memory 3116 may be the journal memory configured to store the journal data JNL and the range table RT, which is described with reference to FIGS. 1 to 17.

The ECC engine 3117 may perform an error detection and correction function on data read from the nonvolatile memory 3120. In detail, the ECC engine 3117 may generate parity bits for write data to be written in the nonvolatile memory 3120, and the parity bits thus generated may be stored in the nonvolatile memory 3120 together with the write data. When data are read from the nonvolatile memory 3120, the ECC engine 3117 may correct an error of the read data by using parity bits read from the nonvolatile memory 3120 together with the read data and may output the error-corrected read data.

The AES engine 3118 may perform at least one of an encryption operation and a decryption operation on data input to the storage controller 3110 by using a symmetric-key algorithm.

In an embodiment, the storage controller 3110 may further include a packet manager that generates a packet complying with a protocol of an interface agreed with the host 3010 or parses a variety of information from the packet received from the host 3010.

Figure 22:
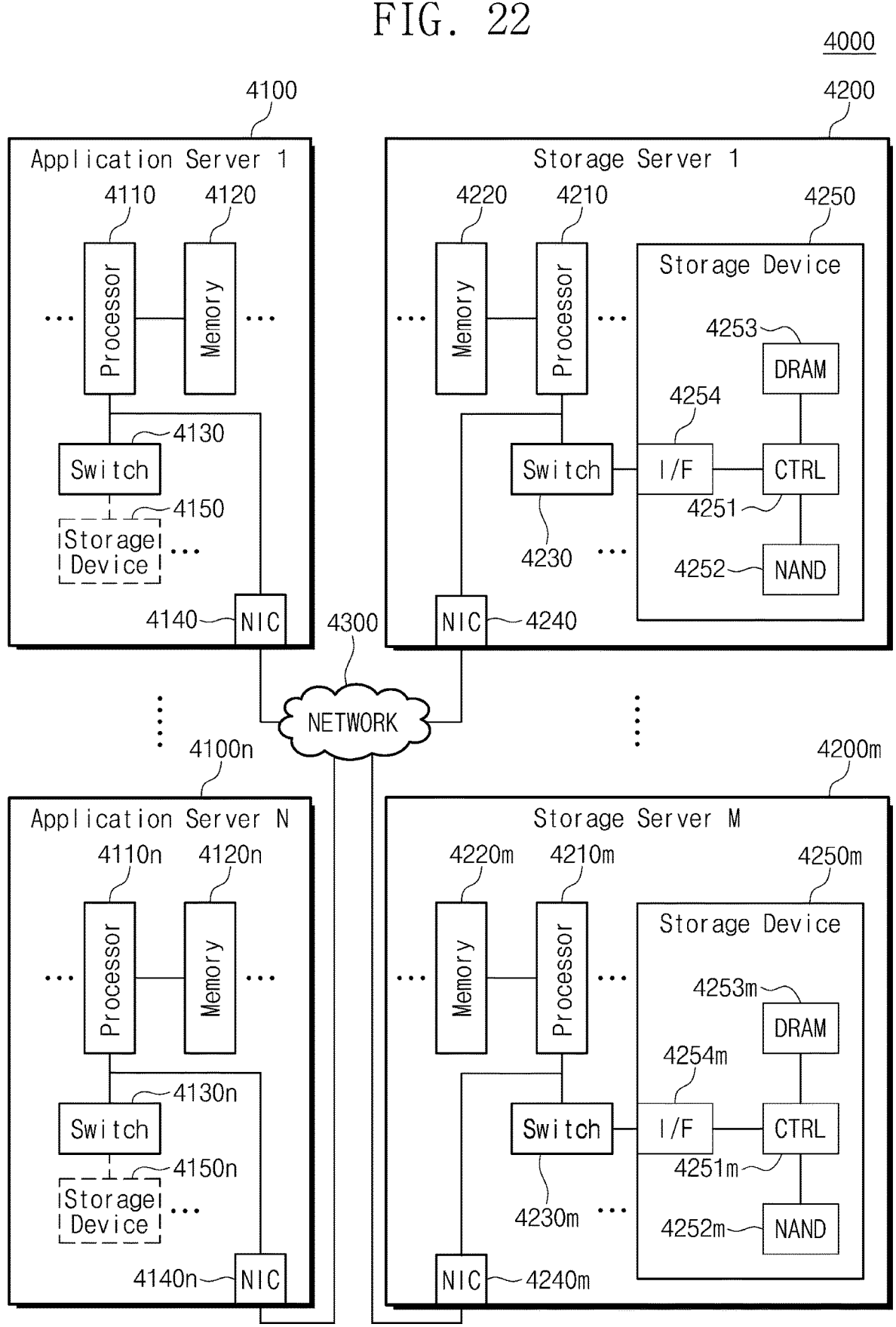
FIG. 22 illustrates a data center to which a storage device according to an embodiment of the present disclosure is applied.

FIG. 22 is a diagram of a data center 4000 to which a memory device is applied, according to an embodiment.

Referring to FIG. 22, the data center 4000 may be a facility that collects various types of pieces of data and provides services and be referred to as a data storage center. The data center 4000 may be a system for operating a search engine and a database, and may be a computing system used by companies, such as banks, or government agencies. The data center 4000 may include application servers 4100 to 4100*n* and storage servers 4200 to 4200*m*. The number of application servers 4100 to 4100*n* and the number of storage servers 4200 to 4200*m* may be variously selected according to embodiments. The number of application servers 4100 to 4100*n* may be different from the number of storage servers 4200 to 4200*m*.

The application server 4100 or the storage server 4200 may include at least one of processors 4110 and 4210 and memories 4120 and 4220. The storage server 4200 will now be described as an example. The processor 4210 may control all operations of the storage server 4200, access the memory 4220, and execute instructions and/or data loaded in the memory 4220. The memory 4220 may be a Double-Data-Rate Synchronous DRAM (DDR SDRAM), a High-Bandwidth Memory (HBM), a Hybrid Memory Cube (HMC), a Dual In-Line Memory module (DIMM), Optane DIMM, and/or a Non-Volatile DIMM (NVMDIMM). In some embodiments, the numbers of processors 4210 and memories 4220 included in the storage server 4200 may be variously selected. In an embodiment, the processor 4210 and the memory 4220 may provide a processor-memory pair. In an embodiment, the number of processors 4210 may be different from the number of memories 4220. The processor 4210 may include a single-core processor or a multi-core processor. The above description of the storage server 4200 may be similarly applied to the application server 4100. In some embodiments, the application server 4100 may not include a storage device 4150. The storage server 4200 may include at least one storage device 4250. The number of storage devices 4250 included in the storage server 4200 may be variously selected according to embodiments.

The application servers 4100 to 4100*n* may communicate with the storage servers 4200 to 4200*m* through a network 4300. The network 4300 may be implemented by using a Fiber Channel (FC) or Ethernet. In this case, the FC may be a medium used for relatively high-speed data transmission and use an optical switch with high performance and high availability. The storage servers 4200 to 4200*m* may be provided as file storages, block storages, or object storages according to an access method of the network 4300.

In an embodiment, the network 4300 may be a storage-dedicated network, such as a Storage Area Network (SAN). For example, the SAN may be an FC-SAN, which uses an FC network and is implemented according to an FC Protocol (FCP). As another example, the SAN may be an Internet Protocol (IP)-SAN, which uses a Transmission Control Protocol (TCP)/IP network and is implemented according to a SCSI over TCP/IP or Internet SCSI (iSCSI) protocol. In another embodiment, the network 4300 may be a general network, such as a TCP/IP network. For example, the network 4300 may be implemented according to a protocol, such as FC over Ethernet (FCoE), network attached storage (NAS), and NVMe over Fabrics (NVMe-oF).

Hereinafter, the application server 4100 and the storage server 4200 will mainly be described. A description of the application server 4100 may be applied to another application server 4100*n*, and a description of the storage server 4200 may be applied to another storage server 4200*m*.

The application server 4100 may store data, which is requested by a user or a client to be stored, in one of the storage servers 4200 to 4200*m* through the network 4300. Also, the application server 4100 may obtain data, which is requested by the user or the client to be read, from one of the storage servers 4200 to 4200*m* through the network 4300. For example, the application server 4100 may be implemented as a web server or a database management system (DBMS).

The application server 4100 may access a memory 4120*n* or a storage device 4150*n*, which is included in another application server 4100*n*, through the network 4300. Alternatively, the application server 4100 may access memories 4220 to 4220*m* or storage devices 4250 to 4250*m*, which are included in the storage servers 4200 to 4200*m*, through the network 4300. Thus, the application server 4100 may perform various operations on data stored in application servers 4100 to 4100*n* and/or the storage servers 4200 to 4200*m*. For example, the application server 4100 may execute an instruction for moving or copying data between the application servers 4100 to 4100*n* and/or the storage servers 4200 to 4200*m*. In this case, the data may be moved from the storage devices 4250 to 4250*m* of the storage servers 4200 to 4200*m* to the memories 4120 to 4120*n* of the application servers 4100 to 4100*n* directly or through the memories 4220 to 4220*m* of the storage servers 4200 to 4200*m*. The data moved through the network 4300 may be data encrypted for security or privacy.

The storage server 4200 will now be described as an example. An interface 4254 may provide physical connection between a processor 4210 and a controller 4251 and a physical connection between a Network Interface Card (NIC) 4240 and the controller 4251. For example, the interface 4254 may be implemented using a direct attached storage (DAS) scheme in which the storage device 4250 is directly connected with a dedicated cable. For example, the interface 4254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 4200 may further include a switch 4230 and the Network InterConnect (NIC) 4240. The switch 4230 may selectively connect the processor 4210 to the storage device 4250 or selectively connect the NIC 4240 to the storage device 4250 via the control of the processor 4210.

In an embodiment, the NIC 4240 may include a network interface card and a network adaptor. The NIC 4240 may be connected to the network 4300 by a wired interface, a wireless interface, a Bluetooth interface, or an optical interface. The NIC 4240 may include an internal memory, a Digital Signal Processor (DSP), and a host bus interface and be connected to the processor 4210 and/or the switch 4230 through the host bus interface. The host bus interface may be implemented as one of the above-described examples of the interface 4254. In an embodiment, the NIC 4240 may be integrated with at least one of the processor 4210, the switch 4230, and the storage device 4250.

In the storage servers 4200 to 4200m or the application servers 4100 to 4100n, a processor may transmit a command to storage devices 4150 to 4150n and 4250 to 4250m or the memories 4120 to 4120n and 4220 to 4220m and program or read data. In this case, the data may be data of which an error is corrected by an ECC engine. The data may be data on which a Data Bus Inversion (DBI) operation or a Data Masking (DM) operation is performed, and may include Cyclic Redundancy Code (CRC) information. The data may be data encrypted for security or privacy.

Storage devices 4150 to 4150n and 4250 to 4250m may transmit a control signal and a command/address signal to NAND flash memory devices 4252 to 4252m in response to a read command received from the processor. Thus, when data is read from the NAND flash memory devices 4252 to 4252m, a Read Enable (RE) signal may be input as a data output control signal, and thus, the data may be output to a DQ bus. A data strobe signal DQS may be generated using the RE signal. The command and the address signal may be latched in a page buffer depending on a rising edge or falling edge of a Write Enable (WE) signal.

The controller 4251 may control all operations of the storage device 4250. In an embodiment, the controller 4251 may include SRAM. The controller 4251 may write data to the NAND flash memory device 4252 in response to a write command or read data from the NAND flash memory device 4252 in response to a read command. For example, the write command and/or the read command may be provided from the processor 4210 of the storage server 4200, the processor 4210m of another storage server 4200m, or the processors 4110 and 4110n of the application servers 4100 and 4100n. DRAM 4253 may temporarily store (or buffer) data to be written to the NAND flash memory device 4252 or data read from the NAND flash memory device 4252. Also, the DRAM 4253 may store metadata. Here, the metadata may be user data or data generated by the controller 4251 to manage the NAND flash memory device 4252. The storage device 4250 may include a Secure Element (SE) for security or privacy.

In an embodiment, controllers included in the storage devices 4150 to 4150n and 4250 to 4250m or CPUs of the (application) servers 4100 to 4200m may be configured to manage various meta data. Journal data for guaranteeing the reliability of various meta data may be managed by the controllers included in the storage devices 4150 to 4150n and 4250 to 4250m or the CPUs of the (application) servers 4100 to 4200m. In this case, the controllers included in the storage devices 4150 to 4150n and 4250 to 4250m or the CPUs of the (application) servers 4100 to 4200m may include the journal manager described with reference to FIGS. 1 to 21 or may operate based on the method described with reference to FIGS. 1 to 21.

According to the present disclosure, a storage device with improved reliability and improved performance and an operation method thereof are provided. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
a nonvolatile memory device; and
a storage controller configured to control the nonvolatile memory device and to update meta data by controlling the nonvolatile memory device,
wherein the storage controller comprises a journal manager,
wherein the journal manager is configured to:
generate a plurality of journal data associated with the update of the meta data,
restore the meta data by sequentially performing a replay operation for each of the plurality of journal data,
update a range table based on the plurality of journal data, and
skip the replay operation for at least one of the plurality of journal data based on the range table.

2. The storage device of claim 1, wherein the meta data are implemented with a mapping table of a plurality of logical block addresses managed by an external host device and a plurality of physical block addresses of the nonvolatile memory device.

3. The storage device of claim 1, wherein the journal manager comprises:
a journal data generator configured to generate the plurality of journal data associated with the update of the meta data;
a journal memory configured to sequentially record the plurality of journal data; and
a journal data replayer configured to perform the replay operation on the plurality of journal data.

4. The storage device of claim 1, wherein each of the plurality of journal data corresponds to an operation unit of the storage device.

5. The storage device of claim 1, wherein:
the range table comprises information about a latest index of journal data associated with a range update of the meta data, and
the range update indicates an update of meta data corresponding to a plurality of logical block address.

6. The storage device of claim 5, wherein, based on a determination that first journal data among the plurality of journal data are associated with the range update of the meta data and a first index of the first journal data is not matched with the latest index of the range table, the journal manager skips the replay operation for the first journal data, and
wherein, based on a determination that second journal data among the plurality of journal data are associated with the range update of the meta data and a second index of the second journal data is matched with the latest index of the range table, the journal manager performs the replay operation on the second journal data.

7. The storage device of claim 5, wherein, based on a determination that second journal data among the plurality of journal data are not associated with the range update of the meta data, the journal manager performs the replay operation on the second journal data.

8. The storage device of claim 5, wherein, based on a determination that second journal data among the plurality of journal data are not associated with the range update of the meta data and the replay operation for journal data corresponding to the latest index of the range table is not performed, the journal manager is further configured to skip the replay operation for the second journal data.

9. The storage device of claim 1, wherein the range table comprises information about a first latest index of journal data corresponding to a first range update of the meta data and information about a second latest index of journal data corresponding to a second range update of the meta data,
wherein the first range update indicates an update for first information of the meta data, the first information being corresponding to a first range group of first logical block addresses, and
wherein the second range update indicates an update for second information of the meta data, the second information being corresponding to a second range group of second logical block addresses.

10. The storage device of claim 9, wherein the first logical block addresses and the second logical block addresses do not overlap each other.

11. The storage device of claim 9, wherein:
the journal manager is further configured to split second journal data of the plurality of journal data into first sub-journal data and second sub-journal data,
the second journal data are associated with the first range update of the meta data and the second range update of the meta data,
the first sub journal data are associated with the first range update, and
the second sub journal data are associated with the second range update.

12. The storage device of claim 11, wherein the journal manager updates the information about the first latest index of the range table based on an index of the first sub-journal data and the information about the second latest index of the range table based on an index of the second sub journal data.

13. The storage device of claim 9, wherein the first range group and the second range group are set by an external host device.

14. The storage device of claim 1, further comprising a buffer memory configured to store the meta data.

15. The storage device of claim 14, wherein the meta data are restored and the buffer memory stores the plurality of journal data and the range table.

16. A method of a storage device, the method comprising:
performing a first erase operation and updating meta data based on the first erase operation;
generating first journal data based on the update of the meta data by the first erase operation and recording the first journal data at a journal memory;
updating a range table based on a first index of the first journal data;
after the first erase operation, performing a second erase operation and updating the meta data based on the second erase operation;
generating second journal data based on the update of the meta data by the second erase operation and recording the second journal data at the journal memory; and
updating the range table based on a second index of the second journal data.

17. The method of claim 16, wherein each of the first erase operation and the second erase operation indicates at least one of a sanitize operation, a trim operation, or a secure erase operation for the storage device.

18. The method of claim 17, further comprising:
at a restore on the metadata, skipping a replay operation for the first journal data, based on the rage table, and performing the replay operation on the second journal data, based on the range table.

19. A method of a storage device, the method comprising:
performing a first erase operation for a plurality of logical block addresses;
generating first journal data based on the first erase operation;
generating a first range table by updating a zero-th ($0^{th}$) range table based on a first index of the first journal data;
flushing the first journal data and the first range table to a memory in response to a first sudden power-off event;
performing a second erase operation for the plurality of logical block addresses, after the first sudden power-off event being finished;
generating second journal data based on the second erase operation;
generating a second range table by updating the first range table based on a second index of the second journal data;
flushing the first journal data, the second journal data, and the second range table to the memory in response to a second sudden power-off event;
restoring meta data after the second sudden power-off event being finished, by skipping a replay operation for the first journal data; and
performing the replay operation on the second journal data, based on the second range table.

20. The method of claim 19, wherein each of the first erase operation and the second erase operation indicates at least one of a sanitize operation, a trim operation, or a secure erase operation for the plurality of logical block address.

* * * * *